(12) United States Patent
Oba

(10) Patent No.: US 12,124,259 B2
(45) Date of Patent: Oct. 22, 2024

(54) VEHICLE CONTROL DEVICE AND VEHICLE CONTROL METHOD

(71) Applicant: Sony Semiconductor Solutions Corporation, Kanagawa (JP)

(72) Inventor: Eiji Oba, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 194 days.

(21) Appl. No.: 16/630,898

(22) PCT Filed: Jul. 6, 2018

(86) PCT No.: PCT/JP2018/025654
§ 371 (c)(1),
(2) Date: Jan. 14, 2020

(87) PCT Pub. No.: WO2019/017215
PCT Pub. Date: Jan. 24, 2019

(65) Prior Publication Data
US 2020/0231182 A1 Jul. 23, 2020

(30) Foreign Application Priority Data
Jul. 21, 2017 (JP) .................................. 2017-141552

(51) Int. Cl.
| | |
|---|---|
| *G05D 1/00* | (2024.01) |
| *B60K 35/10* | (2024.01) |
| *B60W 40/09* | (2012.01) |
| *B60W 60/00* | (2020.01) |
| *G06F 3/01* | (2006.01) |

(52) U.S. Cl.
CPC .......... *G05D 1/0061* (2013.01); *B60W 40/09* (2013.01); *B60W 60/0053* (2020.02); *G06F 3/017* (2013.01); *B60K 35/10* (2024.01); *B60K 2360/146* (2024.01); *B60W 2420/403* (2013.01)

(58) Field of Classification Search
None
See application file for complete search history.

(56) References Cited

U.S. PATENT DOCUMENTS 8,725,311 B1 * 5/2014 Breed ................. A61B 5/0507
701/1
9,690,292 B1 6/2017 Chan et al.
(Continued)

FOREIGN PATENT DOCUMENTS

CN 101799666 A 8/2010
CN 105313895 A 2/2016
(Continued)

OTHER PUBLICATIONS

English Translation of Mizuno (JP-2014085832-A) (Year: 2014).*
(Continued)

*Primary Examiner* — James J Lee
*Assistant Examiner* — Tawri M McAndrews
(74) *Attorney, Agent, or Firm* — Wolf, Greenfield & Sacks, P.C.

(57) ABSTRACT

There is provided a vehicle control device including an imager that images a driver, and circuitry configured to detect a gesture action indicating that the driver is awake based on an image captured by the imager, and switch a driving mode in response to the detected gesture action.

9 Claims, 23 Drawing Sheets

(56) References Cited

U.S. PATENT DOCUMENTS

| | | | |
|---|---|---|---|
| 10,065,504 B2* | 9/2018 | Ochiai | G06F 3/017 |
| 2013/0146234 A1* | 6/2013 | Kim | B60J 3/0243 |
| | | | 160/127 |
| 2015/0274178 A1* | 10/2015 | Tsuyunashi | B60W 30/09 |
| | | | 701/36 |
| 2016/0139762 A1* | 5/2016 | Meir | G06F 3/017 |
| | | | 345/156 |
| 2016/0144785 A1* | 5/2016 | Shimizu | B60K 35/00 |
| | | | 340/435 |
| 2016/0179205 A1* | 6/2016 | Katz | H04N 13/383 |
| | | | 345/156 |
| 2016/0209840 A1 | 7/2016 | Kim | |
| 2016/0357186 A1* | 12/2016 | Dias | B60W 50/082 |
| 2017/0028995 A1* | 2/2017 | Mori | B60W 50/082 |
| 2017/0060234 A1* | 3/2017 | Sung | G06F 3/1431 |
| 2017/0090475 A1 | 3/2017 | Choi et al. | |
| 2017/0090587 A1* | 3/2017 | Nakai | G06F 3/013 |
| 2017/0313190 A1* | 11/2017 | Shimada | G16H 40/67 |
| 2017/0364070 A1 | 12/2017 | Oba | |
| 2018/0059798 A1* | 3/2018 | Matsubara | G06F 3/017 |
| 2018/0113454 A1* | 4/2018 | Emura | G05D 1/0061 |
| 2018/0229743 A1* | 8/2018 | Aoi | B60W 50/16 |
| 2020/0019163 A1* | 1/2020 | Horii | B60W 40/09 |
| 2021/0114619 A1* | 4/2021 | Mimura | B60R 11/04 |

FOREIGN PATENT DOCUMENTS

| | | |
|---|---|---|
| CN | 105579321 A | 5/2016 |
| CN | 105654674 A | 6/2016 |
| CN | 106080389 A | 11/2016 |
| CN | 107207013 A | 9/2017 |
| CN | 107635844 A | 1/2018 |
| DE | 102016212422 A1 | 1/2017 |
| JP | 2014085832 A * | 5/2014 |
| JP | 2015141101 A | 8/2015 |
| JP | 2016-038793 | 3/2016 |
| JP | 2016-115356 | 6/2016 |
| JP | 2017001563 A | 1/2017 |
| JP | 2017097519 A | 6/2017 |
| KR | 20170093817 A | 8/2017 |
| WO | WO-2016/092796 A1 | 6/2016 |
| WO | WO-2016096701 A1 | 6/2016 |
| WO | WO-2017085981 A1 | 5/2017 |

OTHER PUBLICATIONS

International Search Report and Written Opinion mailed Oct. 12, 2018 in connection with International Application No. PCT/JP2018/025654.

* cited by examiner

FIG. 8

| LEVEL | NAME | SUBJECT OF PERFORMING DRIVING TASKS | SUBJECT OF MONITORING AND ADDRESSING SAFETY DRIVING |
|---|---|---|---|
| 0 | NO DRIVING AUTOMATION | DRIVER PERFORMS ENTIRETY OR PART OF DRIVING TASKS | DRIVER |
| 1 | DRIVER ASSIST | | DRIVER |
| 2 | PARTIAL DRIVING AUTOMATION | | DRIVER |
| 3 | DRIVING AUTOMATION UNDER CONDITIONS | SYSTEM PERFORMS ALL DRIVING TASKS | SYSTEM (DRIVER DURING FALLBACK) |
| 4 | ADVANCED DRIVING AUTOMATION | | SYSTEM |

FIG. 16

| EXECUTION AVAILABILITY OF ROUTINE SECONDARY TASK | EXECUTION AVAILABILITY OF SHORT-PERIOD LIMITED SECONDARY TASK | EXECUTION AVAILABILITY OF SECONDARY TASK | SEATED POSTURE FROM WHICH DRIVER CAN RETURN TO DRIVE AT STEERING AND DRIVING SEAT | AWAKE STATE IN WHICH DRIVER CAN RECOGNIZE SURROUNDING ENVIRONMENT AND PERFORM AVOIDANCE ACTION | UTILIZATION RANGE OF CORRESPONDING AUTOMATIC DRIVING LEVEL |
|---|---|---|---|---|---|
| | | POSSIBLE | WITHIN POSTURE | WITH WAKEFULNESS | EQUAL TO OR GREATER THAN LEVEL 4 |
| | | | | WITHOUT WAKEFULNESS | |
| | | | OUTSIDE POSTURE | WITH WAKEFULNESS | EQUAL TO OR LESS THAN LEVEL 3 |
| | | | | WITHOUT WAKEFULNESS | EQUAL TO OR LESS THAN LEVEL 3 |
| | | NOT POSSIBLE | WITHIN POSTURE | WITH WAKEFULNESS | EQUAL TO OR LESS THAN LEVEL 3 |
| | | | | WITHOUT WAKEFULNESS | EQUAL TO OR LESS THAN LEVEL 3 |
| | | | OUTSIDE POSTURE | WITH WAKEFULNESS | EQUAL TO OR GREATER THAN LEVEL 4 |
| | | | | WITHOUT WAKEFULNESS | |
| | | POSSIBLE | WITHIN POSTURE | WITH WAKEFULNESS | LEVEL 3 |
| | | | OUTSIDE POSTURE (LIMITED RELAXED POSTURE) | WITH WAKEFULNESS | EQUAL TO OR GREATER THAN LEVEL 2 |
| | | | OUTSIDE POSTURE (REQUIRING RETURNING TIME) | | EQUAL TO OR LESS THAN LEVEL 3 |
| | | NOT POSSIBLE | OUTSIDE POSTURE | WITH WAKEFULNESS | EQUAL TO OR LESS THAN LEVEL 3 |
| | | | | WITHOUT WAKEFULNESS | EQUAL TO OR LESS THAN LEVEL 3 |

VEHICLE CONTROL DEVICE AND VEHICLE CONTROL METHOD

CROSS REFERENCE TO RELATED APPLICATIONS

This application claims the benefit under 35 U.S.C. § 371 as a U.S. National Stage Entry of International Application No. PCT/JP2018/025654, filed in the Japanese Patent Office as a Receiving Office on Jul. 6, 2018, which claims priority to Japanese Priority Patent Application JP 2017-141552 filed in the Japanese Patent Office on Jul. 21, 2017, each of which is hereby incorporated by reference in its entirety.

TECHNICAL FIELD

The present technology relates to a vehicle control device and a vehicle control method, and particularly to a vehicle control device and a vehicle control method that enable safer takeover from automatic driving to manual driving.

BACKGROUND ART

In the related art, a technology of determining whether or not deviations in a posture of a driver are caused by habits of the driver and providing notifications related to the deviations in the posture in different manners in a case in which it is determined that deviations in a posture are caused by habits and in a case in which it is determined that deviations in a posture are caused for other reasons has been proposed (see PTL 1, for example).

In addition, a technique of determining whether or not a driver has a driving ability by which the driver is able to return from automatic driving to manual driving before starting automatic driving traveling of a vehicle and inhibiting starting of automatic driving traveling in a case in which it is determined that the driver does not have such a driving ability has been proposed in the related art (see PTL 2, for example).

CITATION LIST

Patent Literature

PTL 1: JP 2016-38793A
PTL 2: JP 2016-115356A

SUMMARY OF INVENTION

Technical Problem

Incidentally, it is necessary for switching from automatic driving to manual driving to be smoothly executed. For example, PTL2 exemplifies, in order to provide for this, a technique for emergency stopping of the vehicle in a case in which takeover to the manual driving is not successfully performed when automatic driving has been completed.

However, this may cause a traffic jam at a location, such as one with a large amount of traffic, unless an evacuation area for temporarily parking a vehicle that has failed to perform takeover is provided and the vehicle is guided to this area.

The present technology has been made in view of such circumstances and enables safer takeover from the automatic driving to the manual driving.

Solution to Problem

According to an embodiment of the present technology, there is provided a vehicle control device including an imager that images a driver, and circuitry configured to detect a gesture action indicating that the driver is awake based on an image captured by the imager, and switch a driving mode in response to the detected gesture action.

The circuitry can switch the driving mode from an automatic driving mode to a manual driving mode in a case in which the gesture action is detected.

The circuitry can detect, as the gesture action, a pointing and checking action that is performed in a vehicle traveling direction while viewing the vehicle traveling direction.

The pointing and checking action can be an action in which a finger tip of the driver is located in a vicinity of a vertical plane that is virtually set to include a line of sight of the driver and is also located below the line of sight of the driver.

The circuitry can detect the pointing and checking action by tracking an action of at least any of the finger tip, a hand, and a first of the driver.

The circuitry can detect the gesture action on a basis of characteristics specific to the driver.

The circuitry can be further configured to learn the characteristics specific to the driver on a basis of the detected gesture action.

The circuitry can detect the gesture action performed after the driver is seated in a driver's seat.

The circuitry can detect a seated action of the driver after a notification of switching the driving mode is provided to the driver.

The circuitry can detect, as the gesture action, an action of checking a vehicle traveling direction again and a subsequent action of checking a notification or an alert to the driver.

The circuitry can be further configured to detect an action of gripping a steering wheel by the driver after detecting the gesture action, and the circuitry can switch the driving mode from an automatic driving mode to a manual driving mode in a case in which the action of gripping the steering wheel is detected.

The circuitry can detect an awake state of the driver based on at least one of a response of the driver to presentation to the driver and accuracy of steerage correction.

The circuitry can detect an awake state of the driver by detecting the driver's action of gripping the steering wheel after detecting the gesture action.

The circuitry can detect an awake state of the driver in accordance with at least one of a response of the driver to presentation to the driver and accuracy of steerage correction.

According to an embodiment of the present technology, there is provided a vehicle control method including imaging a driver; detecting a gesture action indicating that the driver is awake based on a captured image, and switching a driving mode in response to the detected gesture action.

In an embodiment of the present technology, a driver is imaged, a gesture action indicating that the driver is awake is detected based on a captured image, and a driving mode is switched in response to the detected gesture action.

Advantageous Effects of Invention

According to an embodiment of the present technology, it is possible to more safely perform takeover from automatic driving to manual driving.

Note that the effects described herein are not necessarily limited and any of the effects described in the present disclosure may be achieved.

BRIEF DESCRIPTION OF DRAWINGS

FIG. 8 is a diagram for explaining automation levels.

FIG. 16 is a diagram illustrating a table that summarizes whether or not a secondary task can be executed.

DESCRIPTION OF EMBODIMENTS

Hereinafter, embodiments for implementing the present technology (hereinafter, described as "embodiments") will be described in detail with reference to drawings.

<Configuration Example of Automatic Driving System>

Figure 1:
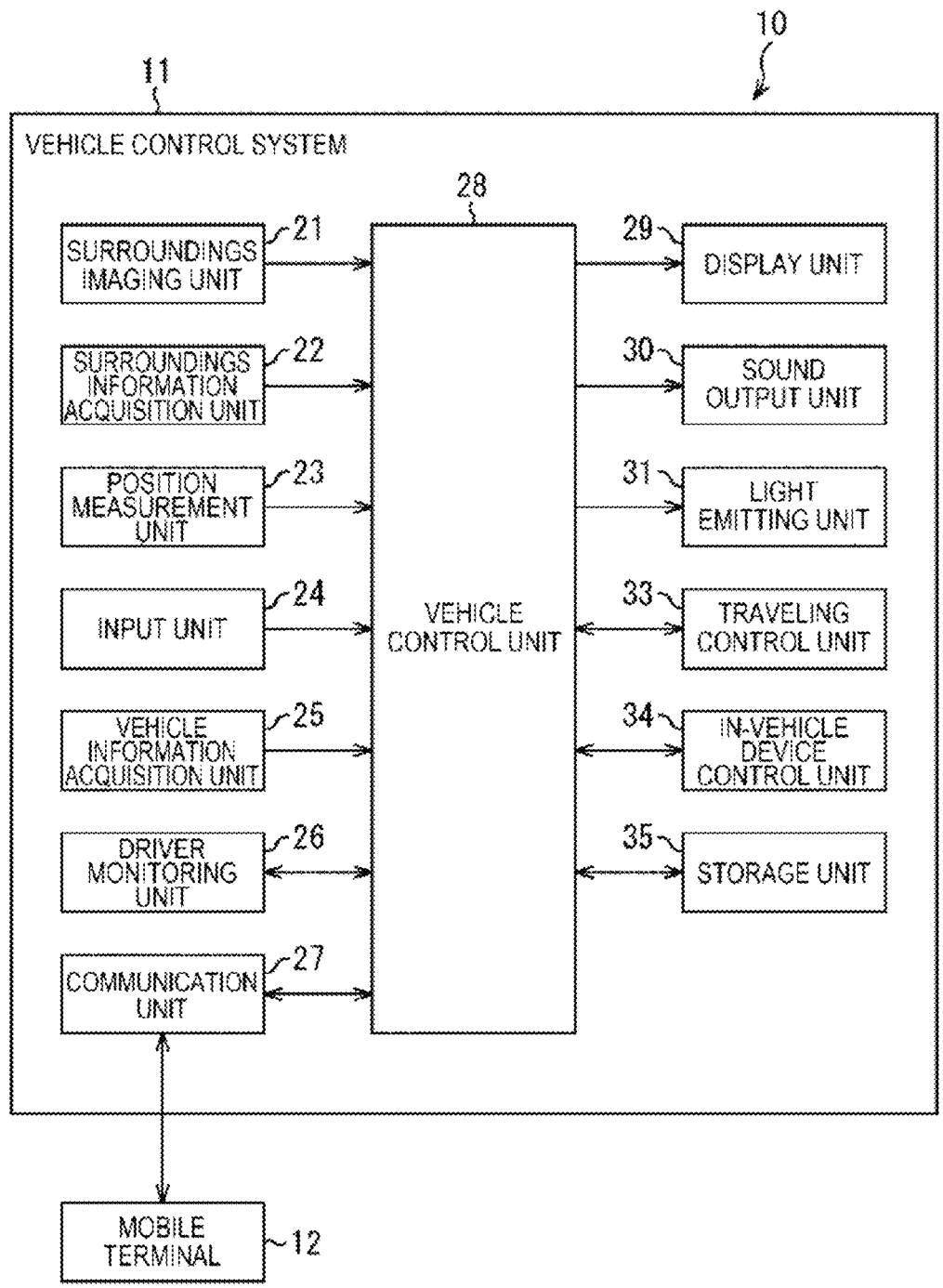
FIG. 1 is a block diagram illustrating a configuration example of an automatic driving system to which an embodiment of the present technology is applied.

FIG. 1 illustrates a configuration example of an automatic driving system 10 to which an embodiment of the present technology is applied.

The automatic driving system 10 includes a vehicle control system 11 and a mobile terminal 12.

The vehicle control system 11 includes a surroundings imaging unit 21, a surroundings information acquisition unit 22, a position measurement unit 23, an input unit 24, a vehicle information acquisition unit 25, a driver monitoring unit 26, a communication unit 27, a vehicle control unit 28, a display unit 29, a sound output unit 30, a light emitting unit 31, a traveling control unit 33, an in-vehicle device control unit 34, and a storage unit 35.

The surroundings imaging unit 21 may be provided as various imaging devices such as a mono-camera, a stereo camera, a time of flight (ToF) camera, a polarization camera, a time gated camera, a multi-spectrum camera, and a non-visible light camera such as an infrared camera, for example. The surroundings imaging unit 21 images the surroundings of a vehicle including those in a vehicle advancing direction and supplies the image obtained by the imaging as a surroundings image to the vehicle control unit 28.

The surroundings information acquisition unit 22 may be provided as various sensors such as a sonar, a radar, a lidar, a temperature sensor, a humidity sensor, a rain sensor, a snow sensor, and a backlight sensor. The surroundings information acquisition unit 22 acquires information of the surroundings of the vehicle. Further, the surroundings information acquisition unit 22 may acquire information for a blind angle, which is hardly obtained only from measurement by the vehicle itself, by acquiring information from a road side, a traveling vehicle that is traveling in the vicinity of the vehicle itself, a pedestrian, a bicycle, or the like in a wireless manner.

For example, the surroundings information acquisition unit 22 may acquire, as the surroundings information, information related to the environment of the surroundings of the vehicle, such as the temperature, the humidity, the weather, or a road surface state and information related to objects in the surroundings of the vehicle, such as types and positions of the objects in the surroundings of the vehicle. The surroundings information acquisition unit 22 supplies the acquired surroundings information to the vehicle control unit 28.

The position measurement unit 23 measures a current position of the vehicle by utilizing, for example, a positioning system which may combine a satellite navigation system such as a global navigation satellite system (GNSS) that measures the current position by utilizing artificial satellites and an autonomous positioning system, representative examples of which include a simultaneous localization and mapping (SLAM) system using an altimeter, an acceleration sensor, a gyro scope, and an image recognition device. The position measurement unit 23 supplies the measurement results to the vehicle control unit 28.

The input unit 24 may be provided as an input device such as a microphone, buttons, switches, a touch panel, a direction indicator, and a gesture recognition device. The input unit 24 receives inputs of instructions, data, and the like from passengers including a driver of the vehicle. The input unit 24 supplies the input instructions, data, and the like to the vehicle control unit 28.

The vehicle information acquisition unit 25 acquires vehicle information including various kinds of information related to the vehicle. For example, the vehicle information acquisition unit 25 may acquire, as the vehicle information, information related to motion of the vehicle, such as a speed, an acceleration, an angular speed, and an advancing direction of the vehicle.

In addition, the vehicle information acquisition unit 25 acquires information related to driving operations, such as operation timings and operation amounts of an accelerator pedal, a brake pedal, a steering wheel, a parking brake, a shift lever, a direction indication lever, a power (ignition) switch, a lamp switch, a wiper switch, and the like, for example.

Further, the vehicle information acquisition unit 25 acquires information related to a state of the vehicle, such as states of the respective parts in the vehicle and the presence of a malfunction. The vehicle information acquisition unit 25 supplies the acquired vehicle information to the vehicle control unit 28.

The driver monitoring unit 26 monitors the driver as will be described later with reference to FIG. 2 and supplies the monitoring results to the vehicle control unit 28.

The communication unit 27 may be provided as communication devices compatible with various communication schemes.

For example, the communication unit 27 may be provided as a communication device that performs wireless communication by dedicated short range communication (DSRC). In this case, the communication unit 27 communicates with an intelligent transport system (ITS) spot installed along a road and acquires a local dynamic map (LDM).

The LDM includes, for example, fixed information including road surface information, traffic lane information, three-dimensional structure information and the like, quasi-fixed information including traffic regulations information that may change with time, advance information regarding roadwork and advance update information when approaching work currently being carried, wide-area weather information and the like, quasi-dynamic information including the latest update information, accident information, traffic jam information, limited-area weather information, and the like, and dynamic information including information regarding vehicles and pedestrians in the surroundings, signal information, and the like.

Placing priority on wide-band communication of more information through shortrange communication over the short term enables more effective use of resources for wireless communication. This wide-band communication is an effective way particularly for acquiring local information regarding conditions just in front of the vehicle, which is necessary for the vehicle to travel, and for uploading road environment information acquired by the vehicle itself to the infrastructure side.

In addition, the communication unit 27 may be provided as a communication device that performs communication in accordance with communication standards (3G/4G/long term evolution (LTE) and the like), which enables longer distance communication, in accordance with which mobile phones perform communication, for example. In this case, the communication unit 27 acquires or exchanges various kinds of information, such as map data of a wider area and weather information at a spot remote from which the vehicle is traveling, from a server or the like via a dedicated or shared general-purpose network, such as the Internet.

The communication unit 27 may be provided as a beacon device. In this case, the communication unit 27 communicates with road-side equipment that is installed on the road side for assisting safe driving or route planning and acquires various kinds of traffic information.

Information regarding the environment through which the vehicle is scheduled to travel is not limited to these specific ways. In addition to communication with base stations, which is intended for next-generation mobile phone communication standards, relay communication between vehicles or proximity communication with a cloud server in the proximity of a traveling section without intervention of base stations may be performed. In addition, mutual redundancy may be provided to obtain a configuration that is robust with respect to a malfunction of specific communication systems.

Since currency of updated environmental data on a route through which the vehicle intends to travel varies depending on a band in which communication is possible, currency of information necessary to travel through a section with significantly poor currency of updated data, such as a LDM, using full-automatic driving deteriorates in a case in which the vehicle enters such a section. As a result, it is necessary to assume that restoration of intervention by the driver may be asked for in a section that was originally defined as a section through which the vehicle would be able to travel without intervention of the driver.

The communication unit 27 may be provided as a near-field wireless communication device which may also be used in the vehicle, such as one using Bluetooth (registered trademark). In this case, the communication unit 27 communicates with a mobile terminal 12 or the like, representative examples of which include a smartphone and a tablet terminal, and transmits and receives various kinds of information.

The communication unit 27 supplies the acquired information to the vehicle control unit 28. In addition, the communication unit 27 acquires information to be transmitted to other communication devices or the like from the vehicle control unit 28.

The vehicle control unit 28 includes an electronic control unit (ECU) and the like and controls the respective parts in the vehicle control system 11 as will be described later with reference to FIG. 2.

The display unit 29 may be provided as various display devices and displays various images and information under the control of the vehicle control unit 28. For example, the display unit 29 may be provided as a head-up display or a transmission-type display provided on a part of a windshield and displays images or information in a superimposed manner in a field of view of the driver. In addition, the display unit 29 may include, for example, an instrument panel, a car navigation system display, and the like.

The sound output unit 30 includes a speaker, an alarm, a buzzer, and the like, for example. The sound output unit 30 outputs sound information, a notification sound, an alert sound, or the like under the control of the vehicle control unit 28.

The light emitting unit 31 includes a light emitting device such as a light emitting diode (LED) or a lamp, for example. The light emitting unit 31 turns on or blinks light for the purpose of providing notification of various kinds of information to the driver or attracting the attention of the driver under the control of the vehicle control unit 28. A point light source of the light emitting unit 31 is not necessarily limited to an LED or the like, and the light emitting unit 31 may present detailed message information or the like to the driver by using a monogram display or the like via a matrix array display unit on an entire surface of or a part of the instrument panel.

The traveling control unit 33 controls devices that are involved in the running of the vehicle from among various devices mounted on the vehicle under the control of the vehicle control unit 28. For example, the traveling control unit 33 includes an engine control device that controls actuation of an engine, a motor control device that controls actuation of a motor, a brake control device that controls actuation of a brake, a steering wheel control device that controls actuation of a steering wheel, and the like.

The in-vehicle device control unit 34 controls devices other than the devices that are involved in traveling of the vehicle from among the various devices mounted on the vehicle. For example, the in-vehicle device control unit 334 controls an actuator that controls inclination of a seat, an actuator that vibrates a seat, an actuator that vibrates the steering, and the like.

The storage unit 35 stores programs and data necessary for the vehicle control system 11 to perform processing. For example, the storage unit 35 stores a log related to traveling or the like of the vehicle, a face image and recognition, identification, and extraction information that are used for authenticating the driver, results of learning various features of the driver, vehicle inspection information, vehicle accident diagnosis information, and the like. Note that all this information need not necessarily be stored in the storage unit 35, and some information may be transmitted to a remote server or the like via the communication unit 27, and the remote server or the like may be caused to store the information.

<Configuration Examples of Driver Monitoring Unit 26 and Vehicle Control Unit 28>

Figure 2:
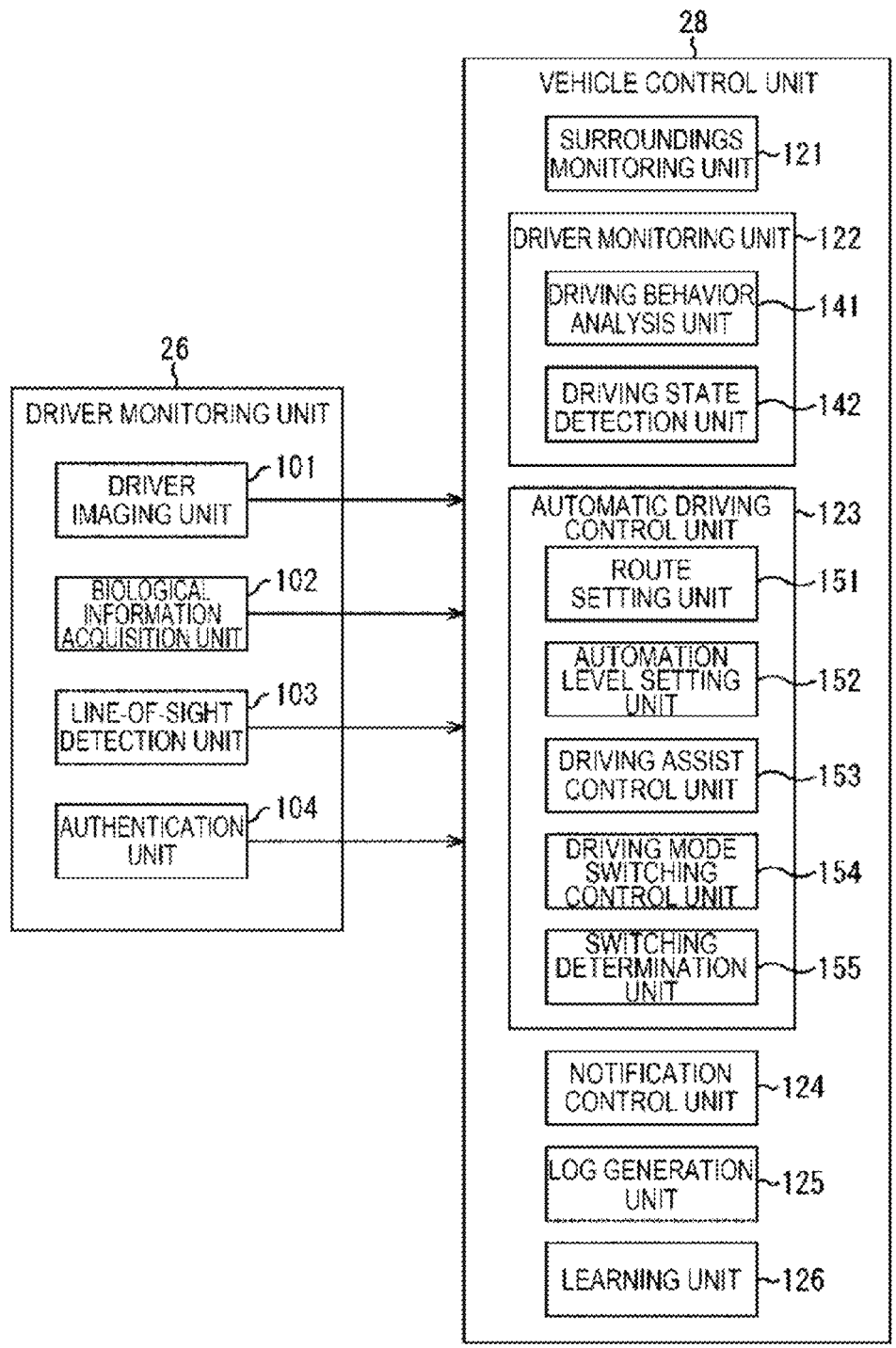
FIG. 2 is a block diagram illustrating configuration examples of a driver monitoring unit and a vehicle control unit.

FIG. 2 illustrates configuration examples of the driver monitoring unit 26 and the vehicle control unit 28 in the vehicle control system 11.

The driver monitoring unit 26 includes a driver imaging unit 101, a biological information acquisition unit 102, a line-of-sight detection unit 103, and an authentication unit 104.

The driver imaging unit 101 includes imaging devices such as a ToF sensor, a stereo camera, a 3D camera, and a 3D flash lidar sensor and images the driver. An imaging range of the driver imaging unit 101 includes at least a portion above the waist of the driver who is driving at the driver's seat and may include a wider range than this range. Note also that a part of functions thereof may be replaced with posture detection by a seat strain gauge that is provided with a seat to detect a body pressure.

The driver imaging unit 101 may further include a high-speed imaging mechanism capable of performing pupil analysis or detailed analysis of the eyeballs of the driver, and the high-speed imaging mechanism may be provided with a function enabling analysis of perceptual responses in the brain, such as saccade, visual fixation and slight movement that accompanies visual fixation, or drifting of the eyeballs. A high-speed imaging mechanism means an imaging mechanism capable of capturing a moving image at faster than a frame update rate of 60 frames per second (fps), which is used for ordinary television signals, and preferably a moving image at the frame update rate of 250 fps or greater.

The driver imaging unit 101 supplies the image obtained by imaging as a driver image to the vehicle control unit 28. Note that the driver may be illuminated with light from a dedicated light source, such as a light source that emits structured light that does not interrupt the field of view of the driver or a light source of infrared light with a specific wavelength that does not include visible light components, for example, in order to acquire more accurate and specific information when the driver is imaged.

The biological information acquisition unit 102 includes a sensor or the like that detects various kinds of biological information of the driver. The biological information acquired by the biological information acquisition unit 102 may include, for example, a pulse, a pulse wave, a blood pressure, a blood flow system, a body pressure on the seat, a seated posture, a brain wave, a blood flow in the brain, an ocular muscle potential, a cardiac electrogram, a body temperature, body odor, a skin temperature, sweating, a steering wheel grip reaction, a respiratory state, an alcohol content, and the like. The biological information acquisition unit 102 supplies the acquired biological information of the driver to the vehicle control unit 28. Although it is difficult to directly discern a definite awake condition of the driver from mainly passive biological information, the biological information still has loose correlations with a fatigue condition, a feeling of drowsiness, and the like of the driver. It is possible to more accurately determine an awake state of the driver by making a determination in combination with dynamic analysis of a line of sight, which will be described later. Further, this information plays a complementary role in observing the amount of activity of the driver in a state in which the driver is in a posture other than a seated posture and it is difficult to detect the line of sight.

The line-of-sight detection unit 103 performs detection (line-of-sight detection) of an orientation of the face of the driver, an orientation of the line of sight, blinking, the motion of the eyeballs (for example, slight motion of visual fixation, saccade, micro-saccade, drifting, tremor, and the like). Note that the line-of-sight detection unit 103 may be provided with a face detection unit that performs face detection for a face expression, an eyes open or closed state, and the like on the basis of an image of the driver and a head detection unit that detects motion of the head on the basis of the image of the driver.

The line-of-sight detection unit 103 evaluates a degree of attention that the driver is paying to the external circumstances and a degree of wakefulness from dynamic analysis of the line of sight. The degree of wakefulness is a degree indicating a state of awareness of the driver. For example, a degree of wakefulness that is greater than a predetermined threshold value represents that the driver has normal awareness. The line-of-sight detection unit 103 supplies the results of detecting the line of sight and the results of analyzing the degree of attention and the like to the vehicle control unit 28. The analysis of the line sight of the driver refers to determination based on learning of features specific to the driver, which will be described later, and enables more accurate determination of an internal awake state in accordance with the driver.

Since the line of sight behaviors include a large number of dynamic characteristics specific to the driver, the authentication unit 104, which will be described later, typically performs the detection thereof before any other detection.

Regarding eyeball actions of an individual driver, the line of sight is moved to information which interests the driver in information regarding the external circumstances. Therefore, action characteristics of the line of sight including what will be visually recognized in sequence in accordance with states of understanding and determination depend on transition of progress of cognitive and determination, through which the driver achieves understanding when the driver turns around, depending on empirical characteristics as well as physical characteristics.

The determination of the wakefulness of the driver through the dynamic analysis of the line of sight is not made on the basis of whether or not the driver has stared at or fixedly viewed a target in the external circumstances in a physically accurate direction of the eyeballs. It is a matter of course that the driver may place a focus of visual fixation of the line of sight on a specific target in a situation in which the driver is fixedly looking at a specific target when the driver safely stops the vehicle, looks at a face of a person in the field of view to determine who the person is, or reads content of an advertising sign or the like to make a cognitive determination on the content, for example.

However, in a case in which the driver is traveling in a typical traveling vehicle while discerning situations of the external circumstances the driver rarely fixes the line of sight on a specific target since it is necessary to make appropriate determinations for rushing-out or other unexpected incidents.

Further, since the driver typically perceives a target phenomenon of concern in a peripheral field of view outside a central field of view of the line of sight in many cases, and in that case, in particular, the target concern is in an area of the peripheral field of view with low resolution, the driver starts to move the line of sight to perceive the target by turning the central field of view to the corresponding direction for the purpose of discerning the details thereof. A so-called saccade action of the eyeballs is thus observed.

In general, once a driver who is awake completes ascertaining of the target phenomenon with the first movement of the eyeballs, the driver repeats movement of the line of sight and movement of the line of sight on the next target without performing detailed visual fixation and observation in order to perceive other risk factors in the field of view, instead of fixing the line of sight on the target phenomenon and advances observation (visual fixation). The completion of the ascertaining of the target phenomenon means completion of recognition in the brain, and it is not always necessary to perceive the target in the central field of view and to stop movement of the eyeballs temporarily for visual fixation.

That is, it is possible to state that dynamic characteristics of a saccade action and visual fixation of the line of sight of the driver appear in a form to which a part of determination activities of perception in the brain of the driver is reflected, in other words. When a person completes determination regarding information for their own purpose, cognitive determination for fixing determination is triggered by consistency at or above a specific level obtained between stimuli caused by information captured as visual information and information extracted from stored related information, and the determination is achieved. However, in a case in which no determination is thus achieved, the person further moves on to an observation stage for confirming the determination and waits for information necessary to trigger the determination.

Regarding the recognition activities in the brain, perception determination in the brain immediately and already has started when the driver starts to move the line of sight of saccade. Therefore, completion of the perception determination does not necessarily ask for a time until the line of sight of the eyes is further focused on the point at which the driver turns around to an approximate direction and further perceives the target at the central field of view.

The start of the moving of the line of sight is start of a process of turning the central field of view to the corresponding direction to compensate for information and achieve detailed determination since only stimulus information from kinetic visual acuity captured in the peripheral field of view is insufficient for distinguish the content thereof, and the driver does not necessarily complete to view the target in a case in which the driver achieves determination in the process of moving the line of sight. That is, visual fixation corresponding to an observation stage may not be observed.

For example, in a case in which both a traffic signal in a green state and an advertising pillar with a red color, which are present in the advancing direction, enter the peripheral field of view of the driver in a state in which it is not possible to distinguish the traffic signal and the advertising pillar, the driver starts to turn around to the traffic signal and make determinations since it is necessary to determine the color of the traffic signal when the driver passes through a corresponding crossroads.

It is not always necessary for the driver to view the red advertising pillar through strict visual fixation, and if the determination is completed at a glance, priority may be placed on checking whether or not a pedestrian, a bicycle, or the like will rush out when the vehicle still travels. Further, actions such as a dynamic observation procedure and the like of one driver are still affected by visual acuity and change due to complex factors including brightness, glare, and the like in an environment.

The line-of-sight detection unit 103 can estimate an awake state by dynamic analysis of the line of sight in accordance with conditions of the driver by learning the dynamic characteristics of the line of sight specific to the driver as described above, and supply the results of determining the dynamic analysis of the line of sight and the results of analyzing the degree of attention and the like to the vehicle control unit 28. In addition, these features of the line of sight behaviors of each individual are learned by characteristic actions specific to the driver and are leaned by the learning unit 126, which will be described later, as features of repeated actions of the authenticated driver.

The authentication unit 104 authenticates the driver on the basis of an image of the driver and an analysis image of the line of sight, for example. At this time, iris authentication processing may be performed. The authentication unit 104 supplies the authentication result to the vehicle control unit 28. This driver authentication processing is processing that is performed before any other processing as described above. Thereafter, association with the aforementioned features specific to the driver may be performed.

The vehicle control unit 28 includes a surroundings monitoring unit 121, a driver monitoring unit 122, an automatic driving control unit 123, a notification control unit 124, a log generation unit 125, and a learning unit 126.

The surroundings monitoring unit 121 monitors the surroundings of the vehicle on the basis of the surroundings information from the surroundings imaging unit 21, the surroundings information from the surroundings information acquisition unit 22, and various kinds of information from the communication unit 27.

The driver monitoring unit 122 monitors the driver on the basis of vehicle information from the vehicle information acquisition unit 25, an image of the driver from the driver imaging unit 101, biological information of the driver from the biological information acquisition unit 102, results of detection performed by the line-of-sight detection unit 103, and results of authentication performed by the authentication unit 104, results of learning performed by the learning unit 126, and the like. The driver monitoring unit 122 includes a driving behavior analysis unit 141 and a driving state detection unit 142.

The driving behavior analysis unit 141 analyzes driving behaviors (features and characteristics specific to the driver, such as driving operations and behaviors) of the driver on the basis of the image of the driver and the vehicle information from the driver imaging unit 101, the vehicle information, the results of learning performed by the learning unit 126, and the like.

The driving state detection unit 142 detects a driving state on the basis of the image of the driver from the driver imaging unit 101, the biological information of the driver, the results of detection performed by the line-of-sight detection unit 103, the results of authentication performed by the authentication unit 104, the results of learning performed by the learning unit 126, and the like. The driving state includes a state of the authenticated driver and an awake state of the driver. The detection of the driving state enables determination of the awake state of the driver with high accuracy by performing the detection in a plurality of stages on the basis of the state of the authenticated driver and enables determination in accordance with the characteristics more specific to the driver by specific learning being performed, as compared with a case in which determination is made on the basis of a threshold value that is one-dimensionally decided in advance as is typically performed in the related art.

The automatic driving control unit 123 controls automatic driving. The automatic driving control unit 123 includes a route setting unit 151, an automation level setting unit 152, a driving assist control unit 153, a driving mode switching control unit 154, and a switching determination unit 155.

The route setting unit 151 corrects the current position of the vehicle measured by the position measurement unit 23 on the basis of acceleration and an angular speed of the vehicle included in the vehicle information from the vehicle information acquisition unit 25. In addition, the route setting unit 151 sets a traveling route to a destination input via the input unit 24, on the basis of the surroundings information from the surroundings information acquisition unit 22, the LDM, the map data, and map updated information acquired via the communication unit 27, and map data and the like stored in the storage unit 35.

The automation level setting unit 152 sets distribution of automation levels for each traveling section on the traveling route, on the basis of the surroundings information from the surroundings information acquisition unit 22, the LDM, traffic information, weather information, road surface information and the like acquired via the communication unit 27. In addition, the automation level setting unit 152 sets automation levels on the basis of distribution of the automation levels for each route section, user setting input via the input unit 24, and the like.

Here, the automation levels represent levels of automatic driving, or in other words, degrees of automation of driving. Details of the automation levels will be described later with reference to FIG. 8.

The driving assist control unit 153 controls the traveling control unit 33 and assists the driving performed by the driver in accordance with a set automation level. Partial or complete automatic driving is realized by the assist provided by the driving assist control unit 153. For example, the driving assist control unit 153 performs driving assist with partially restricted functions, such as adaptive cruise control (ACC), a lane keep assist system (LKAS), traffic jam assist (TJA), and an advanced emergency braking system (AEBS) in an automation level 2. Note that details of the automation levels will be described later.

In an automation level 3, composite multi-stage control including further complicated determination about conditions of general roads, such as recognition of traffic signals on roads, joining to main lines, branching from main lines, passing through crossovers of arterial roads, priority control of crossroads, and propriety vehicle control for pedestrian zones and pedestrians, and route planning Although this specification is described on the assumption that complete automatic driving control that does not ask for intervention of the driver in an automation level 4 is also included in the driving assist control unit 153, exclusive complete automatic driving control rather than assist is performed when the vehicle travels in the level 4 of the driving assist control unit 153 according to strict sectioning of the control.

In addition, the driving assist control unit 153 may perform further advanced and complicated control (for example, passing including lane change and the like) by the aforementioned driving assist in traveling sections at and above the automation level 3 or may perform driving assist by autonomous traveling or the like that is accompanied advanced unattended determination of conditions, through which the vehicle can travel even in an environment including pedestrians and bicycles, such as in a city area.

Further, it is also possible to assume social introduction of safely crawling automatic driving vehicles that can be used only at limited low speeds in a field of using automatic driving vehicles from a viewpoint of securing transportation in areas in which there are no public transportation though this is a special utilization form. At that time, it is also assumed that utilization of the vehicles is expanded to higher-speed traveling by using the corresponding vehicles only when the driver can perform manual driving normally, from the viewpoint of convenience. At that time, an embodiment of the present technology provides functions that are effective for determining ability of the driver. Note that this special utilization form of crawling driving at a limited low speed is a utilization form that is different from an emergency evacuation mode for standard vehicles in the utilization form in the related art that also perform ordinary high-speed traveling.

Although a vehicle that can safely travel in a full-speed range by the automatic driving asks for expensive equipment, it is possible to realize equipment at lower cost if functions are limited approximately to low-speed crawling driving. The present technology may be applied to a special utilization form that enables people who are weak against traffic in rural lightly populated areas and the like to use light vehicles instead, for example.

In the vehicle control system 11, an automatic driving mode, which corresponds to the so-called automation level 4 or a higher level, in which unattended ordinary traveling can be performed, an automatic driving mode, which corresponds to the automation level 3, in which the driver can return to and intervention driving as needed, a manual driving mode, in which the driver mainly perform leading control and make determinations, which corresponds to the automation level 2 or a lower level, an emergency evacuation mode, and the like are set as driving modes.

The automatic driving mode is a mode that is realized by driving assist performed by the driving assist control unit 153. The manual driving mode is a mode in which the driver subjectively performs driving. The emergency evacuation mode is a mode in which the vehicle is caused to evacuate to a predetermined location in an urgent situation.

The emergency evacuation mode is used in a case in which the driver has a difficulty in driving due to a disease or the like during manual driving (in the manual driving mode) or in a case in which it is not possible to confirm that the driver is awake when the automatic driving (automatic driving mode) is switched to the manual driving, for example.

Although the emergency evacuation mode is defined as a way for moving while placing less priority on the moving speed in this specification, the driver may set the emergency evacuation mode in an evacuation area as a countermeasure for an urgent situation when the driver has a difficulty in performing takeover to the manual driving during use of the automatic driving. In the content of this specification, the emergency evacuation mode when the vehicle evacuates to the evacuation area is not distinguished from a moving priority (moving is possible even at a significantly low speed for safety) way that is used as a way to be secured for persons who live in a rural area, do not have public transportation, and are called transportation poor to move to hospitals or the like in urgent situations.

The driving mode switching control unit 154 changes frequencies of checking the LDM, the traffic information, and the like on the basis of the LDM, latest updated information thereof, a weather, road surface conditions, the traffic information, and the like acquired via the communication unit 27.

In addition, the driving mode switching control unit 154 monitors a necessity of switching from the automatic driving mode to the manual driving mode, and in a case in which the necessity is present, the driving mode switching control unit 154 provides a request notification or an alert notification for returning to the manual driving to the driver during traveling in the automatic driving mode. At this time, the driving mode switching control unit 154 determines whether or not there is necessity of switching from the automatic driving mode to the manual driving mode in accordance with a detected state of the driver and executes processing of switching from the automatic driving mode to the manual driving mode.

Note that the driving mode switching control unit 154 does not necessarily reliably distinguish whether the driver has noticed the notification in a situation in which urgent takeover is not needed. In a case in which it is necessary for the driver to return after continuously traveling by the automatic driving for about one hour, for example, the driving mode switching control unit 154 may simply provide only a notification to the driver in a stage in which a change in the situation has been detected, and may not necessarily confirm that that the driver has noticed the notification for whether or not the driver has accurately recognized the content of the notification. However, missing the notification may lead to a fatal wound in a situation in which urgent takeover should be done in few minutes. Thus, it is necessary to confirm that the user has noticed the notification in order to allow the driver to reliably recognize the situation.

However, it is favorable that the driver have noticed the notification by a timing predicted by an optimal notification timing estimator, which is not illustrated in the drawing. Thus, in a case in which 10 minutes, for example, before arrival at a takeover spot is estimated as an optimal notification timing, the notification is provided, and it is confirmed that the user has noticed the notification. In a case in which it is not detected that the driver has noticed the notification, an alert notification as an alarm may further be provided.

The switching determination unit 155 makes determination about switching from the automatic driving mode to the manual driving mode on the basis of at least one of results of detecting reactivity of the driver and a degree of wakefulness by the driving state detection unit 142 under the control of the driving mode switching control unit 154. The determination about the switching performed by the switching determination unit 155 will be described later with reference to FIG. 3.

The notification control unit 124 controls the display unit 29, the sound output unit 30, and the light emitting unit 31 and provides a notification of various kinds of information or an alert to the driver or reminds the driver of paying attention. In addition, the notification control unit 124 may provide the notification of various kinds of information or the alert to the driver or remind the driver of paying attention by using an actuator or the like controlled by the in-vehicle device control unit 34, for example.

The notification to the driver may be sources that cause various unpleasant factors for the driver, such as recording of a detected action of returning of the driver, seat vibration and handle vibration that imitate rumble strip road surface traveling by using an actuator, panel information display, bad odor, lifting of a backrest, and moving of a seated position.

The log generation unit 125 records the detected action of the returning of the driver, records various events that has occurred in and around the vehicle, responds to a notification of the surroundings of the vehicle when the takeover is performed, and generates and updates logs for vehicle-to-vehicle and road-to-vehicle communication with vehicles and infrastructures in the vicinity. The log generation unit 125 causes the storage unit 35 to store the generated logs and appropriately updates the logs.

The learning unit 126 learns driving behaviors (features and characteristics specific to the driver, such as operations for driving, a returning sequence, and returning behaviors) of the driver, which have been analyzed by the driving behavior analysis unit 141, and stores the results of the learning.

In the driver behavior analysis, individual returning characteristics in consideration of responses for the respective situations, such as road surfaces and the like during a night time or when snow is accumulated, which give rise to an unpleasant feeling in the driver, may be learned and recorded in consideration of dependency on a traveling environment and the like. Since the driver typically ascertains their own returning characteristics, a mechanism for the driver to perform offset setting of an early notification may further be provided in order to choose safe conditions than values recommended on the basis of the system learning.

Then, it is also assumed that there are uses who are careful drivers, places emphasis on a safety aspect as compared with a timing presented by the vehicle control system 11 as a value recommended on the basis of the learning, and prefers an earlier notification than the timing presented by the vehicle control system 11. In order to address this, a mechanism by which the user puts the notification timing ahead in accordance with their preference, for so-called offset setting of an early notification may be provided.

However, it is unfavorable that the driver be allowed to set the notification at a later notification timing rather than setting it at an earlier timing and a case in which the driver has a difficulty in returning in time occurs. If a few situations in which the driver has a difficulty in returning in time and gets behind as a result occur, there are problems that a frequency of urgent stop of the vehicle increases and that traffic jams is induced in the transportation infrastructures that is on the assumption of smooth transportation. Therefore, this is an unfavorable utilization form. Thus, the user should be allowed to change only the setting to put the notification timing ahead as desired.

Meanwhile, a mechanism by which the driver can cancel the early notification in advance before the vehicle control system 11 issues an annoying notification or alert in a case in which the driver is aware of returning in an early stage, and the vehicle control system 11 learns the user's awareness and can prepare for the returning earlier than the timing of the notification may also be provided.

The cancellation of the notification is like stopping an alarm clock before the clock rings. However, since occurrence of a situation like stopping the clock too early, losing attention, and going back to sleep is hazardous, the utilization of the cancelation of the early notification may be limited to only when there is a way for detecting transition of the driver to the returning after the cancellation and there is also a mechanism for encouraging the driver to return when there is a delay in the procedure for returning to the manual driving.

<Configuration Example of Switching Determination Unit>

Figure 3:
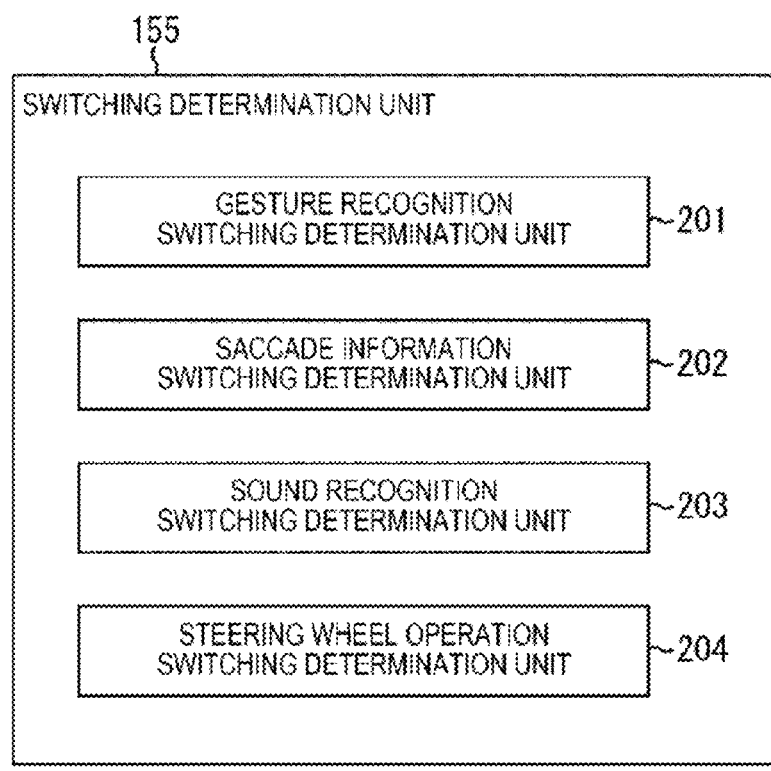
FIG. 3 is a diagram illustrating a configuration example of a switching determination unit.

FIG. 3 is a diagram illustrating a configuration example of the switching determination unit.

The switching determination unit 155 includes a gesture recognition switching determination unit 201, a saccade information switching determination unit 202, a sound recognition switching determination unit 203, and a steering wheel operation switching determination unit 204.

It is possible to make more reliable determination by making a determination in a stepwise manner. Although description of embodiments will be limited to the above recognition, a state of the driver may be constantly monitored regardless of whether or not there is necessity of takeover, a notification or an alert may be issued on the basis of information from the monitoring, action analysis of dynamic postures may be performed, and the procedure described in the specification may then be added.

In the switching determination unit 155 with such a configuration, determination based on the various kind of information is performed in a plurality of stages, and it is finally determined whether or not it is possible to switch the driving mode from the automatic driving mode to the manual driving mode on the basis of the respective results of the determination.

Detection of Degree of Wakefulness Based on Recognition of Gesture Actions

The gesture recognition switching determination unit 201 causes the driving state detection unit 142 to recognize the gesture actions and detect the degree of wakefulness of the driver.

The gesture recognition switching determination unit 201 determines an internal state after returning of the driver on the basis of the results of detecting a predetermined action of checking that the user has noticed the notification after the notification of the takeover provided by the driving state detection unit 142. It is determined whether or not it is possible to switch from the automatic driving mode to the manual driving mode on the basis of the results of determining the internal state after returning of the driver.

Although the simple pointing is exemplified as the predetermined action indicating that the driver has noticed the notification in embodiments, an action that enhances probability that the driver has noticed the notification may also be employed as an action that asks for more intelligent determination of the driver than a repeating action or the like.

Here, the internal state after returning is a state of awareness of the driver. Determination of the internal state after returning corresponds to determination of whether or not the awareness of the driver is awake.

In particular, it is difficult to perform an accurate pointing action unless feedback of determination in the brain to turn the hand and the finger tip into the range of the line of sight works on the basis of visual information obtained by the driver viewing the front side in the pointing action performed while the driver views the front side. In addition, since an internal awareness state of the driver reflects to unsteadiness and a degree of accuracy of the action, it is also possible to view an active reaction (which will be described later) of the awake state in the brain.

During the automatic driving, the driver can perform a work or an action (including taking a nap) other than driving as a secondary task. However, in a case in which there is a necessity of switching from the automatic driving mode to the manual driving mode, the driver should stop the secondary task and change their own internal state after returning into a state in which the driving task as a primary task can be performed.

Note that although detailed description will not be provided in this specification, a passive scheme driver state observation is continuously performed for whether or not the driver has completely stayed away from a driving awareness state, such as during taking a nap, in particular, and a waking-up notification (such as an alarm) for causing the driver to return at a necessary timing is provided. An embodiment of the present technology is processing performed by the vehicle control system 11 for the purpose of confirming that the driver has noticed the notification and determining a degree of wakefulness when apparent returning of the driver is achieved in the state of the driver after the notification is provided.

The determination of whether or not the internal state after returning of the driver is in a state in which the driver can perform the driving task is performed by detecting a pointing and checking sign that is an action of the driver performing pointing and checking while viewing the front side of the vehicle of the driver when the driver wakes up once and sits up from the nap, for example.

In a case in which it is possible to detect the normal pointing and checking sign without unsteadiness, it is determined that the internal state after returning of the driver is in a state in which the driver can perform the driving task. In a case in which it is not possible to detect the normal pointing and checking sign, it is determined that the internal state after returning of the driver is not in the state in which the driver can perform the driving task. Note that in a case in which the posture is not stabilized and the accurate detection is hardly performed, retrying processing or the like may be performed by executing the detection again. The vehicle control system 11 may provide a notification about the retrying.

The pointing and checking sign is an action of directing an arm to a direction as a target of checking and pointing a direction of an event to be checked with a finger of the lifted arm like an action performed by a conductor of a train or a bus. As described above, it is possible to detect the pointing gesture of the driver as an action that is an active action of the driver directly connected to perception as compared with passive biological signal observation in the related art, and the vehicle control system 11 can thus significantly accurately detect whether or not the driver can perform manual driving. In addition, there is also an advantage that the detection result includes less ambiguity.

In an embodiment, the driver sends the corresponding pointing sign in a manner in which the driver first lifts one arm to a substantially horizontal position and checks the front side of the advancing direction on the assumption that the driver checks the front side of the vehicle as an event that will immediately occur in a case in which the vehicle advances, as defined checking procedure after reception of a notification of takeover.

Hereinafter, a sign of pointing and checking while viewing the front side of the vehicle will be referred to as a front side pointing and checking sign as needed.

The driving state detection unit 142 detects the front side pointing and checking sign performed by the driver as a predetermined gesture action. In a case in which the gesture action is detected, the driving state detection unit 142 determines whether or not there is a predetermined relationship in the line of sight of the driver, a position or positions of a dominant eye or both eyes of the driver, and a pointed position. This determination is performed on the basis of a combination of information detected by a three-dimensional sensor and a two-dimensional sensor that form the driver imaging unit 101, for example.

In a case in which a finger tip of the driver is located in the vicinity of a vertical plane that includes the line of sight of the driver and is also located below the line of sight of the driver, it is determined that the predetermined relationship is present. In this manner, the driving state detection unit 142 accurately recognizes that the driver has pointed the front side and detects a degree of wakefulness of the driver.

Note that influences of habits, youth, and the like that are characteristics specific to the driver are added to the gesture actions in many cases. The driving state detection unit 142 detects a front side pointing and checking sign in further consideration of the results of analyzing driving behaviors of the driver by the driving behavior analysis unit 141, the results of learning performed by the learning unit 126 using the results of analysis, and the like.

As described above, the driving state detection unit 142 detects the state of the driver by detecting gesture actions on the basis of the image of the driver, the biological information of the driver, the results of detecting the line of sight, the results of analyzing driving behaviors of the driver, the results of authenticating the driver, the results of learning performed by the learning unit 126, and the like.

In addition, the driving state detection unit 142 may be caused to perform tracking (tracking of actions for ascertaining conditions of the driver) of a driving posture returning sequence. The tracking of the driving posture returning sequence is processing of detecting, through tracking, whether or not the driver has been seated at the time of executing the secondary task and further detecting a sequence until the posture of the driver returns to a state in which the driver can drive.

In addition to the tracking eyeball behavior analysis may be performed to detect reactivity and a degree of wakefulness of the driver and determine whether or not ability of the driver to return to the manual driving has been recovered. Note that the actions of the driver to be tracked by the tracking include at least an action of checking the front side of the vehicle and a subsequent action of checking a notification or an alert.

The front side pointing and checking sign of the driver may be determined by using the line of sight, the position of the dominant eye or both eyes, the position of the finger tip, the hand, or the fist, the position of a road on the front side of the vehicle, the detection result obtained by a posture tracking device such as a three-dimensional ToF sensor, and the like in a composite manner. Determination of a degree of accuracy of the action may further be performed after determining the position of the finger tip.

In this manner, the front side pointing and checking sign is a determination action in the brain of actually viewing the front side of the vehicle and pointing the front side of the vehicle in that state. Requesting a predetermined action gesture in this manner enables checking and learning characteristics specific to the driver including physical ability, such as how much the driver can faithfully express the front side pointing and checking sign. In particular, since it is possible to determine whether or not takeover to the manual driving has been executed normally by performing transition observation of driver states in multiple stages in combination with other ways, and it is possible to employ a mechanism that determines that transition of the pointing gesture during normal takeover is regarded as being normal by using teacher data, there is no need to manually select and distinguish normal transition data and to get ready, as will be described below.

Detection of Degree of Wakefulness Based on Saccade Information

The saccade information switching determination unit 202 causes the driving state detection unit 142 to perform analysis of eyeball saccade behaviors of the driver, micro-saccade behavior analysis, and analysis of actions that reflect and are linked with a series of perception activities in the brain, such as slight motion of visual fixation and drifting and detect the degree of wakefulness of the driver.

Here, specific determination actions in the brain of the driver are detected, and behaviors of the reflex response characteristics change due to visual acuity of the individual driver that can temporally vary and reflexive active reaction in the brain such as presence of hazard. Therefore, it is possible to more accurately make determinations by authenticating the driver and making a determination in accordance with the behavior characteristics learned on the basis of the specific property learning.

The saccade information switching determination unit 202 determines whether or not it is possible to switch the driving mode from the automatic driving mode to the manual driving mode or determine conditions when the driver is in the course of wakefulness, by determining the internal state after returning of the driver in accordance with the results of the detection performed by the driving state detection unit 142.

Detection of Reactivity and Degree of Wakefulness Based on Sound Recognition

The sound recognition switching determination unit 203 causes the driving state detection unit 142 to allow the driver to perform determination and recognition on the basis of a sound response from the driver and detect the reactivity and the degree of wakefulness of the driver.

For example, such a question that the driver has a difficulty in responding without consideration is presented by sound, and a respond to the question is detected by the driving state detection unit 142. The driving state detection unit 142 detects the reactivity and the degree of wakefulness of the driver on the basis of whether or not the driver can respond to the question. In a case in which the driver can accurately respond to the question, for example, it is detected that the reactivity and the degree of wakefulness of the driver are satisfactory.

In a case in which the driver fails to precisely respond to the question, it is determined that the driver is in the course of returning to the wakefulness, and if there is an enough time until the takeover point, it is also possible to retry the question. However, if there is no respond at all, risks due to the takeover increase. Therefore, determination may be performed on the basis of the LDM information and the like, and if the vehicle travels through a section in a worse road environment, in particular, the vehicle may quickly shift to the emergency evacuation mode in an early stage as will be described later.

The sound recognition switching determination unit 203 determines whether or not it is possible to switch the driving mode from the automatic driving mode to the manual driving mode, by determining the internal state after returning of the driver on the basis of the results of the detection performed by the driving state detection unit 142.

Detection of Reactivity and Degree of Wakefulness Based on Steering Wheel Operation The steering wheel operation switching determination unit 204 causes the traveling control unit 33 to produce a steerage deviation by applying a torque as noise to the steering wheel and to intentionally cause traveling that deviates from normal traveling (hereinafter, referred to as noise traveling). For example, the noise traveling includes traveling in which the vehicle is moved to a deviated direction, such as a substantially orthogonal direction, while the vehicle is maintained in a substantially advancing direction in the traffic lane with respect to the advancing direction along the traffic lane and traveling in which transverse movement in a changed direction to cross the traffic lanes or quick acceleration is applied. In a case in which the vehicle is exposed to side wind, the vehicle is moved, without changing the direction thereof, in a direction deviated transversely by a small amount.

The steering wheel operation switching determination unit 204 causes the driving state detection unit 142 to detect that the driver can accurately respond to the noise traveling by intentionally adding a torque for correcting the steerage or stepping an accelerator or brake pedal and the like.

The steering wheel operation switching determination unit 204 determines whether or not it is possible to switch the driving mode from the automatic driving mode to the manual driving mode, by determining the internal state after returning of the driver on the basis of the results of the detection performed by the driving state detection unit 142.

The switching determination unit 155 determines the internal state after returning (whether or not the driver is awake, or a degree thereof) of the driver by using a plurality of information items as described above.

In addition, the switching determination unit 155 performs steering wheel operation switching determination as determination in a final stage of the switching determination or in a quasi-final stage.

Determining the awake state of the driver in these multiple stages enables the driving mode to be more reliably and more safely shifted from the automatic driving mode to the manual driving mode. In addition, teacher data obtained at the time of normal takeover and teacher data at the time of failures are collected in a self-alignment manner by one driver repeatedly and continuously executing the takeover action, and accuracy of the detection is improved in accordance with a utilization frequency.

<Details of the Gesture Recognition Switching Determination>

Next, details of gesture recognition switching determination will be described with reference to FIGS. 4 to 7.

It is assumed that the driver is working on a secondary task in a vehicle traveling in the automatic driving mode. In a case in which it is determined to be necessary to return to the manual driving in response to updating of the LDM or an urgent notification from the traffic information or the like, the driving mode switching control unit 154 notifies the driver of the fact by issuing a notification or an alert.

If the degree of urgent is high, the driver should immediately ascertain the conditions and start manual driving. As a procedure of the driver after the driver is encouraged to return to the manual driving, it is possible to state that visually checking the conditions on the front side and moving on to actions to be taken next are the most reasonable procedure from a standpoint of human engineering (ethology).

That is, in a case in which the driver who is working on the secondary task receives a notification or an alert of returning to the manual driving, it is possible to state that visually checking the front side of the vehicle first, instantaneously ascertaining urgency by directly perceiving the conditions with eyes, and checking a presented message, ascertaining the conditions, or moving on to the next action after the stages are a favorable procedure.

Therefore, it is important to accurately detect that the driver has visually checked the conditions on the front side of the vehicle immediately after interrupting the secondary task.

Thus, the driver is allowed to send a front side pointing and checking sign by pointing the front side of the vehicle with an index finger while viewing the front side of the vehicle, as one of methods for accurately recognizing that the driver has accurately ascertained the conditions on the front side. It is possible to determine that the driver has interrupted the secondary task and visually checked the front side of the vehicle, by detecting such an action.

A large number of business owners who operate trains, buses, and the like in Japan recommend pointing and checking to drivers, conductors, and the like as a procedure for safety checking or introduce the pointing and checking as a rule. The pointing and checking further work as an auxiliary guidance for catching the line of sight in an early stage and have been used for many purposes for safety checking.

The driver perceives a target on a line of sight, moves their hand, and finally points the target such that the finger tip and the target substantially overlap one another on a line extended from the line of sight.

In a case in which the driver does not view the front side when the driver performs such pointing or in a case in which the driver has a difficulty in performing the pointing, there is a high possibility that the driver has insufficiently ascertained the conditions of the road on the front side of the vehicle.

In contrast, in a case in which the driver performs the action of pointing the front side of the vehicle while viewing the front side of the vehicle, there is a high possibility that the driver has properly ascertained the conditions of the road on the front side of the vehicle since the action is an action of intentionally positioning the finger tip.

Thus, the procedure of ascertaining the front side of the vehicle and sending the front side pointing and checking sign is defined as a procedure in a case of encouraging the driver to return to the manual driving during traveling in the automatic driving mode. It is possible to ascertain the awake state of the driver by allowing the driver to perform the action in accordance with the procedure and detecting it by the driving state detection unit 142.

Figure 4:
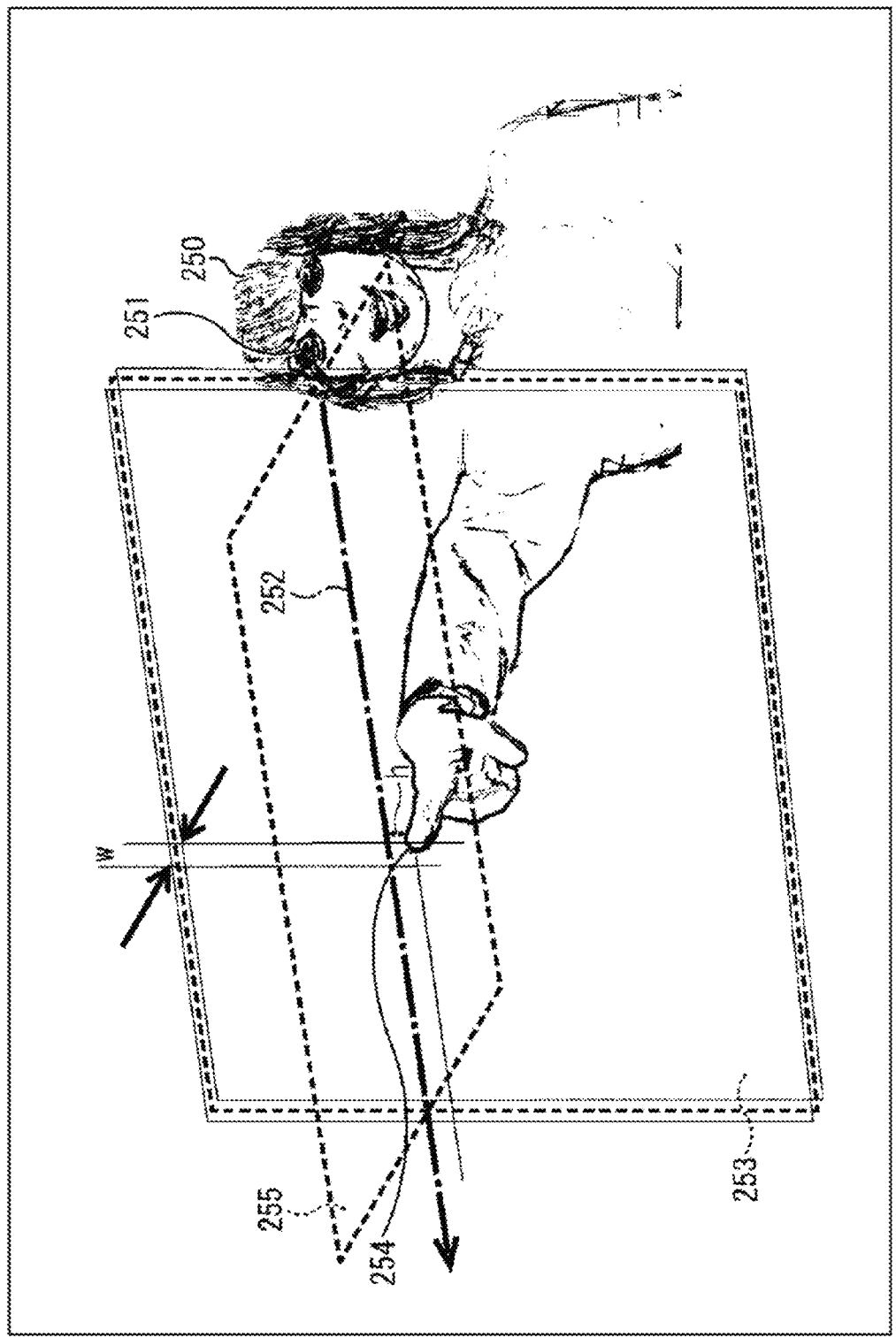
FIG. 4 is a diagram for explaining gesture recognition switching determination.

FIG. 4 is a diagram illustrating an example of the front side pointing and checking sign detected by the driving state detection unit 142.

As represented by the broken line in FIG. 4, a vertical plane 253 is set to include a direction of a line of sight 252 of a driver 250 with reference to a position of a right eye 251 of the driver 250, for example. The vertical plane 253 is a virtual plane that is substantially vertical to the road surface and is substantially parallel to the advancing direction. However, since the road on which the vehicle is traveling is not limited to a straight road, the direction is not necessarily restricted to a uniform direction, and the direction may be applied from the LDM information.

In addition, a parallel plane 255 is set to include the direction of the line of sight 252 of the driver 250 with reference to the position of the right eye 251 of the driver 250 as represented by the broken line in FIG. 4. The parallel plane 255 is a virtual plane that is set at the height of the eyes and is substantially parallel to the road surface.

The pointing and checking may be seemingly considered to be troublesome. However, if the driver accurately perceives the advancing direction and sends the front side pointing and checking sign in a state in which the awareness is completely directed to the driving from the secondary task such as taking a nap, a straight line that passes through the eyes (a dominant eye or both eyes) and a finger tip 254 of the driver 250 and is directed to the vehicle advancing direction substantially coincides with the line of sight 252 of the driver 250.

At that time, the finger tip 254 is located within a range with a width w in the vicinity that is set relative to the vertical plane 253 as a center and is located below the line of sight 252 of the driver 250 by a distance h so as not to interrupt the line of sight 252 of the driver 250. The distance h represents a distance from several millimeters to several centimeters, for example.

Figure 5:
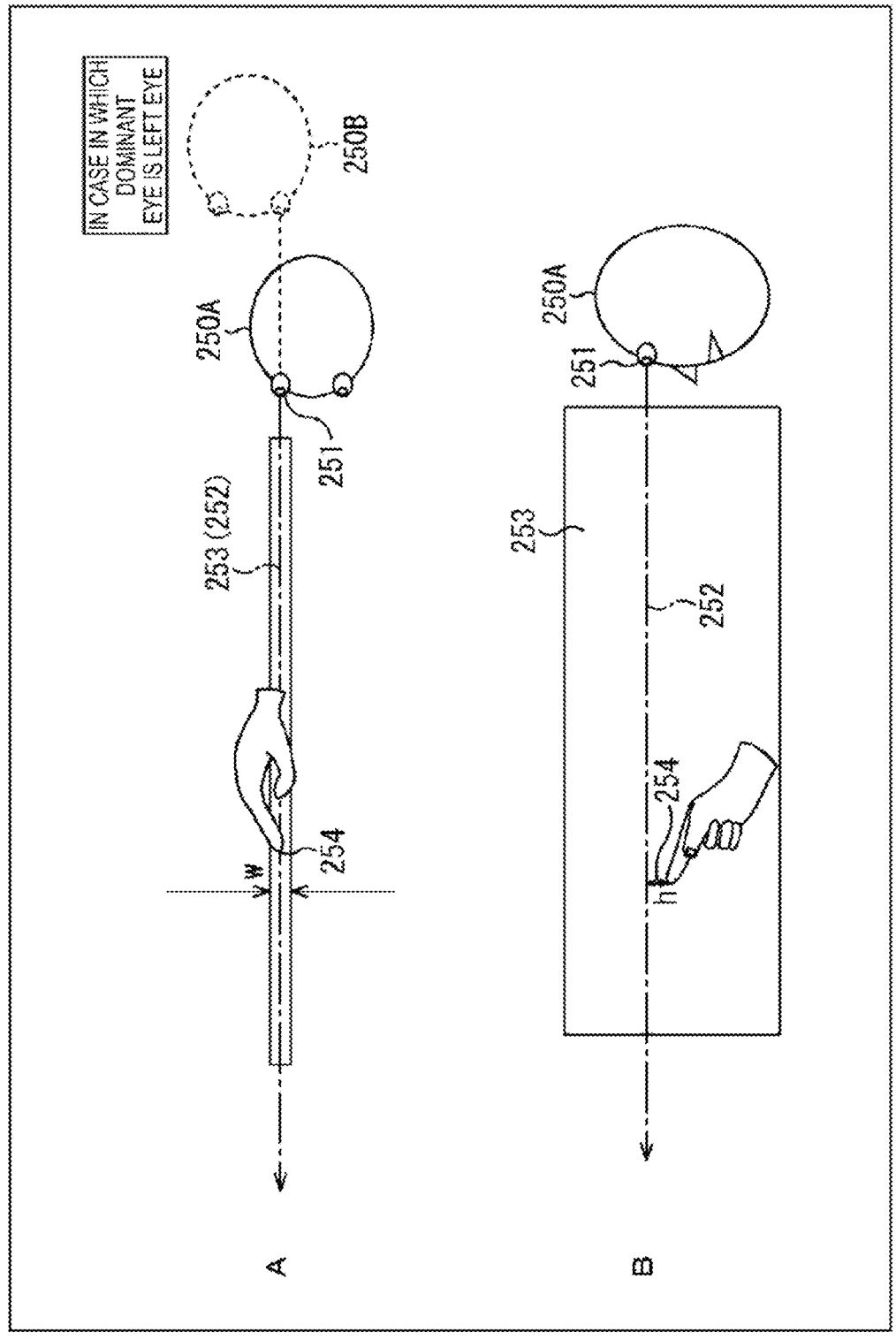
FIG. 5 is a diagram for explaining gesture recognition switching determination.

A of FIG. 5 is a plan view of a driver 250A who is viewing the vehicle advancing direction in a case in which the dominant eye is a right eye when viewed from the upper side. Note that, in A of FIG. 5, a driver 250B is also represented by the broken line in a case in which the dominant eye is a left eye. B of FIG. 5 is a diagram of a state of the driver 250A when viewed from the side.

A of FIG. 5 illustrates the vertical plane 253 set with reference to the position of the right eye 251. The vertical plane 253 includes the direction of the line of sight 252 of the driver 250A. The driving state detection unit 142 detects that the driver 250A is stopping the finger tip 254 within the specific range w with the vertical plane 253 interposed therebetween as illustrated in A of FIG. 5 in an image of the driver 250A, as an action of the front side pointing and checking sign.

The position of the finger tip 254 is detected by tracking the position with a ToF sensor or the like. Note that the target of the tracking is not limited to the finger tip and may be a finger, a hand, a fist, or the like.

Note that individual characteristics obtained through learning performed by the learning unit 126 are used for detecting the front side pointing and checking sign since there are individual differences depending on the driver.

B of FIG. 5 illustrates a positional relationship of the right eye 251, the line of sight 252, and the finger tip 254 when viewed from the side. Since the pointing is performed mainly for the purpose of checking the vehicle advancing direction, the position of the finger tip 254 when the pointing is performed is a position at which the finger tip 254 does not interrupt the line of sight 252 of the driver viewing the advancing direction.

The driving state detection unit 142 detects a gesture action of the finger tip 254 located at the position below the line of sight 252 by the distance h as illustrated in B of FIG. 5, as the front side pointing and checking sign action.

It is possible to ascertain that the driver 250 has become conscious of manual driving and is in an awake condition by detecting the front side pointing and checking sign as described above.

Note that the method of detecting the front side pointing and checking sign is not limited to the aforementioned method. A sign detector with a function of recognizing a combination action of various kinds of actions, such as motion of the line of sight, motion of the head, the action of pointing the advancing direction with a finger or a hand, as a predetermined gesture may be provided in the vehicle control system 11.

Figure 6:
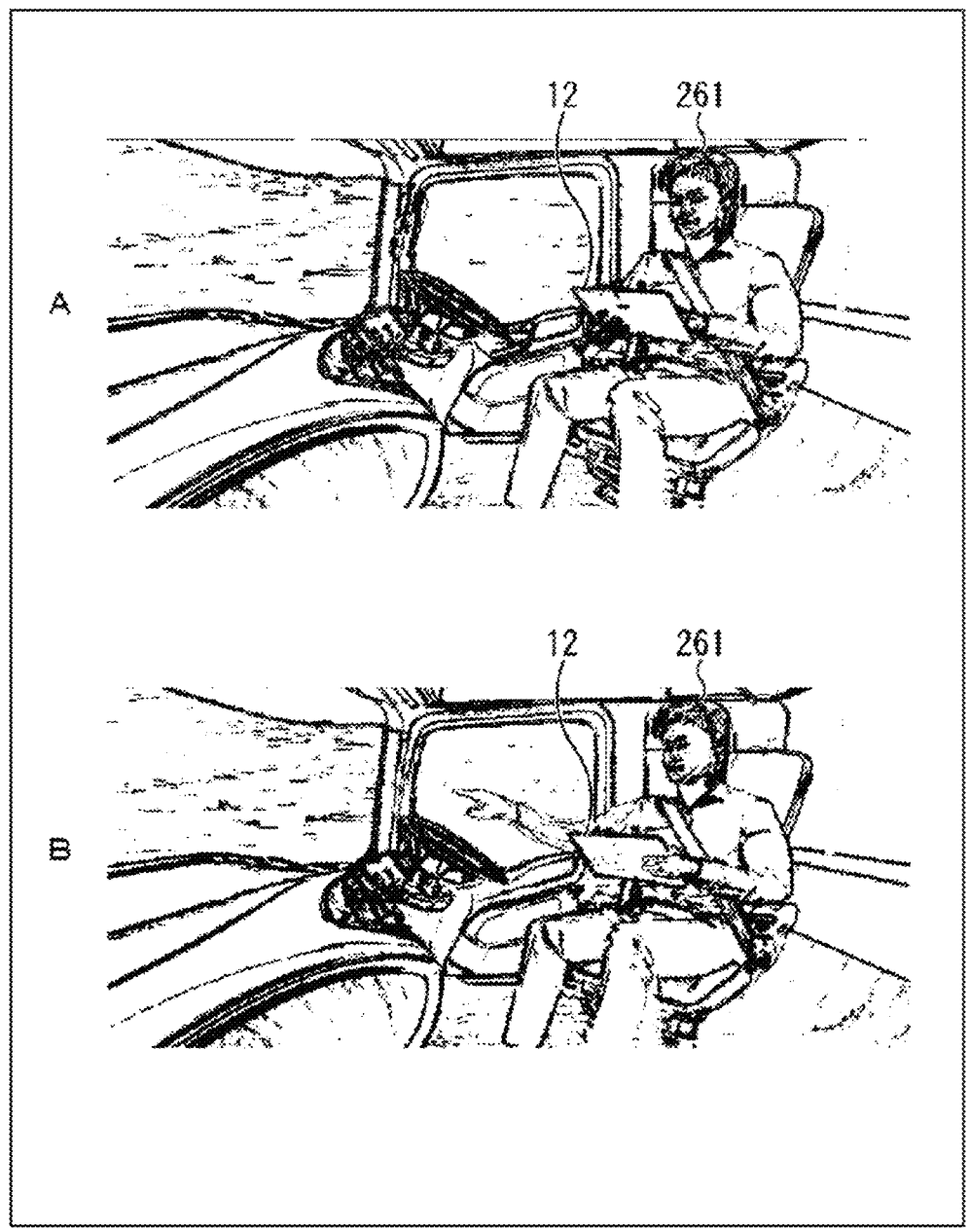
FIG. 6 is a diagram for explaining gesture recognition switching determination.

FIG. 6 is a diagram illustrating an example of a procedure for the front side pointing and checking sign.

A of FIG. 6 illustrates a driver 261 that is working on a secondary task by using a mobile terminal 12 during automatic driving of a vehicle. The mobile terminal 12 is a smartphone, a tablet terminal, or the like. In A of FIG. 6, it is assumed that the driver 261 is performing processing of a slip of a delivered article, checking a next delivery destination, and the like as a secondary task.

Then, the driver 261 releases at least one hand from the secondary task and sends the front side pointing and checking sign as illustrated in B of FIG. 6.

This front side pointing and checking sign includes meaning that the driver expresses that the driver has interrupted the work, has paid attention to the front side, and has become conscious of taking over the manual driving.

Since it is assumed that the secondary task is performed at a location other than the driver's seat, a seated action of the driver 261 on the driver's seat may be detected, and after the detection, the pointing action of the driver 261 may be detected.

Note that the seated action may be detected on the basis of load evaluation on a seat on which the driver is seated.

In addition, the detection of the seated action may be triggered by a notification of returning to the manual driving, an alert, an alarm, or the like.

For example, it is assumed that returning to the manual driving has approached due to occurrence of an unexpected event during traveling in a section in which the automatic driving is supposed to be possible in the state in A of FIG. 6.

At this time, a notification or an alert for switching to the manual driving mode (takeover to the manual driving) is provided in the vehicle control system 1. The driver 261 receives the notification or the alert and then sends the front side pointing and checking sign as illustrated in B of FIG. 6. This enables the driver to quickly takeover the driving.

Note that information regarding a point of the takeover to the manual driving may be displayed on a monitor such as a matrix array display unit or the like on an entire or partial surface of the mobile terminal 12 or the instrument panel after the driver 261 sends the front side pointing and checking sign. The degree of wakefulness of the driver may be detected by detecting a response operation of the driver 261 who has received such information provided.

In a case in which the vehicle control system 11 has a difficulty in precisely ascertaining whether or not the driver's awareness is awake, it is necessary to decelerate or stop the vehicle in order to secure safety of the traveling vehicle.

However, if the procedure of decelerating or urgently stopping the vehicle in relation to the switching to the manual driving mode is executed in an infrastructure with a large amount of traffic, there is a large influence on the following cars, restriction of the traffic volume immediately causes a traffic jam and causes economic loss, which is unfavorable.

In addition to the procedure for the front side pointing and checking sign, another procedure may be used in order to precisely ascertain whether or not the awareness of the driver is awake.

For example, the front side pointing and checking sign may be regarded as an initial procedure as a part of the entire procedure for the takeover to the manual driving, and a procedure of saccade analysis or the like may be added.

In addition, it is also possible to add a procedure for detecting whether or not the driver has performed an action of gripping the steering wheel after detecting the front side pointing and checking sign.

Further, whether or not the driver has started an action for ascertaining conditions may be detected by detecting the line of sight after detecting the front side pointing and checking sign. As the action for ascertaining conditions, an action of rechecking the front side of the vehicle, an action of checking a mirror, a monitor, and the like for checking the rear side, an action of checking a message or a notification presented from the side of the vehicle control system 11, and the like are exemplified. These actions for ascertaining conditions may be detected as predetermined gestures, and it may be determined that the internal state after returning has been achieved.

Figure 7:
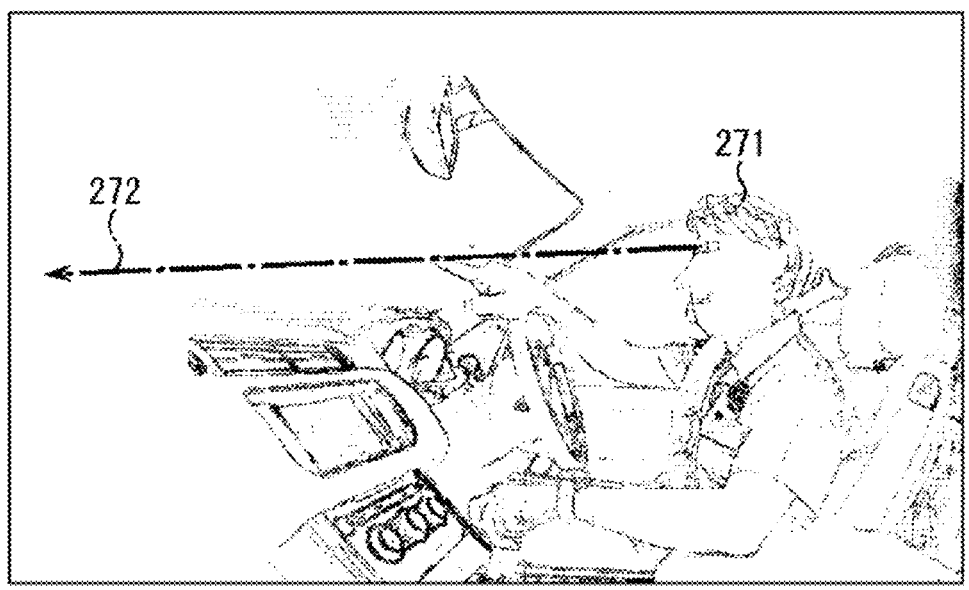
FIG. 7 is a diagram for explaining gesture recognition switching determination.

FIG. 7 is a diagram illustrating an example of the procedure for the front side pointing and checking sign.

As described above, it is possible to regard a driver 271 as having achieved the internal state after returning, in which the driver 271 can perform driving tasks as a primary task, if the driver 271 turns a finger tip, a hand, a fist, and a part of the body toward the front side of the vehicle and it is possible to confirm the driver 271 themselves, the front side pointing and checking sign thereof, and the vertical plane that includes the line of sight 272 of the driver 271 and the road on the front side of the vehicle relative to the road ahead the line of sight 272 of the driver 271, as illustrated in FIG. 7.

Note that for the determination of whether or not the internal state after returning has been achieved, not only the front side pointing and checking sign but also results of detecting whether or not at least an action of checking the vehicle advancing direction and a following action of checking a message, a notification, or the like presented by the vehicle control system 11 have been performed in order may be used.

In a case in which a person desires to quickly know a remote event, the person first takes an action of understanding situations in sight in the vehicle advancing direction instead of viewing a notification screen of an alert or the like and understanding the situations, and then takes an action of viewing a notification screen, which slightly takes time for interpretation. Therefore, this order of actions is important.

<Examples of Automation Levels>

FIG. 8 illustrates examples of automation levels. Here, the examples of the automation levels defined by Society of Automotive Engineers (SAE) will be described. Note that although the levels of the automatic driving defined by SAE are used as reference for convenience in this specification, problems and reasonability thereof in a case in which the automatic driving is widely used have not completely been reviewed in the field, and the levels will not necessarily be interpreted and used as defined. In addition, the utilization form is not necessarily a utilization form that guarantees the content described in the specification.

The automation levels are classified into 5 stages at levels 0 to 4.

The automation level 0 will be referred to as "no driving automation". At the automation level 0, the driver performs all driving tasks.

The automation level 1 will be referred to as "driver assist". At the automation level 1, a system that performs automatic driving (hereinafter, simply referred to as a system) performs subtasks limited to vehicle control in the front-back or left-right direction, for example, from among the driving tasks.

The automation level 2 will be referred to as "partial driving automation". At the automation level 2, the system performs subtasks related to vehicle control in both the front-back and left-right directions from among the driving tasks.

At the automation level 3 will be referred to as "driving automation under conditions". At the automation level 3, the system performs all the driving tasks in a limited region. It has not been clarified what kinds of secondary tasks can actually be executed at this automation level. Although it is considered that the driver can perform works or actions other than driving, such as operations of the mobile terminal 12, telephone meeting, watching a video, playing a game, thinking, and conversation with other passengers, for example, as the secondary tasks during the traveling of the vehicle, there are a large number of problems in terms of safety.

That is, the driver is expected to appropriately take a countermeasure, such as performing a driving operation, in response to a request or the like from the system at the time of preliminary countermeasure (at the time of fallback) against a malfunction of the system or degradation of a traveling environment, within the range of the definition of the automation level 3. In other words, it is necessary for the driver to wait in a quasi-standby state for returning during this period.

The automation level 4 will be referred to as "advanced driving automation". At the automation level 4, the system performs all the driving tasks in a limited region. In addition, the driver is not expected take a countermeasure, such as performing a driving operation, at the time of the preliminary countermeasure (at the time of fallback). Therefore, the driver can perform the secondary task in a true sense during the traveling of the vehicle and can take a nap depending on the conditions.

Therefore, at the automation levels 0 to 2, the driver performs an entirety or a part of the driving tasks, and the driver subjectively performs monitoring and taking countermeasures related to safe driving. At these three automation levels, the driver is asked for to constantly have ability of returning to the driving as needed. Therefore, the driver is not permitted to perform secondary tasks other than driving, which may degrade attention during traveling or damage attention to the front side.

Meanwhile, at the automation levels 3 and 4, the system performs all the driving tasks, and the system subjectively performs the monitoring and taking countermeasures related to the safe driving. However, there is a case in which it is necessary for the driver to perform the driving operations at the automation level 3. In addition, there is a case in which there is a section, to which the automation levels 3 and 4 are not able to be applied, on a part of a traveling route, and the automation level is set to 2 or lower for such a section, and it is necessary for the driver to intervene in the driving.

Note that since it is difficult to ascertain the degree of wakefulness of the driver in a case in which the driver is permitted to perform the secondary task during the automatic driving, execution of secondary tasks is still legally inhibited, and a progress of the discussion has been suspended. However, since it is possible to significantly effectively check the ability of the driver to returning to the driving by the front side pointing and checking (gesture recognition) sign according to an embodiment of the present technology, permission of the execution of the secondary tasks can be sufficiently expected.

Since automobile manufactures can construct a mechanism for ensuring safety by performing checking through a notification at a necessary timing even if the driver executes the secondary task during the automatic driving, which is the best advantage of the automatic driving, the manufactures can have great expectations.

<Switching Between Driving Modes>

Note that driving that asks for the driver to intervene in the driving in some form and directly affect the driving of the vehicle will be referred to as "manual driving" in the following description. Therefore, the manual driving is performed at automation levels 0 to 2. As illustrated in FIG. 8, the driving mode at the automation levels 0 to 2 will be referred to as a manual driving mode.

Meanwhile, driving that does not ask for intervention of the driver at all will be referred to as an autonomous automatic driving (automatic driving) in the following description. Therefore, the automatic driving is basically performed at automation levels 3 and 4. However, there is a case in which it becomes necessary to perform the manual driving in response to a request from the system at the automation level 3. That is, since it is necessary that the dropping off of the driver from the driving operation be limited at the automation level 3, the automatic driving is performed with attention. Therefore, the driving mode at the automation level 4 will be referred to as an automatic driving mode while the driving mode at the automation level 3 will be referred to as an automatic driving-with-attention mode.

Note that the framework of the present technology is based on the idea that use of the automatic driving at the level 3 that is defined as automatic driving with attention is not suitable as a driving mode that is continuously used for a long period of time from the standpoint of human engineering. Therefore, it is possible to state that the automatic driving at the level 3 is a traveling section that significantly troubles the driver depending on the utilization form since the driver has to continue a vague state in which the driver has a difficulty in completely focusing on the secondary task regardless of the fact that the driver has a difficulty in directly intervening in the steerage for driving.

It is a matter of course that although the secondary tasks are limited to those from which the driver can return to the driving in a short period of time, the driver may unconsciously become sleepy or may focus on the secondary task without noticing the fact in a case in which a monotonous condition continues due to biological characteristics of a human even though it is possible to apply legal restriction to the use at the level 3 from a viewpoint of practical use.

That is, the automatic driving mode at the level 3, in which the vehicle travels by the automatic driving with attention, is not a mode on the assumption of a continuous long-term utilization. The automatic driving mode at the level 3 is an automatic driving mode that is limited to utilization for allowing the driver to return and stand by as a backup for a short period of time in a case in which there is a difficulty or a risk in passing through a section while keeping the autonomous automatic driving and utilization as a buffer section when the driving mode is witched from the automatic driving mode at the level 4. However, the automatic driving mode at the level 3 may be constantly used as long as the automatic driving mode is limited to utilization in combination with a way by which the driver constantly maintains consciousness connection for waking and returning to the driving through viewing of a tablet screen or the like by operating the mobile terminal device.

The utilization in the buffer section is based on an idea that the automatic driving mode is prepared for passing through the buffer section for switching from the automatic driving mode at the level 4 to the manual driving mode since the rapid returning is accompanied with a hazard that the likelihood of the wakefulness and the returning may insufficiently be checked.

Providing the technology of the system that appropriately includes and executes this buffer section mode has a purpose of avoiding occurrence of many vehicles that fail to perform the takeover, avoiding occurrence of traffic jams due to such vehicles that fail to perform take over in a road infrastructure environment, and ensuring a healthy road infrastructure environment.

Here, it is determined whether or not it is possible to switch from the automatic driving mode to the manual driving mode in accordance with reactivity and a degree of wakefulness of the driver detected by using gesture recognition, saccade information, steering wheel operations, or sound recognition, and the switching is executed as needed according to an embodiment of the present technology.

Figure 9:
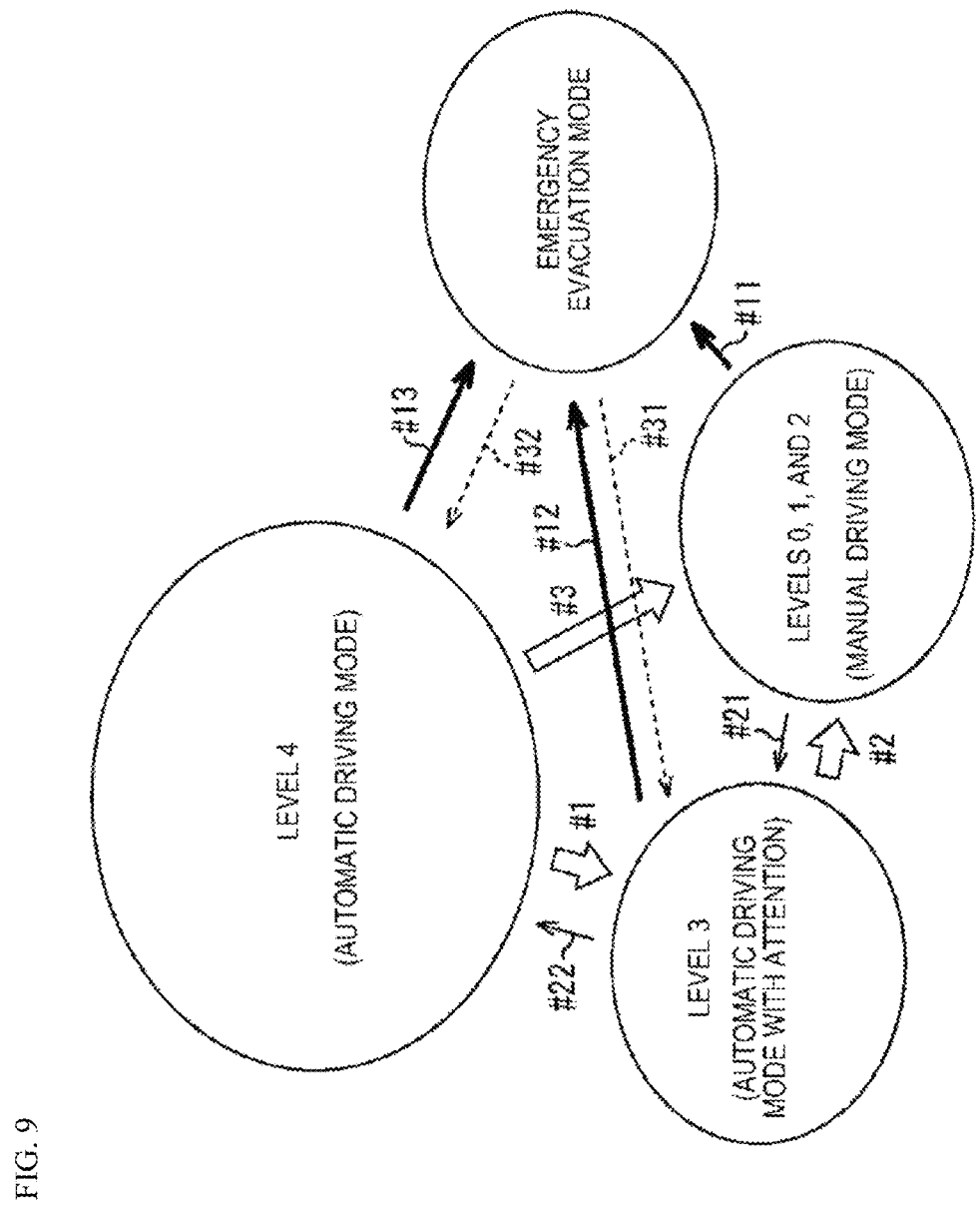
FIG. 9 is a transition diagram illustrating switching between driving modes.

FIG. 9 is a transition diagram illustrating switching between driving modes. This switching from the automatic driving mode to the manual driving mode also includes switching from the automatic driving mode at the automation level 4 to the automatic driving-with-attention mode at the automation level 3 to include the meaning that the driving operation of the driver may slightly intervene in the driving, as represented by the outlined white arrow #1 in FIG. 9.

The switching from the automatic driving mode to the manual driving mode also includes switching from the automatic driving-with-attention mode at the automation level 3 to the manual driving mode at the automation levels 0, 1, and 2 as represented by the outlined while arrow #2 in FIG. 9.

The switching from the automatic driving mode to the manual driving mode also includes switching from the automatic driving mode at the automation level 4 to the manual driving mode at the automation levels 0, 1, and 2 as represented by the outlined while arrow #3 in FIG. 9.

Since the mode transition occurring during this time is basically limited to a case in which the ability of the driver returning to the manual driving at the automation level 4 is ensured, active steerage ability of the driver is not observed (determined) until immediately before the switching. Therefore, a situation that allows for the switching is limited to a case in which the road is straight and includes no hazards, safety of the road is ensured, and it is possible to address driver's failure to perform the takeover with remaining ADAS functions, such as an LKAS or ACC, for steerage ability defect of the driver just in case. Alternatively, the takeover is not completed until the manual driving ability of the driver is determined in response to a request from the user, and it is also assumed that if the control with intervention of the steerage is transferred to the driver in a stage in which detection of steerage is not reliable, operations performed by the driver who is half asleep induce an accident.

Therefore, the vehicle control unit 28 that manages control of the vehicle sets a section at the automation level 3 before the vehicle enters a section for which it is necessary to switch from the automatic driving to the manual driving during the traveling, advances determination of the ability of the driver returning to the driving during that time, and prepares for the entrance to the section through which the vehicle can travel at the automation level 2 or lower at maximum.

In a case in which it is not possible to detect the reactivity and the degree of wakefulness of the driver at the time of the switching represented by the outlined white arrows #1, #2, and #3, the driving mode is shifted to the emergency evacuation mode as represented by the thick-line arrows #11, #12, and #13. Note that the manual driving mode at the automation levels 0, 1, and 2 is shifted to this emergency evacuation mode even in an urgent situation, such as a change in body conditions.

Note that although the emergency evacuation mode will not be described in detail in the specification, the emergency evacuation mode has two functions in practice. The first function is a function of causing the vehicle to perform emergency evacuation travel to a safe evacuation location in a case in which it becomes difficult to continue the assumed ordinary traveling or to perform takeover due to the degree of wakefulness, rapid change in body conditions, or the like of the driver of the vehicle that has performed ordinary traveling.

The second function is a function for securing a transportation even in a state in which the driver has no steerage ability, as a way of urgently moving to a hospital or the like from a poor transportation area in which driving ability is originally low. In particular, the second function is a function with low priority placed on the moving speed itself and is one of traveling modes of the automatic driving for the purpose of securing movement by combining remote assist, leading vehicle traveling assist, and the like.

As represented by the solid-line arrows #21 and #22 in FIG. 9, whether or not switching from the manual driving mode at the automation levels 0, 1, and 2 to the automatic driving-with-attention mode at the automation level 3 or from the automatic driving-with-attention mode at the automation level 3 to the automatic driving mode at the automation level 4 can be executed is determined in response to a request from the driver in accordance with an LDM, a weather, event occurrence information of the road through which the vehicle set to travel will advance thereafter, returning possibility information at the time when the driver is asked for to return, and the like.

In particular, if the vehicle that is manually driven is returned to the automatic driving without letting the driver notice the fact in the case of the solid-line arrow #21, a case in which the driver may unconsciously misunderstand that use of the automatic driving may occur when the driver uses the vehicle. This case is unfavorable since there is a risk of a hazardous situation if the driver may consider the vehicle, which is actually in a manual driving mode, is traveling by the automatic driving, performs a secondary task for a moment, and focuses on the secondary task even though this may happen at a significantly low probability.

Note that shifting from the emergency evacuation mode to the automation level 3 or the automation level 4 as illustrated by the broken-line arrows #31 and #32 in FIG. 9 targets only a special case of transporting a patient in an urgent situation, for example.

As a use case that is assumed as a utilization form, a case in which a passenger who has a difficulty in waiting for arrival of an emergency vehicle moves by utilizing the automatic driving level 4 in a section in which the automatic driving at the level 4 is possible, in order to move to a highway service area at an intermediate location, or the like, can be considered. In a case in which an ordinary user moves on to the emergency evacuation mode due to failure of the takeover, a procedure of returning only after a predetermined procedure such as recording about the failure of returning, which is not illustrated in the drawing, is employed.

It is possible to extend a route including both a section in which the automatic driving is possible and a section in which the manual driving is asked for as a continuous route along which the vehicle can continuously travel without stopping by enabling the driver to safely and smoothly returning to the manual driving in a necessary section. In addition, it is possible to implement automatic driving and takeover thereof in main sections on the traveling route without causing problems in social infrastructure by preventing the driver from completely dropping off from the intervention in the driving operations and enabling the driver to safely and smoothly returning to the manual driving.

In addition, for the returning from the manual driving to the automatic driving, it is possible to prevent the driver who is manually driving from careless misunderstanding that "the vehicle is traveling by the automatic driving" and thus starting execution of the secondary task and to reduce risks of careless accidents due to the misunderstanding during the manual driving mode, by introducing the procedure for notifying the driver of the returning to the automatic driving. Then, mode display or an alert indicating dropping off from the intervention in steerage may further be used together even after the notification in order to further prevent such misunderstanding.

<Automatic Driving Control Processing>

Next automatic driving control processing executed by the vehicle control system 11 will be described with reference to the flowcharts in FIGS. 10 to 12. Note that this processing is started when a power (ignition) switch of the vehicle is turned on, for example.

In Step S1, the driver monitoring unit 26 authenticates the driver. Specifically, the driver imaging unit 101 of the driver monitoring unit 26 images the driver. The authentication unit 104 recognizes the face of the driver in the image of the driver obtained by the imaging.

In addition, the authentication unit 104 specifies the driver by searching for a face image that coincides with the face of the driver from among face images stored in the storage unit 35, for example. For example, face images of the respective users who use the vehicle and information regarding the respective users, such as identification information, are linked and managed together by the storage unit 35.

In a case in which the driver can be specified, the authentication unit 104 determines that the authentication has successfully been performed. In a case in which no driver can be specified, the authentication unit 104 determines that the authentication has failed. The authentication unit 104 supplies the results of authenticating the driver to the vehicle control unit 28. Note that another way such as fingerprint authentication, vein authentication, or iris authentication may be used instead as a technology for authenticating the driver.

Note that in a case in which the authentication of the driver has failed, traveling of the vehicle may be inhibited. In this case, the driver may be allowed to travel by the vehicle by performing a predetermined operation in an environment in which security is secured to newly perform user registration.

However, a main purpose of authenticating the user is to extract correlations between features of driving operations of the authenticated driver and states of the driver and to control the vehicle in accordance with the correlations. Therefore, the results of authentication are not necessarily used to control of permission or inhibition of the traveling of the vehicle. In this manner, it is possible to permit traveling in an unauthenticated state in an urgent situation, for example. Note that the surroundings may be notified of the fact that the vehicle is traveling in the unauthenticated state by using a display lamp, vehicle-to-vehicle communication, or the like.

In Step S2, the log generation unit 125 starts recording of logs.

In Step S3, the vehicle control unit 28 acquires a destination. Specifically, a passenger (not necessarily the driver) of the vehicle inputs the destination via the input unit 24.

The input unit 24 supplies the acquired information indicating the destination to the vehicle control unit 28.

Note that since development of sound recognition using artificial intelligence can be expected in the future, conversation-type destination setting or traveling preference setting may be performed.

In Step S4, the vehicle control system 11 starts to acquire surroundings information in approaching sections in accordance with advancement as well as weathers, events, and the like in all corresponding sections that affect an assumed route to the destination and traveling through the sections.

For example, the surroundings imaging unit 21 starts to image the vehicle advancing direction and the surroundings and supply the surroundings image obtained by the imaging to the vehicle control unit 28.

The surroundings information acquisition unit 22 starts to acquire surroundings information related to an environment, objects, and the like in the surroundings of the vehicle from a millimeter-wave radar, a laser radar, a ToF sensor, a sonar, a raindrop sensor, an external light sensor, a road surface state sensor, and the like and supply the surroundings information to the vehicle control unit 28.

The vehicle information acquisition unit 25 starts to acquire vehicle information and supply the vehicle information to the vehicle control unit 28.

The position measurement unit 23 starts to measure a current position of the vehicle and supply the measurement result to the vehicle control unit 28.

The communication unit 27 starts to receive a local dynamic map (LDM) from an ITS spot (not illustrated) and supply the LDM to the vehicle control unit 28. In addition, the communication unit 27 starts to receive map data and the like from a server (not illustrated) and supply the map data and the like to the vehicle control unit 28. Note that the map data may be stored in the storage unit 35 in advance and the vehicle control unit 28 may acquire the map data from the storage unit 35.

Further, the communication unit 27 starts to receive various kinds of traffic information from a road-side machine (not illustrated) and supply the traffic information to the vehicle control unit 28. In particular, acquisition of the latest update information by the communication unit 27 enables updating of risk change points that have changed over time from the map information acquired in advance.

Note that information related to the map, such as the LDM and the map data will be collectively referred to as map information in the following description.

The surroundings monitoring unit 121 starts to monitor the surroundings of the vehicle on the basis of the surroundings image from the surroundings imaging unit 21, the surroundings information from the surroundings information acquisition unit 22, and the various kinds of information from the communication unit 27.

The route setting unit 151 corrects the current position of the vehicle as needed on the basis of information acquired from the surroundings monitoring unit 121 and the acceleration, the angular speed, and the like of the vehicle that are included in the vehicle information supplied from the vehicle information acquisition unit 25. In this manner, an error of the estimated current position of the vehicle due to information to which temporal changes in the map information have not been reflected and errors in detection, determination, and the like performed by the position measurement unit 23, for example, are corrected.

In Step S5, the route setting unit 151 starts to set a traveling route. Specifically, the route setting unit 151 sets a travelling route from the current position or a designated position to the destination in consideration of driving ability and the like of the driver on the basis of the map information. In addition, the route setting unit 151 changes the traveling route or presents route options as needed on the basis of information such as a time zone, a weather before arriving at the destination, traffic jams, and traffic regulation.

In Step S6, the automation level setting unit 152 starts to update the automation levels.

Specifically, the automation level setting unit 152 sets distribution of automation levels that are allowable on the traveling route (hereinafter, referred to as allowable automation levels) on the basis of the map information, the surroundings information, and the like.

Here, each allowable automation level indicates a maximum value of an automation level that can be set for a target section. For example, the vehicle can travel through a section of an allowable automation level set at the level 3 while setting the automation level to be 3 or lower.

For example, the automation level setting unit 152 sets the distribution of the allowable automation levels on the traveling route as default values indicated on the map information or the like. In addition, the automation level setting unit 152 updates the distribution of the allowable automation levels on the traveling route as needed on the basis of information related to the traveling route and the surrounding environment, such as weathers, road states, accidents, constructions, and traffic regulation obtained from the map information and the surroundings information.

In addition, an allowable automation level may be lowered from an original level 3 to a level 2, or use of LKAS may be inhibited in a section in which it is difficult to recognize compartment lines on roads, such as road studs, paints, and curbstones on the road surfaces, and road indication such as symbols and characters due to accumulated snow, flooding, and the like.

Conditions in each section after the start of the traveling change every moment under a variety of conditions such as hiding of white lines that accompanies accumulated rain, and backlight reflection by road surfaces. In particular, it is necessary to let the driver know changes due to which the driver is asked for to return to the driving in a part of a section that is expected to be passed by continuous automatic driving, and to previously restrict execution of the secondary task.

Furthermore, the allowable automation level may be lowered from the original level 3 to the level 2, or the maximum speed may be restricted, in a section of an unsatisfactory field of view due to smoke generated by fire, dense fog, or the like.

The allowable automation level is lowered to the level 1 or 0 in a section in which an accident has occurred or a falling object has been detected.

For example, the restriction speed is lowered, or the allowable automation level is lower to the level 1 or 0, in a section in which road surfaces have been frozen or on a bridge blown by strong side wind.

The automation level setting unit 152 updates distribution of allowable automation levels on the traveling route as needed on the basis of such restriction.

In Step S7, the vehicle control system 11 starts to monitor the driver.

Specifically, the driver imaging unit 101 of the driver monitoring unit 26 starts to image the driver and supply the image of the driver obtained by the imaging to the vehicle control unit 28.

The biological information acquisition unit 102 starts to acquire biological information of the driver and supply the biological information to the vehicle control unit 28.

The line-of-sight detection unit 103 may be a block specialized to the eyeball analysis and starts to detect an orientation of the face of the driver, an orientation of the line of sight, blinking, and motion of the eyeballs (for example, visual fixation, saccade, and the like) and supply the detection result including such respective information items to the vehicle control unit 28.

The driving behavior analysis unit 141 starts to analyze driving behaviors of the driver on the basis of the image of the driver, the vehicle information, and the results of learning performed by the learning unit 126.

The driving state detection unit 142 starts to detect a state of the driver on the basis of the image of the driver, the biological information of the driver, the result detection performed by the line-of-sight detection unit 103, the results of authentication performed by the authentication unit 104, the results of learning performed by the learning unit 126, and the like.

For example, the driving state detection unit 142 starts to detect a posture, an action, and the like of the driver.

In addition, the driving state detection unit 142 detects reactivity and a degree of wakefulness of the driver, for example. The results of detecting the reactivity and the degree of wakefulness of the driver are supplied from the driving state detection unit 142 to the switching determination unit 155.

The switching determination unit 155 determines switching from the automatic driving mode to the manual driving mode on the basis of at least one of these results of the detection when there is necessity to switch from the automatic driving mode to the manual driving mode. The determination of the switching from the automatic driving mode to the manual driving mode is performed after a notification about the switching between the driving modes to the driver.

Here, the reactivity of the driver is defined on the basis of a request, an instruction, and a stimulus from the outside, presence of reaction of the driver against obstruction in the vehicle advancing direction, a reaction speed, how appropriate the reaction is, and the like. The reactivity of the driver deteriorates in a case in which the driver does not pay attention to the driving, a case in which the driver intentionally does not react, and the like in addition to the case in which the degree of wakefulness of the driver has been lowered.

Examples of a method of detecting the reactivity and the degree of wakefulness of the driver include passive monitoring and active monitoring.

In the passive monitoring, the reactivity and the degree of wakefulness of the driver are detected by passively detecting the state of the driver.

For example, the reactivity and the degree of wakefulness of the driver are detected on the basis of motion of the driver such as transition of the orientation of the face, transition of the orientation of the line of sight, a frequency of blinking, and transition of eyeball motion. For example, movement of the line of sight relative to a target, visual fixation, and the like which correlate with field-of-vision information in a real space obtained by the surroundings imaging unit 21, the surroundings information acquisition unit 22, and the like are observed, and on the basis of the result, the reactivity and the degree of wakefulness of the driver are detected with reference to learned eyeball behaviors specific to the driver.

For example, the degree of wakefulness of the driver is detected on the basis of biological information such as a heart rate and body odor of the driver.

For example, changes in the reactivity and the degree of wakefulness are detected by observing transition in driving operations, such as steerage stability and an operation speed of steering wheel, and operation stability, operation speeds, and the like of the accelerator pedal and the brake pedal, of the driver over time. Note that since these reactions of the driver have characteristics specific to each driver, characteristics in accordance with conditions of the driver may be learned, and the reactivity and the degree of wakefulness of the driver may be detected on the basis of the results of learning.

In a case in which the driver is sleeping or executing the secondary task and is in a situation in which it is not necessary to hurry the driver to return to the drive, for example, the detection may be performed by the passive monitoring in order not to bother the driver. In addition, quasi-passive monitoring from reflected signals of emitted infrared rays or other electromagnetic waves may be performed. However, in these complete passive scheme or the quasi-passive scheme, the responding reaction of the driver is not directly observed, and reliability of the results of the detection is poor.

In a case in which infrared light that is used by the ToF camera or for recognition of the line of sight is projected, the aforementioned quasi-passive scheme originally corresponds to an active scheme. However, this will be described as quasi-passive monitoring in the specification in order to distinguish it from an active scheme in which a responding reaction of the driver which will be described below is observed.

In the active monitoring, the reactivity and the degree of wakefulness of the driver are detected by giving a visual, audible, or tactile stimulus, instruction, or the like to the driver and observing a reaction (response) of the driver in response to the given stimulus, instruction, or the like.

The active monitoring is used in a case in which it is difficult to detect the reactivity and the degree of wakefulness of the driver by passive monitoring or in a case in which a frequency of detection is increased, for example.

There is a case in which the intervention of the driver in the traveling operation device is completely interrupted if the automation level becomes 3 or higher, for example, and in this case, it is not possible to detect the reaction of the driver from operation conditions of the steerage device any more even if the operation conditions of the traveling operation device are monitored. The active monitoring is an effective way for enabling reliable ascertaining of the state of the driver even in such a state. That is, the active monitoring has a function of compensating for the passive monitoring. In addition, the active monitoring is used to wake up the driver by giving a stimulus, for example.

Note that the detection of the reactivity and the degree of wakefulness of the driver may be performed after a notification about switching to the manual driving mode to the driver or may be performed when there is a correcting operation by using the traveling operation device.

The driving state detection unit 142 can detect the degree of wakefulness of the driver by controlling the display unit 29 such that the display unit 29 is caused to display a short word or a number in the field of view of the driver and encourage the driver to loudly read the word or the number, or display a simple equation and encourage the driver to pronounce a calculation result.

In addition, the driving state detection unit 142 detects the reactivity and the degree of wakefulness of the driver by controlling the display unit 29 such that the display unit 29 is caused to display a quasi-target that becomes a destination of the line of sight in the field of view of the driver and tracking motion of the line of sight of the driver. Note that an internal awake state of the driver may be analyzed in detail from observation of behaviors and actions such as occurrence of saccade, slight movement of visual fixation, and drifting of the driver with respect to the field of vision that enters the field of view during the traveling by analyzing eyeball behaviors of the driver.

The driving state detection unit 142 detects the reactivity and the degree of wakefulness of the driver by controlling the sound output unit 30 such that the sound output unit 30 outputs a simple instruction (for transversely shaking their head, for example) to the driver and observing a reaction of the driver in response to the instruction.

The driving assist control unit 153 controls the traveling control unit 33 in accordance with the instruction from the driving state detection unit 142 such that the vehicle is caused to unnaturally travel within a range in which safety can be secured. Then, the driving state detection unit 142 detects the reactivity and the degree of wakefulness of the driver on the basis of driver's steerage to amend the traveling in response to the unnatural traveling or an operation reaction.

Note that processing of detecting the reactivity and the degree of wakefulness of the driver on the basis of reactions of the driver against unnatural traveling of the vehicle is similar to the aforementioned processing performed by the traveling control unit 33, the driving state detection unit 142, and the driving assist control unit 153 described above with reference to FIG. 3, and modification examples will be described below.

Modification Example 1

As the unnatural traveling, application of offset, such as shaking a course in the left-right direction relative to a traffic lane is exemplified. However, the unnatural traveling is not limited to the application of such a type of offset that shakes the vehicle course in the left-right direction, and an instruction for extending a vehicle-to-vehicle distance from a front car than expected (deceleration steerage) may be provided. The driving state detection unit 142 evaluates whether or not the driver takes an action of stepping the accelerator pedal for correction in response to the instruction. In addition, the state of the driver may be evaluated by detecting a frequency of blinking, detection of a state in which the driver closes their eyes, detection of shaking of the head in the front-back direction, and the like.

Any type traveling with deviation or only a feeling may be applied as long as the vehicle is caused to unnaturally travel within a range in which safety can be secured, and another type of active reaction may be applied.

Modification Example 2

In a case in which the steering wheel operation is not performed, for example, the traveling control unit 33 causes the vehicle to meander for a predetermined period of time by changing the direction of wheels or adding a braking load that is horizontally unbalanced to the wheels without turning the steering wheel. In this case, the driving state detection unit 142 detects the reactivity and the degree of wakefulness of the driver on the basis of whether or not the driver operates the steering wheel to correct the meandering, a reaction speed, and the like.

Note that it is favorable that the amount of causing the vehicle to meander be within a range in which the driver can unconsciously correct the meandering.

Modification Example 3

The in-vehicle device control unit 34 applies a quasi-turning load corresponding to the case in which the vehicle meanders to the steering wheel in a case in which the vehicle travels normally. In this case, the driving state detection unit 142 detects the reactivity and the degree of wakefulness of the driver on the basis of whether or not the driver operates the steering wheel to stop the turning, a reaction speed, and the like.

Modification Example 4

In a case in which the driver does not react and the meandering drive thus continues, the outside such as the following car may be notified of the fact that abnormality has occurred, on the basis of a decrease in the reactivity, the degree of wakefulness, or the like of the driver via the communication unit 27 or the like.

Modification Example 5

The traveling control unit 33 changes the vehicle advancing direction to a direction in which the vehicle is caused to slightly deviate from the traffic lane for a predetermined period of time. In a case in which the driver pays normal attention to the front side, the driver is expected to perform steerage to correct the direction of the vehicle in this case. However, there is a possibility that a hazardous state occurs depending on a positional relationship with surrounding vehicles if the vehicle advancing direction changes with no conditions. Also, there is a possibility that the following car is performing follow-up traveling.

Therefore, it is favorable that the detection of the reactivity and the degree of wakefulness be performed within a range in which the detection does not adversely affect the surrounding vehicles, by collectively determining conditions such as states of the surrounding vehicles and psychological effects on the driver.

Modification Example 6

The driving assist control unit 153 sets the vehicle-to-vehicle distance to a preceding car to be longer than that set at the ordinary time in a case in which ACC is effective. In this case, the driving state detection unit 142 detects the reactivity and the degree of wakefulness of the driver on the basis of whether or not the driver operates the accelerator pedal to return the vehicle-to-vehicle distance to the length at the ordinary time and a reaction speed.

Modification Example 7

The traveling control unit 33 sets the amount of change in the vehicle advancing direction to be greater or smaller than the ordinary amount with respect to the steerage amount of the steering wheel. In this case, the driving state detection unit 142 detects the reactivity and the degree of wakefulness of the driver on the basis of whether or not the driver operates the steering wheel to adjust the advancing direction in a desired direction and a reaction speed.

Note that it is favorable that a difference between the amount of change at the ordinary time and the amount of change in the vehicle advancing direction in this case be an amount within a range in which the driver can unconsciously correct the advancing direction.

In addition, although there is also an example in which the vehicle is controlled to move at a left-right direction and a responding reaction of the driver is then observed, for example, guidance by optical illusion may be performed by applying a quasi-turning torque to the steering wheel or using a VR without directly applying noise to the control of the vehicle in order to check an active responding reaction in a modification example. Further, the response may be checked by allowing the driver to perform a defined action, such as steerage of turning the steering wheel or pushing or pulling the steering wheel in the front-back direction, in response to a specific torque responding request using sound or the like.

Modification Example 8

The traveling control unit 33 sets the acceleration of the vehicle to be greater or smaller than ordinary acceleration with respect to the amount of stepping the accelerator pedal. In this case, the driving state detection unit 142 detects the reactivity and the degree of wakefulness of the driver on the basis of whether or not the driver operates the accelerator pedal to adjust the speed of the vehicle to a desired speed and a reaction speed.

Note that it is favorable that a difference between the acceleration at the ordinary time and the acceleration of the vehicle in this case be within a range in which the driver can unconsciously correct the acceleration.

Modification Example 9

The traveling control unit 33 sets the deceleration of the vehicle to be greater or smaller than ordinary deceleration with respect to the amount of stepping the brake pedal. In this case, the driving state detection unit 142 detects the reactivity and the degree of wakefulness of the driver on the basis of whether or not the driver operates the brake pedal to adjust the speed of the vehicle to a desired speed and a reaction speed.

Note that it is favorable that a difference between the deceleration at the ordinary time and the deceleration of the vehicle in this case is within a range in which the driver can unconsciously correct the deceleration.

Modification Example 10

In a case in which it is not necessary for the driver to intervene in the driving since the automatic driving is performed, the driver can operate the mobile terminal 12 (information processing apparatus) as a secondary task.

When the driver operates the mobile terminal 12, the driving state detection unit 142 causes the mobile terminal 12 to display a sub-window, which is for presenting an instruction to the driver, on a screen thereof via the communication unit 27. Then, the driving state detection unit 142 detects the reactivity and the degree of wakefulness of the driver on the basis of whether or not the driver reacts normally as asked for by the instruction, a reaction speed, and the like. Examples of indications of driver's response include a double touch operation on the display panel or another operation such as an action of entering a check mark, as a sign sent to a predetermined point to indicate that the driver knows an event in response to a course marker and display for checking the event at a predetermined position during advancement of the vehicle, for example.

Effects

In a case in which attention to the driving has been reduced since the driver thinks something else or the like although the driver views the front side, for example, it is difficult to detect the reactivity and the degree of wakefulness of the driver only by the passive monitoring in some cases. Using the active monitoring enables observation in the form of perception responding reaction of the driver in response to the notification and enables improvement in accuracy of detecting the reactivity and the degree of wakefulness. If the driver as a user usually broadly focuses on the secondary task and a frequency at which it is necessary to return to the manual driving decreases with distribution of the automatic driving, sensuous necessity to completely return to the driving voluntarily decreases. However, since the driver seamlessly and subjectively performs takeover by the intuitive action implemented by an embodiment of the present technology, in which the front side is checked through pointing and checking at the necessary time, eyeball behaviors are further checked, and subsequently, reliability of steerage actions performed on the actual device is actively checked, the driver can perform the takeover form the automatic driving to the manual driving with ensured safety and with less troubles.

Note that other types of states, such as an awareness state, a mental state, a tension state, and a drug influencing degree, may be detected as well as the aforementioned state of the driver.

Figure 10:
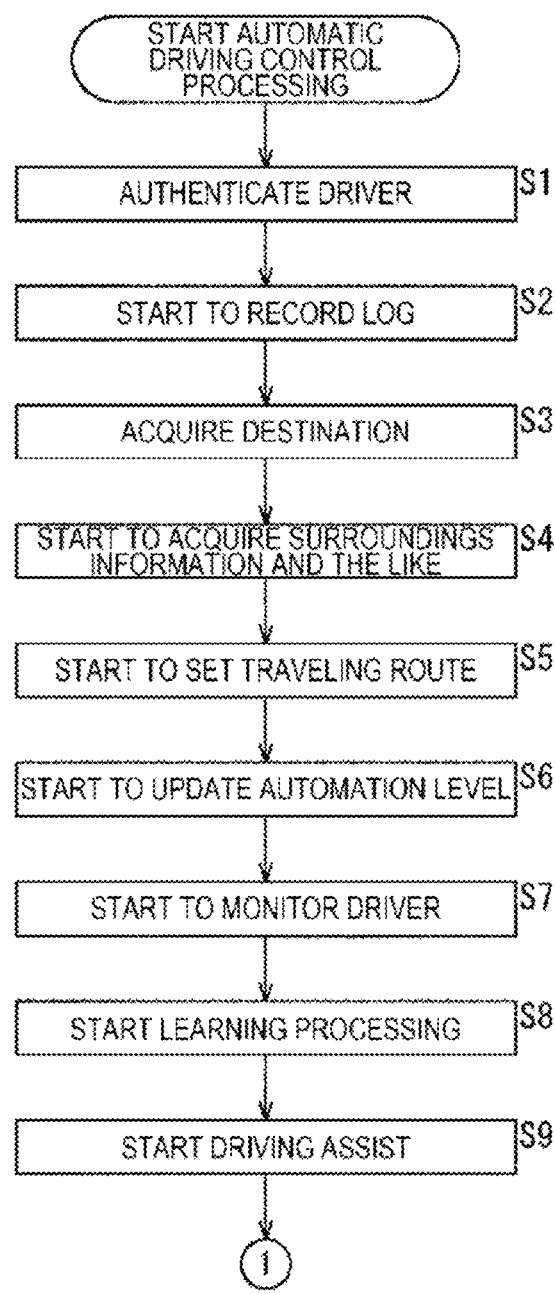
FIG. 10 is a flowchart for explaining automatic driving control processing.
Figure 11:
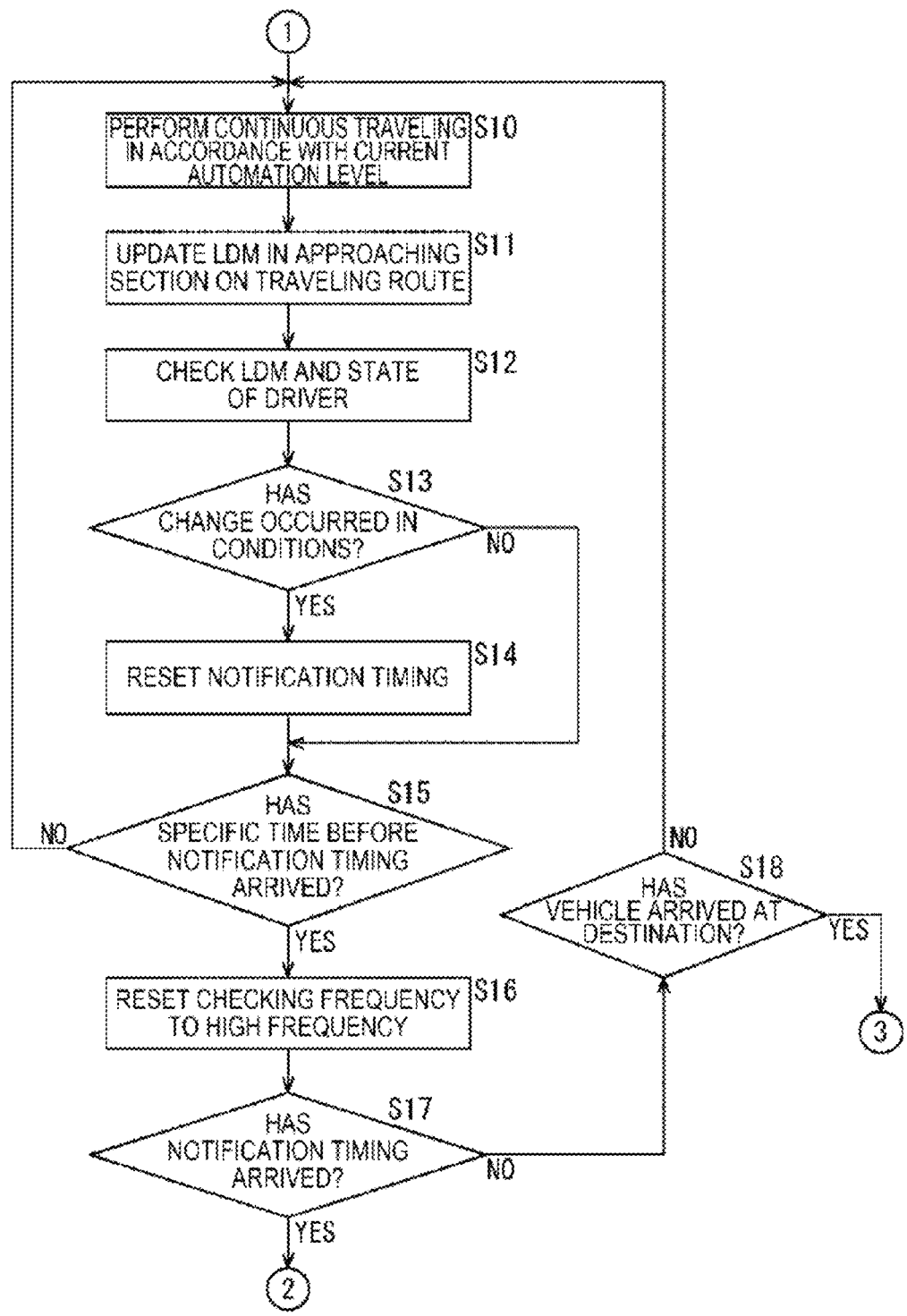
FIG. 11 is a flowchart following FIG. 10 for explaining the automatic driving control processing.

Returning to the description of FIG. 10, the learning unit 126 starts learning processing in Step S8.

For example, the learning unit 126 can start to learn a correlation between driving ability of the driver and various kinds of states or behaviors, which can be detected and observed, of the driver on the basis of the results of the analysis performed by the driving behavior analysis unit 141.

For example, the learning unit 126 starts to learn biological information, motion of the driver, and tendency of driving operations of the driver when the driver performs manual driving normally. For example, it is detected that the driver is performing the manual driving normally when the vehicle stably travels at the center of the traffic lane, when the vehicle stably stops at a stop signal and the like, and when the driver appropriately decelerates at a curve.

This learning is performed in a manner in which correlations between characteristics specific to the driver such as behaviors of the line of sight of the driver, a posture of the head, a posture of the body, a pulse waveform, a respiratory state, and a pupil reaction against external light when the driver performs the manual driving normally and normal driving characteristics are routinely learned. In addition, it is possible to improve the accuracy of the passive monitoring by causing the learning unit 126 to learn characteristics of the driver as teacher data for observable information when normal takeover can be performed on the basis of the observable information acquired when the driver could perform the takeover to the manual driving normally and by using the results of the learning.

The learning unit 126 starts to learn reaction characteristics of the driver in response to the active monitoring such that it is possible to distinguish the normal time from the abnormal time. Using of this learning result enables improvement in accuracy of the active monitoring.

Note that an arbitrary learning method such as simple correlation learning, complicated artificial intelligence learning using a convolutional neural network (CNN), a support vector machine, boosting, and neural network can be used for the aforementioned learning.

In this manner, it is possible to more accurately detect the driving ability of the driver on the basis of the state of the driver (for example, a health state and a fatigue degree of the driver, excessive attention or sensitive responding reaction and the like in response to a specific event due to an accident or an unsafe incident experience in the past) through learning in accordance with the respective states, by learning the characteristics specific to the driver in accordance with the respective state.

Then, the learning unit 126 causes the storage unit 35 to store the results of the learning. Note that the results of the learning may be stored not only in the vehicle used for reusing but also in an electronic key, a remote server, or the like separately from the vehicle such that the result can be utilized in another vehicle such as a rented car. In addition, the results of the learning obtained at the time of previous use may be taken in the vehicle that the driver repeatedly uses, obsolescence thereof may be determined, and a learning dictionary, which is obtained until the previous use, to which safety margin is added, may be utilized as initial data for determination. Note that the learned characteristics may be determined by adding safety coefficients in accordance with update and vacant periods in a use history as well as the use history since the responding characteristics change if the driver does not drive the vehicle for a specific period of time.

In Step S9, the driving assist control unit 153 starts driving assist. That is, the driving assist control unit 153 starts processing of assisting driving, such as ACC, LKAS, TJA, and AEBS, as a part of the traveling control unit 33, for example, by controlling the traveling control unit 33 in accordance with the current automation level.

In Step S10 (FIG. 11), the driving assist control unit 153 performs continuous traveling by controlling the traveling control unit 33 in accordance with the current automation level.

In Step S11, the driving mode switching control unit 154 controls the communication unit 27 such that the communication unit 27 is caused to update the LDM in the next approaching section, through which the vehicle subsequently travels, on the currently traveling route on the traveling route.

In Step S12, the driving mode switching control unit 154 checks the LDM and the state of the driver. The state of the driver checked here includes at least one of a driver's execution condition of the secondary task and reactivity and the degree of wakefulness of the driver. Note that the reactivity and the degree of wakefulness of the driver is checked on the basis of a results of detection performed by the driving state detection unit 142.

Note that a frequency of monitoring of the state of the driver is obtained from a frequency at which road information is acquired and by setting a previously read distance. The setting of the previously read distance is setting a distance before the vehicle passes for previously reading road information.

Here, if the degree of wakefulness of the driver has been lowered, a closest evacuation point at a location that the vehicle will reach in several minutes, which is enough time, is searched. Meanwhile, if the degree of wakefulness of the driver has not been lowered, it is possible to expect that the driver addresses the urgent event in a short period of time. Therefore, it is necessary to acquire the latest update information corresponding to a previously read distance, during which the vehicle can travel in a minimum time necessary for short-period takeover for about 30 seconds at minimum. If a spot for previous reading is located excessively ahead, an interval until the vehicle reaches the (previously read) spot (without any interpolation of intermediate information) is excessively long, and there is a lack of intermediate information (until the spot), a hazardous event that may occur during that time may be missed. Therefore, it is favorable to interpolate and acquire the intermediate points and to execute the previous reading as needed in a variable manner in accordance with conditions such as conditions of the driver executing the secondary task and the awake state.

If there is a losing risk of missing road marking due to heavy rain, accumulated snow, or the like, it is necessary to perform more detailed monitoring of temporal change.

A frequency at which the degree of wakefulness of the driver is checked, checking points, awareness alert, previous information, and the like are actively updated.

In this manner, if a notification is provided with reference to a spot in a situation in which the vehicle hardly advances due to a traffic jam or the like, otherwise the notification for starting to return to the manual driving is provided at a spot corresponding to several kilometers before the notification by expecting that the vehicle travels several minutes later at a routine cruising speed that is high, in a case in which active adjustment is not performed in accordance with road transportation conditions and conditions of the driver, and for example, a point at which the driver returns to the awake state is defined by spot setting, the notification is provided in an excessively early stage before passing through the spot as a result. However, it is possible to calculate an optimal spot for starting to return from prediction of time at which the spot is passed and from the predicted time necessary to return from information regarding an estimated time necessary for the driver to return to the driving and about an average flow speed on the road estimated at the current time, by constantly monitoring and determining the state of the driver and the environment information of the road as described above. In addition, since the routine monitoring of the state of the driver is constantly repeated, the vehicle control system 11 can maintain a ready condition and can constantly predict a time necessary to return even in a case in which an unexpected event occurs regardless of the position before the takeover point. For example, it is possible to issue a best waking-up alert even at an urgent time since the state of the driver can be constantly observed including the scheduled waking-up timing at which the driver is asked for to return from the secondary task such as taking a nap.

Here, there is a possibility that the highest automation level at which the vehicle can travel changes due to a change in a traveling route and a condition of the driver if the time elapses. It is necessary for the driving mode switching control unit 154 to acquire new information during traveling and to constantly continue monitoring of the latest update LDM of the traveling route and the state of the driver.

Figure 13:
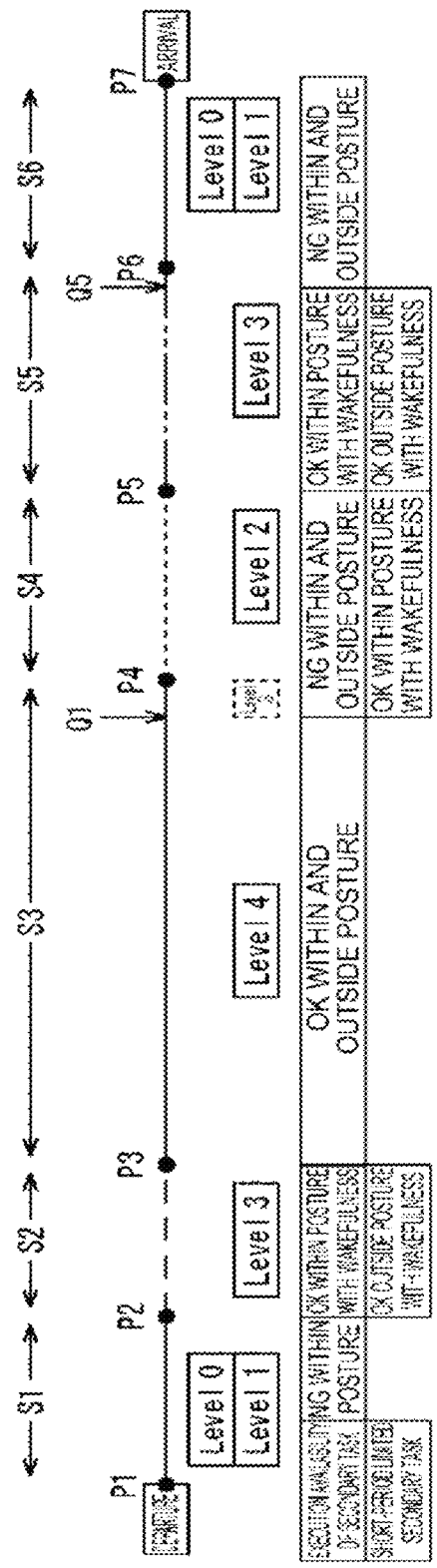
FIG. 13 is a diagram for explaining updating of LDM data.

FIG. 13 is a diagram illustrating an example of updating of LDM data.

In the example in FIG. 13, ideal LDM data at the start (traveling rout selection) point is illustrated. In FIG. 13, sections, allowable automation levels set for the sections, and execution availability of the secondary task, which is routinely set for each of the sections, are illustrated in an order from the upper side, and below the illustration, the execution availability of the secondary task, which is temporarily set for a short period of time (also referred to as short-period limitation), is illustrated.

Note that the short-period limitation is limitation of secondary tasks to states in which the driver can quickly start to return to the driving in a case in which a notification is issued from the notification control unit 124, and that the range thereof is limited to a range that does not cause loosing of attention in any utilization form of the secondary tasks.

The execution availability of the second task is evaluated as states of OK within a posture with wakefulness, NG within a posture with wakefulness, OK outside a posture with wakefulness, OK outside a posture with wakefulness, NG outside a posture with wakefulness, OK within and outside a posture (not depending on the degree of wakefulness), and NG within and outside a posture.

The section set as OK within a posture with wakefulness (OK within a posture) is a section where a seated posture of the driver is a posture within a range defined as a seated posture from which the driver can immediately return to the manual driving and is a section in which the vehicle can travel in the automatic driving mode if the driver is awake.

That is, this section set as OK within a posture with wakefulness is a section which can be passed by the automatic driving with no problems unless an unexpected event occurs in particular. Therefore, routine use thereof can be used in a section at the level 3 or higher, and short-period limited secondary task execution using the automatic driving for a short period of time can be operationally permitted even in a section at the level 2. Actual application depends on characteristics of the vehicle and target safety. Possible targets of the short-period limited secondary task execution can be temporal checking, operating, and the like of a navigation screen, which may cause a failure to pay attention to the front side.

The section set as NG within a posture with wakefulness (NG within a posture) is a section where the secondary task is not able to be performed during the automatic driving even if the seated posture of the driver is the posture within the range defined as the seated posture from which the driver can return to the manual driving.

In a section in which only utilization of the automatic driving up to the level 1 is permitted, the automatic driving level is limited. In addition, since there is a risk of causing a hazard in a case in which the driver operates the navigation during traveling or fails to pay attention to the front side in some form during the traveling, this corresponds to a section in which execution of any secondary task that accompanies the automatic driving is not recommended.

The section set as OK outside a posture with wakefulness (OK outside a posture) is a section where the vehicle can travel by the automatic driving at the level 3 or higher even if the seated posture of the driver is a posture outside the range defined as the seated posture from which the driver can return to the manual driving and is a section in which the driver can temporarily execute the secondary task for a short period of time during traveling through the level 3 allowable traveling section in the automatic driving mode.

The section set as NG outside a posture with wakefulness (NG outside a posture) is a section where even if the driver keeps a sufficient degree of wakefulness necessary for the driver to return to the driving in a case in which the seated posture of the driver is a posture outside the range defined as the posture, from which the driver can immediately return to the manual driving, the automatic driving is not permitted if the driver is in such a dropping-off posture.

That is, this is the section where performing routine operations of the secondary task while leaving the seat is in habited in the section in which the level 3 is allowable.

The section set as OK within and outside a posture is a section in which the secondary task can be executed during the automatic driving corresponding to the level 4 regardless of the state of the driver since updating of LDM or the like is acquired normally with no brake, returning to the manual driving is not asked for, and safety is confirmed.

The section set as NG within and outside a posture is a road section passing, through which by the automatic driving accompanies a risk, in which it is necessary to pass at the level 0 or 1, and is a section where the automatic driving is not permitted regardless of the state of the driver even on a road, which can be typically passed at the level 4, since the LDM or the like is not temporarily updated or safety is not temporarily confirmed for some reason.

Note that it is not favorable in terms of reliability of execution of the manual driving that the manual driving be suddenly executed when the vehicle shifts from a section where the ordinary automatic driving can be utilized to a section where the manual driving is asked for. Therefore, control to sequentially lower an allowable level for the automatic driving in a holding period until confirmation of the manual driving is completed and to secure a traveling section at the shifting levels is definitely performed prior to the entrance to the section in which the allowable automatic driving level becomes lower.

That is, the level basically does not shift from the level 4 to the level 2 and shifts to the level 2 or 1 after shifting to the level 3.

In FIG. 13, the allowable automation level in the section S1 form the spot P1 to the spot P2 is set to the level 0 or 1 according to the LDM data at the spot P1 that is a start spot. In addition, the execution availability of the second task in the section S1 is set as NG in a posture.

The allowable automation level in the section S2 from the spot P2 to the spot P3 is set to the level 3. In addition, the execution availability of the second task in the section S2 is set as OK within a posture with wakefulness, or the execution availability of the short-period limited second task is set as OK outside a posture with wakefulness.

The allowable automation level in the section S3 from the spot P3 to the spot P4 is set to the level 4. In addition, the execution availability of the second task in the section S3 is set as OK within and outside a posture.

The allowable automation level in the section S4 from the spot P4 to the spot P5 is set to the level 2. In addition, the execution availability of the second task in the section S4 is set as NG within and outside a posture, or the execution availability of the short-period limited second task is set as OK within a posture with wakefulness.

However, it is necessary for the driver to wake and return at the point Q1 as the end point of the section at the level 4, as a holding period for previous preparation before entering the following automatic driving section where the upper limit of the automatic driving level is 2. Therefore, the vehicle control system 11 inserts an inevitable section (broken line) at the automatic driving level 3, and full returning to the manual driving of the driver is advanced during this time.

Although not described in detail in this specification, a timing with no risk of delay in returning is determined on the basis of a routine awake state and a posture state of the driver, safety conditions of the scheduled route, and the like, and a takeover delay Q1 is defined. The active confirmation of the driver's takeover is performed during this traveling at a level corresponding to the level 3 in an embodiment of the present technology.

In the example in FIG. 13, the section S4 from the spot P4 to the spot P5 is set to the level 2. Although not illustrated in the drawing, in a case in which all the levels in the section 4 become 3 and the level in the following section S5 (the section at the level 3) becomes 4 with time during the traveling, one problem lefts. That is, in route sections along which a section at the level 4 is stopped, a section at the level 3 comes next, and a section to be traveled at the level 4 comes again, intervention of the driver in the steerage of the device is not performed at all in this case while the returning and the intervention of the driver are originally not asked for as long as the driver pays attention.

As a result, it is difficult to determine whether or not the driver can return to the driving at the necessary time. Therefore, active steerage reaction for temporal driving may be intentionally checked by determining the aforementioned conditions for temporarily returning to the level 3 in the course of the level 4 while determining the returning ability of the driver in order to ascertain and detect the reactions of the driver by the vehicle control system 11 even in the section at the level 3.

The allowable automation level in the section S5 from the spot P5 to the spot P6 is set to the level 3. In addition, the execution availability of the second task in the section S5 is set as OK within a posture with wakefulness (the secondary task can be executed with a possibility of constantly returning to the driving and with wakefulness necessary for returning to the driving), or the execution availability of the short-period limited second task is set as OK outside a posture with wakefulness (the secondary task can be executed with wakefulness even outside a posture as long as the execution is limited to a short period of time).

The allowable automation level in the section S6 from the spot P6 to the spot P7 is set to the level 0 or 1. In addition, the execution availability of the second task in the section S6 is set as NG within and outside a posture (a section in which dropping off from driving with attention to the front side has a risk and is not permitted even in a state in which the driver can immediately return to the driving and is sufficiently awake). Note that the spot P7 is also an arrival spot.

Here, at the spot P4 as an end point of the section S3, the allowable automation level shifts from the level 4 to the level 2, and the execution availability of the second task shifts from OK within and outside a posture to NG within and outside a posture. In addition, at the spot P6 as an end point of the section S5, the allowable automation level shifts from the level 3 to the level 1 (level 0), and the execution availability of the second task shifts from OK within and outside a posture to NG within and outside a posture.

The shift control before the allowable section corresponds to a shift holding period necessary for the driver to complete the shift to a state that is asked for in the next section, to which the vehicle enters next, prior to the entrance to the section. An embodiment of the present technology is a part of an initial driver returning procedure for the driver to reliably start to return and takeover before the automatic driving vehicle enters the next traveling section, in which manual intervention may be needed, in the course of the traveling route, and is a mechanism for encouraging, prior to the takeover, the driver to perform an active front side pointing and checking action, further monitoring an action sequence corresponding to the checking gesture, and observing accuracy and a speed of the gesture by the system to more accurately obtain the state in which the driver is awake and has returned to the driving.

The driving mode switching control unit 154 sets, as a scheduled takeover start spot, a spot that precedes a spot at which such an allowable automation level and the execution availability of the second task shift by a predetermined distance. For example, a timing at which the vehicle passes through the scheduled takeover start spot corresponds to a timing at which a notification about switching from the automatic driving mode to the manual driving mode is provided to the driver.

That is, the driving mode switching control unit 154 sets, as the scheduled takeover start spots, the point Q1 represented before the spot P4 that is an end point of the section S3 and the point Q5 represented before the spot P6 that is an end point of the section S5. Timings at which the vehicle passes through the points Q1 and Q5 correspond to timings at which a notification about switching from the automatic driving mode to the manual driving mode is provided to the driver.

Figure 14:
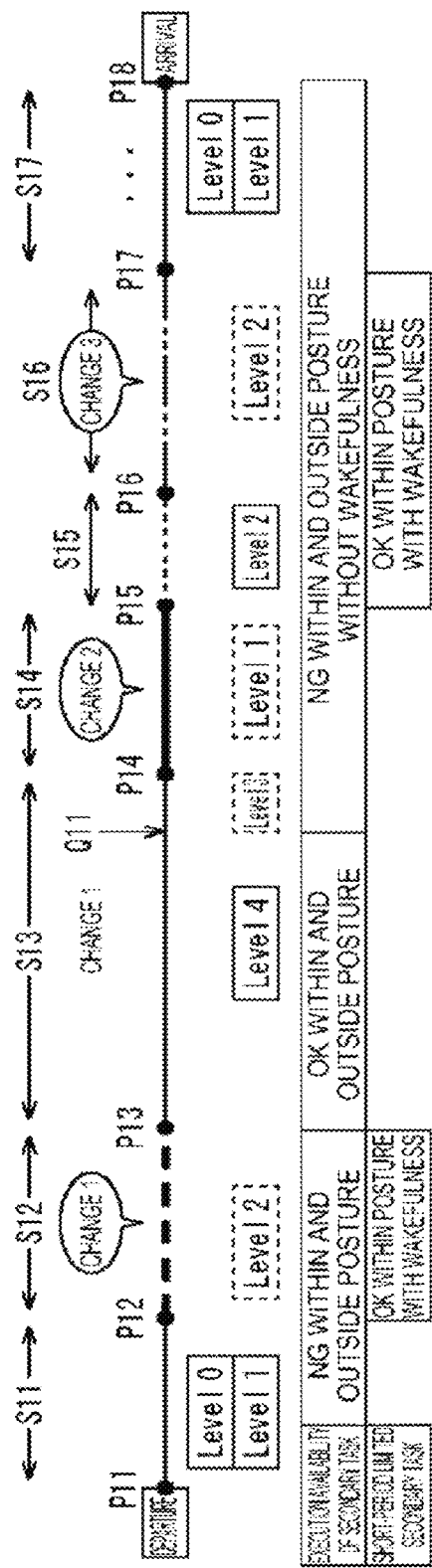
FIG. 14 is a diagram for explaining updating of LDM data.

FIG. 14 is a diagram illustrating an example of updating of LDM data that accompanies a change in conditions.

Note that there are changes in conditions as illustrated by the speech balloons in FIG. 14 after departure in practice. Therefore, there may be a case in which it is necessary to reconsider the scheduled takeover start spot set at the time of the departure (traveling route selection).

In FIG. 14, the section S11 from the spot P11 to the spot P12 corresponds to the section S1 from the spot P1 to the spot P2 in FIG. 13. The allowable automation level in the section S11 is the level 0 or 1, and the execution availability of the second task is set as NG outside a posture.

Here, it is assumed that road marking has become unclear due to accumulated snow or the like in the section S12 from the spot P12 to the spot P13 and that a change that leads to a condition that is not suitable for the automatic driving has occurred as a change 1. In this case, the allowable automation level in the section S12 is changed to the level 2 (broken line), the execution availability of the second task becomes NG within and outside a posture, or a condition is changed to a condition in which only a short-period limited secondary task is permitted within the posture and with wakefulness. The section S12 in FIG. 14 corresponds to the section S2 in FIG. 13, that is, before the departure, in which the allowable automation level is level 3.

Note that in a case in which a change occurs in the condition, a change also occurs in the setting of sections as needed.

In the section S13 from the spot P13 to the spot P14 after the condition due to the change 1 ends in the example in FIG. 14, the allowable automation level is set to the level 4, and the execution availability of the second task is set as OK within and outside a posture, in a manner similar to that in the section S3 in FIG. 13.

In addition, it is assumed that a change that leads to a condition in which the manual traveling may be needed due to construction or the like has occurred as a change 2 in the section S14 from the spot P14 to the spot P15 in FIG. 14. In this case, the allowable automation level in the section S14 is changed to the level 1 (broken line), and the execution availability of the second task is changed to NG within and outside a posture. The section S14 in FIG. 14 is a section that includes a part of the second half of the section S3 in FIG. 13 in which the allowable automation level is the level 4 and includes a part of the first half of the section S4 in FIG. 13 in which the allowable automation level is level 2.

However, at the point Q11 that is an end point of the section at the level 4, it is necessary for the driver to be awake and return to the driving as a previous preparation holding period before entering the following automatic driving section in which the upper limit automatic driving level is 1. Therefore, the vehicle control system 11 inserts the inevitable section (broken line) at the automatic driving level 3, and the full-returning of the driver to the manual driving is advanced during this time. Thus, in order to ascertain the awake state of the driver by using the vehicle control system 11, a notification is provided to the driver, gesture observation of the front side pointing action, which is performed as a part of a driver's returning sequence in accordance with that, is performed, and a returning preparation state of the driver is ascertained.

In the example of FIG. 14, the section S15 from the spot P15 to the spot P16 after the condition due to the change 2 ends is set as a section in which the allowable automation level is set to the level 2, the execution availability of the second task is set as NG within and outside a posture, and whether or not short-period limited secondary task can be executed is set as OK within a posture with wakefulness.

It is assumed that the road marking becomes unclear due to accumulated snow or the like, and a change that leads to a condition that is not suitable for the automatic driving has occurred as a change 3 in the section S16 from the spot P16 to the spot P17. In this case, the allowable automation level in the section S16 is changed to the level 2 (broken line), the execution availability of the second task is changed to NG within and outside the posture and without wakefulness, and the secondary task is not permitted routinely or within the posture and with wakefulness, and a permission condition of only the short-period limited secondary task is changed to OK within a posture with wakefulness.

In the example of FIG. 14, the section S17 from the spot P17 to the spot P18, in which the state caused by the change 3 ends, is set as a section in which the allowable automation level is set to the level 0 or 1, and the execution availability of the second task is set as NG within and outside a posture, in a manner similar to that in the section S6 in FIG. 13.

The setting of the allowable automation level and the execution availability of the secondary task is changed by such a change in conditions. The driving mode switching control unit 154 changes the scheduled takeover start point in accordance with the setting after the change and changes (resets) the timing at which a notification about the switching from the automatic driving mode to the manual driving mode is provided to the driver.

That is, the driving mode switching control unit 154 sets, as the scheduled takeover start point, the point Q11 represented before the spot P14 in the section S14. The timing at which the vehicle passes through the point Q11 is a timing at which the notification about the switching from the automatic driving mode to the manual driving mode is provided to the driver. Similarly, the notification to the driver is provided, gesture observation of the front side pointing action, which is performed as a part of a driver's returning sequence in accordance with that, is performed, and a returning preparation state of the driver is ascertained here, in order to ascertain the awake state of the driver by using the vehicle control system 11.

In this manner, the traveling route and the conditions of the driver change at every moment from the start of traveling.

Figure 15:
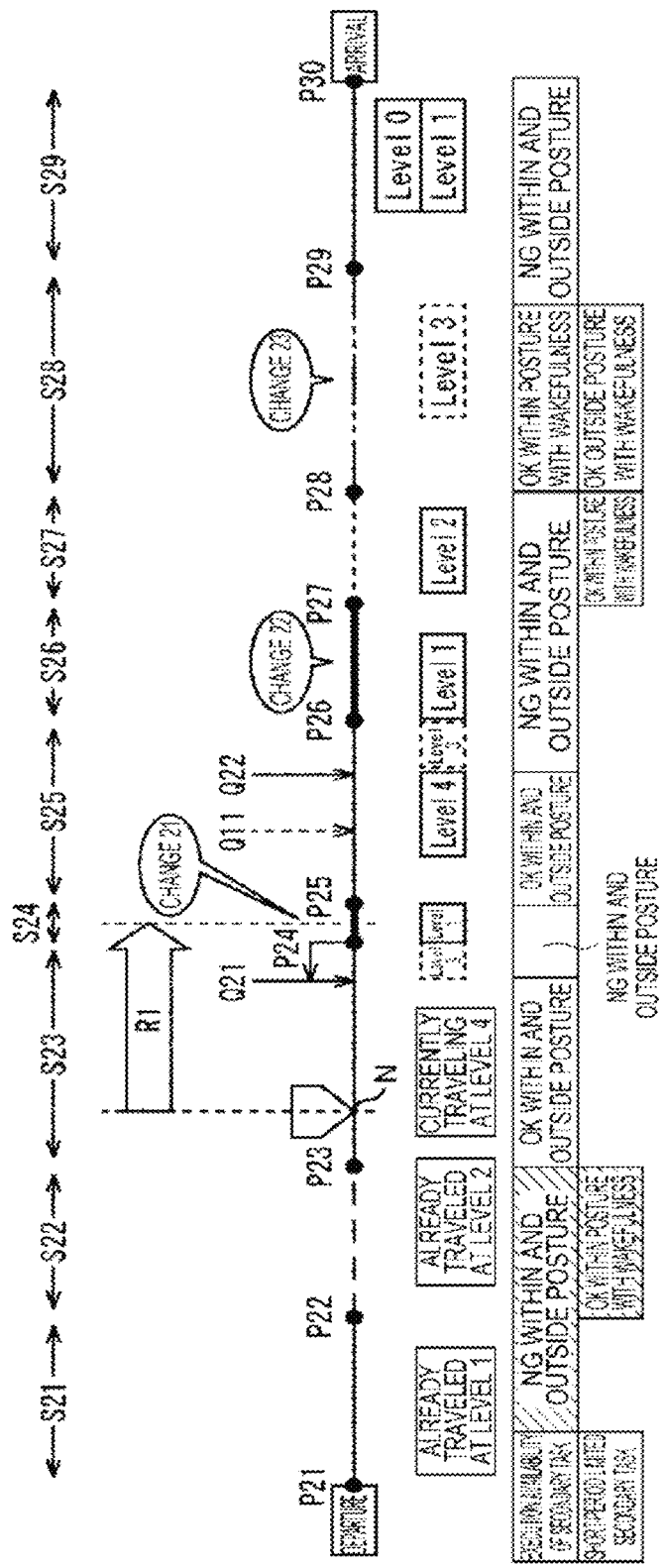
FIG. 15 is a diagram for explaining updating of LDM data.

FIG. 15 is a diagram illustrating another example of the updating of the LDM data that accompanies a change in conditions.

In the example of FIG. 15, the latest LDM data at a spot N after elapse of a specific time after the start of traveling is illustrated. The conditions change even after the start of traveling as illustrated by the respective speech balloons in FIG. 15.

In the example of FIG. 15, it is assumed that the vehicle is currently traveling at the spot P23 in the section S23 from the spot P23 to the spot P24.

The section S21 from the spot P21 to the spot P22 is a section in which the allowable automation level is set to the level 0 or 1, and the vehicle has already traveled through the section at the allowable automation level 1. The section S21 corresponds to the section S11 in FIG. 14. Note that the execution availability of the second task in the section S21 is set as NG within and outside a posture, and the vehicle has already passed through the section.

The section S22 from the spot P22 to the spot P23, which follows the section S21, is a section in which the allowable automation level is set to the level 2, and the vehicle has already traveled through the section S22 on the basis of such setting. The section S22 corresponds to the section S12 in FIG. 14. The section S22 is a section in which the execution ability of the secondary task is set as NG within and outside a posture, and the execution ability of the short-period limited second task is set as OK within a posture with wakefulness.

The section S23 from the spot P23 to the spot P24 including the spot N, through which the vehicle is traveling, is a section in which the allowable automation level is set to the level 4, and the vehicle is traveling on the basis of such setting.

Since the vehicle is traveling in the automatic driving mode, the vehicle travels while the driving mode switching control unit 154 acquires the update data of the latest LDM for the section represented by the outlined white arrow R1, for example. The section represented by the outlined white arrow R1 is a section, through which the vehicle is scheduled to travel after a specific period, until which it is assumed that the driver can reliably return from the secondary task, with reference to the spot N.

In this shortest LDM information prior acquisition section, it is necessary to define and continuously update at least the shortest period in which the driver can return from the secondary task with a specific margin, for utilization in which the driver is assumed to be away from the seat for a long period of time to sleep, moving to the trunk, or the like. Hereinafter, it is assumed that change information in the previous information has been acquired in the updating of the section at that time, for example.

Information regarding a change 21 is added by the latest LDM update data at the time when the vehicle comes to the spot N, and in a case in which the schedule is changed, it is possible to calculate a time asked for to return from an ascertained state of the driver, by constantly monitoring a predicted time asked for to return in monitoring of the driver. A level at which driver's intervention and returning are asked for in association with the change 21 is updated, and the section S24 from the spot P24 to the spot P25, which is not present in the information in the initial stage of the original traveling or at a point less than N, becomes a section in which the allowable automation level is changed to the level 1 and the execution availability of the secondary task in the section is NG within and outside a posture.

In this case, the driving mode switching control unit 154 calculates a predicted timing necessary to return as described above and changes the point Q21 before the spot P24 to the scheduled takeover start point.

At this time, it is necessary for the driver to wake and return at the point Q21 as the end point of the section at the level 4, as a holding period for previous preparation before entering the following automatic driving section where the upper limit of the automatic driving level is 1. Therefore, the vehicle control system 11 inserts an inevitable section (broken line) at the automatic driving level 3, and full returning to the manual driving of the driver is advanced during this time.

Note that for the calculation of the predicted timing, computation is performed in consideration of the characteristics based on learning of returning characteristics of the driver, dynamics characteristics of loading and braking of the vehicle, safety characteristics of roads, and the like. The timing at which the vehicle passes through the point Q21 is a timing at which the notification about the switching from the automatic driving mode to the manual driving mode is provided to the driver.

In addition, the driving mode switching control unit 154 sets the section from the spot P24 to the spot P25 as a section in which the allowable automation level is the level 1 and the execution availability of the secondary task is NG within and outside a posture. A timing in accordance with conditions is calculated such that an alert is given to a sleeping driver in an early stage, and a short-period screen notification is given to the driver who is seated and operating a smartphone while paying attention to the front side, for example.

Note that although detailed description will not be given, a mechanism that does not perform seamless shift to return again to an upper level mode of the automatic driving again without noticing the driver in a case of shifting to a driver's driving intervention mode at the levels 0 to 3 once. In addition, it is necessary to have a way that intentionally reflects an input of requesting the driver to return, in order to return to the automatic driving at the level 3 or 4.

Here, the way that makes a request to the driver is a function that prevents the driver from seamlessly and unconsciously returning to the automatic driving mode and presents the driver from considering that the vehicle is traveling by the automatic driving of the driver regardless of the fact that the vehicle control system 11 has not returned to the automatic driving mode in practice and being confused due to the wrong consideration. This is because if a control sequence that does not have a function of notifying about the returning to the higher automatic driving level by the driver is performed, there is a concern in which the driver considers that the automatic driving is continuously used during traveling in the corresponding section, and this leads to an accident due to a failure in addressing the manual driving.

For example, there is a risk that the driver misunderstands that the automatic traveling is being continued in a section in which a straight road continues, and even if the driver notices that no control is being performed just before a curve or the like after that, the driver gets upset and leads to an accident.

Next, in the section S25 from the spot P25 to the spot P26 in FIG. 15, the allowable automation level is the level 4, and the execution availability of the second task is set as OK within and outside a posture in a manner similar to that in the section S14 from the spot P13 to the spot P14 in FIG. 14.

Here, if a schedule of construction that corresponds to the change 2 in FIG. 14 has not been updated, and the schedule has not been changed, the point Q11 in FIG. 15 becomes the scheduled takeover start point. However, construction section information has been updated due to occurrence of the change 22, and a change of reducing the section has been made in the section S26 from the spot P26 to the spot P27 in the example of FIG. 15. The section S26 is a section in which the allowable automation level is the level 1, and the execution availability of the second task is NG within and outside a posture.

In this case, the driving mode switching control unit 154 changes the scheduled takeover start point from the point Q11 to the point Q22 represented before the spot P26 in the section S26. The timing at which the vehicle passes through the point Q22 is a timing at which the driver is notified of the switching from the automatic driving mode to the manual driving mode.

At this time, it is necessary for the driver to wake and return at the point Q22 as the end point of the section at the level 4, as a holding period for previous preparation before entering the following automatic driving section where the upper limit of the automatic driving level is 1. Therefore, the vehicle control system 11 inserts an inevitable section (broken line) at the automatic driving level 3, and full returning to the manual driving of the driver is advanced during this time.

Next, in the section S27 from the spot P27 to the spot P28 in FIG. 15, the allowable automation level is the level 2, and the execution availability of the second task is set as NG within and outside a posture, or in a case in which the utilization is limited to the short time, set as OK within a posture with wakefulness, in a same manner as that in the section S15 from the spot P15 to the spot P16 in FIG. 14.

As illustrated in FIG. 15, it is assumed that a change 23 in which the weather has become better, the road marking has become clear, and the road environment has been improved has occurred in the section S28 from the spot P28 to the spot P29. The allowable automation level in the section S28 is changed from the level 2 to the level 3 in FIG. 14, the execution availability of the secondary task is set as NG outside a posture, and the execution availability of the short-period limited secondary task is changed from OK within a posture with wakefulness to OK within a posture with wakefulness or short-period limited OK outside a posture with wakefulness, due to the change 23.

In the section S29 from the spot P29 to the spot P30 in which the change 23 ends in the example of FIG. 15, the allowable automation level is the level 0 or 1, and the execution availability of the second task is set as NG within and outside a posture in a manner similar to those in the section S29 in FIG. 15 and the section S17 in FIG. 14.

As described above, a recommended time (a notification timing and an alert timing for the driver) during which the driver is asked for to return at the same allowable automation level changes at every moment in accordance with a traveling environment, a state of the driver, loading of the vehicle, braking properties, and the like at that point (or a clock time at which entrance to the section is assumed). That is, a timing at which the driver is asked for to return actively changes in accordance with the LDM map information and the environment information, accidents, rushing-out, temporal change risks due to weather factors such as lightning strikes and side wind, and further the state of the driver.

Note that a speed at which the driver's awareness returns to a state in which the driver can travel normally is represented as an eigenfunctions obtained by learning using characteristics of the driver. Such an eigenfunction is expressed as a function associated with eyeball saccade and micro-saccade behaviors, slight motion of visual fixation, characteristics of reflex responses of pupils to changes in external light, characteristics of blinking, and the like.

Alternatively, the function may be expressed in association with observable information of a variety of biological signals such as the aforementioned pulse, respiratory, and brain waves. These observable evaluation values are observed every time a takeover event from the automatic driving to the manual driving occurs, and direct correlations with stable takeover after that and a failure and a delay of the takeover are obtained. Thereafter, values obtained in a case in which the takeover are performed normally are associated as teacher data when the driver takes over the manual driving normally, and observation data necessary for learning increases. That is, learning of determination equipment by the vehicle control system 11 advances in accordance with utilization every time the repeatedly occurring takeover event occurs, and as a result, an improvement in performances of the determination equipment when the asked for wakeup recover time for the driver is predicted from the observable values advances in accordance with the utilization.

FIG. 16 is a diagram illustrating a table that summarizes the execution availability of the second task.

As described above, "within a posture" in seated postures from which the driver can return to the driver's seat for steerage and driving in the table represents a seated posture from which the driver can return to the driver's seat for steerage and driving. "Outside a posture" represents that the driver is not in such a seated posture from which the driver can immediately return to the driver's seat for steerage and driving.

In the awake states, in which the driver can recognize the surrounding environment and take avoidance actions, in the table, "with wakefulness" represents that the driver is in an awake state in which the driver can recognize the surrounding environment and take avoidance actions, and "without wakefulness" represents that the driver is not in an awake state in which the driver can recognize the surrounding environment and take avoidance actions.

A representative state without wakefulness is a sleeping state, and as other examples thereof, conditions in which the driver is watching a video, is getting obsessed by a game, is holding a remote telephone meeting in the moving vehicle, and is focusing on mails or browsing correspond to conditions without wakefulness. Note that although individual classifications are intentionally not described in order to avoid complexity, it is further necessary to care about body steerage functions in practice, and for example, so-called locomotive ability such as numbness of hands and feet due to the secondary task is also a factor of deciding a notification timing and deciding a utilization allowable range of the automatic driving.

The drawing will be described in the order from the upper side. A routine secondary task can be executed at the level 4 regardless of whether the driver is within or outside the posture and is awake.

If the level is 3 or less, a routine secondary task is not able to be executed regardless of whether the driver is within or outside the posture and with or without wakefulness. Continuous long-period utilization while dropping off from the steerage is basically unavailable. This is because it is difficult for the driver to continuously maintain monitoring and paying attention to an automatic traveling state in a state in which the driver does not directly intervene in the steerage for the driving for a long period of time and can be requested to return any time. In a case in which utilization at the level 3 continues for a specific time or longer, a utilization form of intermittently requesting the driver to return and giving changes is favorably employed.

A variety of secondary tasks can be executed at the level 4 regardless of whether the driver is within or outside the posture and with or without wakefulness.

It is possible to execute a short-period limited secondary task from which the driver can return early at the level 3 or higher within a posture and with wakefulness. As described above, utilization of the automatic driving, in which the driver does not continuously intervene for a long period, is not assumed as the utilization of the level 3, and in this case, it is possible to suppress occurrence of psychological dropping-off from awareness by setting a returning delay as a target of penalty in a case in which the delay has occurred because the driver sleeps or gets obsessed by watching a video or playing a game on the assumption that conditions are periodically, repeatedly, and continuously monitored and checked even if the driver's awareness drops off from the driving.

A short-period limited secondary task can be executed at the level 2 or higher outside the posture (a relaxed posture, from which the driver can return in a short period of time, within a range in which the driver relaxes their posture from the limited posture) with wakefulness. A technical operation in which all the operations that are inhibited in the related art, such as operations of a navigation, can be performed within a range of the secondary task within a slightly relaxed posture in a section in which specific safe driving is secured while the vehicle is not able to travel by complete automatic driving.

Any secondary task is not able to be executed, that is, even the short-period limited secondary task is not able to be executed at and below the level 3 outside the posture regardless of whether or not the driver is awake.

Returning to FIG. 11, the driving mode switching control unit 154 determines whether or not a change has occurred in conditions as described above with reference to FIGS. 13 to 15 on the basis of (update information of) the LDM and the state of the driver detected by the driving state detection unit 142 in Step S13.

In a case in which it is determined that a change has occurred in conditions in Step S13, the processing proceeds to Step S14.

The driving mode switching control unit 154 resets (change) the notification timing in Step S14. The frequencies at which the LDM and the driver are checked are also reset as needed.

Meanwhile, in a case in which it is determined that no change has occurred in conditions in Step S13, the processing in Step S14 is skipped.

In Step S15, the driving mode switching control unit 154 determines whether or not the current clock time is a clock time that corresponds to a specific time before the set notification timing.

The specific clock time defined here represents a returning time that is asked for by the driver to return to the manual driving and is estimated from routine observation through specific learning and is a predicted time at which the driver can perform the manual driving normally at a specific success rate. A learning method will not be described in detail in the specification.

A time taken by the driver to complete actual takeover normally after receiving a notification necessary for the takeover differs depending on the individual driver and depends on a posture state, actions that the driver has performed until then, and the like.

Thus, if it is not possible to ascertain the returning characteristics of the driver in the notification period, the aforementioned success rate is secured in order for the driver to take over the driving normally by providing a notification at specific time clock necessary to achieve a target takeover success rate of 100%, if possible, or a target takeover success rate, if not possible, in accordance with the defined target success rate on the basis of static returning property distribution of the driver population. The specific clock time means a limit timing of holding the notification to be given to the driver in order to secure the specific success rate.

In a case in which it is determined that the specific time before the notification timing has not been reached in Step S15, the processing returns to Step S10, and the following processing is repeated.

Here, in a case in which the notification timing is routinely observed at a low frequency, and a change in condition has been observed, the detection shifts to high-frequency detection. The reason that the LCM update and the driver state observation are routinely and continuously performed is that if the driver executes the secondary task that does not ask for attention to driving for a long period of time, the driver may feel drowsiness with elapse of time and may shift to dropping off from a deep awareness of steerage, which is not able to be detected on the side of the vehicle control system 11. That is, accuracy in detecting the degree of wakefulness of the driver is improved, and a delay occurrence risk is suppressed by performing observation and monitoring at a specific proportion in order to ascertain the state of the driver with elapse of time to some extent and increasing the sample frequency of the observation and the monitoring at timing at which the takeover is likely to be performed.

Even in a case in which a sufficient holding time is typically expected even if a notification is immediately previously provided in this case, a case in which the driver has further deeply slept and the condition has changed to a condition that ask for an earlier notification than originally scheduled can happen. In order to avoid such condition in conjunction with a temporal change, periodic routine monitoring sampling performed at a long time interval and sample frequency change performed for the purpose of increasing accuracy of a takeover timing and preventing a delay by performing high-frequency sampling at an increased sampling frequency are performed.

Although embodiments have been described on the assumption that the sampling frequency is defined, a configuration may be employed in which a change in the driver is observed in combination of highly-sensitive change-sensitive-type detection way with change detection by observing a constant posture of the driver and routine biological signals, and event-driven-type notification time recalculation for detecting the change is performed. In addition, a notification of some condition and recognition thereof may be periodically performed depending on content of the secondary task.

Meanwhile, in a case in which it is determined that the clock time that corresponds to the specific time before the notification timing has been reached in Step S15, the processing proceeds to Step S16.

In Step S16, the driving mode switching control unit 154 resets the frequency at which the LDM and the driver are checked to be higher than before.

In Step S17, the driving mode switching control unit 154 determines whether or not the current clock time is the notification timing. For example, it is determined that the notification timing has been reached when the vehicle passes through the scheduled takeover start point.

In a case in which it is determined that the notification timing has not been reached in Step S17, the processing proceeds to Step S18.

In Step S18, the route setting unit 151 determined whether or not the vehicle has reached the set destination.

In a case in which it is determined that the vehicle has not reached the destination in Step S18, the processing returns to Step S10, and the following processing is repeated.

Meanwhile, in a case in which it is determined that the vehicle has reached the destination in Step S18, an ending procedure for the automatic driving processing is started.

Figure 12:
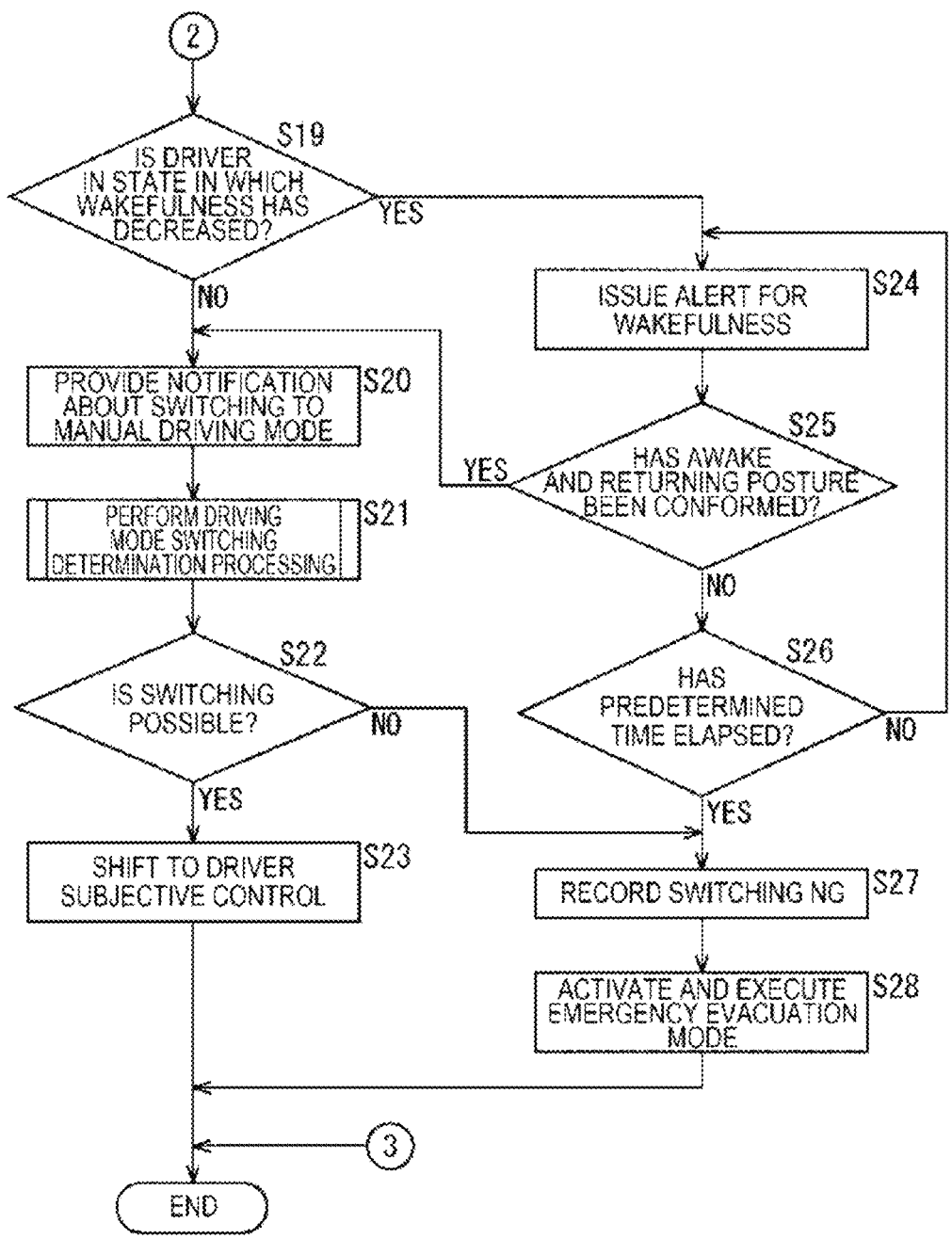
FIG. 12 is a flowchart following FIG. 11 for explaining the automatic driving control processing.

In a case in which it is determined that the notification time has arrived in Step S17, the processing proceeds to Step S19 (FIG. 12).

In Step S19, the driving mode switching control unit 154 determines whether or not the driver is in a state in which wakefulness thereof has decreased. The determination described here is performed on the basis of the reactivity and the degree of wakefulness of the driver detected by the driving state detection unit 142.

For example, it is determined that the driver is in the state in which the wakefulness thereof has decreased in a case in which the reactivity and the degree of wakefulness of the driver are lower than values set in advance as threshold values, and it is determined that the driver is not in the state in which the wakefulness thereof has decreased in a case in which the reactivity and the degree of wakefulness of the driver are greater than the values set in advance as the threshold values.

As the threshold values described herein, fixed values uniquely defined for the driver population may be used. In that case, since some drivers may hurry to immediately return while other drivers take time depending on characteristics of the individuals, learning characteristics specific to drivers in accordance with observable values of the states of the drivers may be periodically and previously learned and defined, in order to further improve the accuracy depending on the returning characteristics specific to the drivers.

In a case in which it is difficult to specify the driver, or the like, static values of a typical driver population asked for to return may be used. However, an early notification is asked for to allow all drivers to safely perform takeover. Meanwhile, if the early notification is routinely repeated in a stage that is earlier than a notification timing by several minutes or several tens of minutes, senses of danger in relation to the necessity to return in response to the notification to the driver are degraded, and this induces risks of negligence of the returning. Therefore, it is possible to state that constantly providing the notification early to the driver is a not very favorable method of deciding a notification timing.

In a case in which it is determined that the driver is not in the state where the wakefulness thereof has decreased in Step S19, the processing proceeds to Step S20.

In Step S20, the driving mode switching control unit 154 causes the notification about the switching to the manual driving mode to be provided. The notification about the switching to the manual driving mode is for notifying the driver of the switching from the automatic driving mode to the manual driving mode and is performed under the control of the notification control unit 124, for example.

For example, the display unit 29 displays a notification screen or the like for drawing an attention within the field of view of the driver under the control of the notification control unit 124. In a case in which the driver is operating the mobile terminal 12, the notification screen may be displayed on the entire surface of the screen of the mobile terminal 12 to interrupt continuation of the secondary task, or a PinP small screen or the like for attracting attention may be displayed.

At this time, a mechanism that does not postpone the start of takeover by performing such control in which an operating state of the mobile terminal 12 is forcibly saved, and the mobile terminal 12 is caused to transit to a standby state so as to be able to restart the operation from the same start, or in which a history of a plurality of inputs immediately before utilization of an application are constantly saved in relation to the utilized application (APP) in order to prevent a situation in which the start of the takeover delays due to a fear about a loss of halfway operated information in the course of the use of the mobile terminal 12, and the operation history is held in a function by which the operation restart can be played back from an arbitrary operation that is immediately previously performed, or in which the screen of the mobile terminal 12 is forcibly turned off. In this manner, it is possible to prevent the driver from getting upset and continuing operations in order to quickly stop the mobile terminal 12 for now in response to the display of the notification screen.

The notification about the shifting to the manual driving mode may be provided by a method other than displaying it on the screen.

For example, the sound output unit 30 may output a sound message, an alarm, a buzzer, a beep sound, a quasi-car horn (horn) of the following car that is heard only within the vehicle, and the like under the control of the notification control unit 124.

In addition, the light emitting unit 31 may turn on or blink a lamp or the like under the control of the notification control unit 124.

The in-vehicle device control unit 34 may perform haptic feedback such as vibrating the seat of the driver or the steering wheel or pulling a seat belt under the control of the notification control unit 124. Note that the seat may be vibrated such that vibration similar to that felt when the vehicle crosses rumble strips or road studs is delivered to the driver.

The traveling control unit 33 may control the steering wheel such that vibration similar to that felt when the vehicle crosses rumble strips or road studs is delivered to the driver.

In Step S21, the driving mode switching control unit 154 controls the switching determination unit 155 such that the switching determination unit 155 is caused to perform driving mode switching determination processing. In the driving mode switching determination processing, whether or not the switching can be performed is determined by the respective determination units, namely the gesture recognition switching determination unit 201, the saccade information switching determination unit 202, the sound recognition switching determination unit 203, and the steering wheel operation switching determination unit 204. The driving mode switching determination processing in Step S21 will be described later with reference to the flowchart in FIG. 17.

In Step S22, the switching determination unit 155 determines whether or not it is possible to perform switching from the automatic driving mode to the manual driving mode on the basis of the results of the determination by the respective determination units that form the switching determination unit 155.

In a case in which it is determined to be possible to perform the switching from the automatic driving mode to the manual driving mode in Step S22, the processing proceeds to Step S23.

In Step S23, the driving mode switching control unit 154 performs the switching from the automatic driving mode to the manual driving mode, shifts to a driver subjective control state, which is a state in which the driver subjectively performs driving, and then ends the automatic driving control processing.

Meanwhile, in a case in which it is determined that the driver is in the state in which the wakefulness thereof has decreased in Step S19, the processing proceeds to Step S24.

In Step S24, the driving mode switching control unit 154 controls the notification control unit 124 and causes the notification control unit 124 to issue alert for wakefulness. For example, sound, vibration, or the like that is large enough to wake up a person is output as the alert.

The alert output in Step S24 is different from the notification output in Step S20 and is stronger. For example, a sound message, an alarm, a buzzer, beep sound, quasi-car horn, or the like with a volume that is higher than that at the time of the notification is output. In addition, a tone of a dissonance that causes a more unpleasant feeling than that at the time of the notification is output. Light emission from a lamp or the like may be performed with higher light intensity than that at the time of the notification, or haptic feedback may be provided at higher intensity than that at the time of notification.

In Step S25, the driving mode switching control unit 154 determines whether or not the driver's awake and returning posture has been confirmed. In a case in which it is possible to specify that the driver is trying to have the same posture as that at the normal time on the basis of the results of detecting the degree of wakefulness by the driving state detection unit 142, for example, it is determined that the awake and returning posture has been able to be confirmed. In a system that allows posture moving and operations while the driver is away from the seat, a device that tracks and determines moving of the posture and the body posture of the driver in the car may be provided for the determination. Note that a turning seat, a sliding seat, and the like are expected to be employed with distribution of the automatic driving in the future even if the entire returning of the driver to the driving and steerage sheet is not performed directly by the posture tracking, and the returning to the driving posture may be observed on the basis of returning of the rotated seat, partial pressure detection when seated, and the like.

In a case in which it is determined that the awake and returning posture of the driver has not been confirmed in Step S25, the processing proceeds to Step S26.

In Step S26, the driving mode switching control unit 154 refers to a built-in timer and determines whether or not a predetermined takeover completion holding time has elapsed after the notification timing, for example.

In a case in which it is determined that the predetermined time has not elapsed in Step S26, the processing returns to Step S24, and the following processing is repeated. The predetermined elapse time means a time that is allowed to wake up the sleeping driver and is take before achieving wakefulness, for example, and is a time learned and set as value specific to the individual as individual information every time the individual utilizes the system in the past, such that the predetermined elapse time is set to be long for the authenticated drivers who is not good at waking up while the predetermined elapse time is set to be short for the drivers who can wake up in a short period of time.

Meanwhile, in a case in which it is determined that the predetermined time has elapsed in Step S26, the driver's awake and returning operations are given up, and the processing proceeds to Step S27. The processing similarly proceeds to Step S27 even in a case in which it is determined that the switching from the automatic driving mode to the manual driving mode is not possible in Step S22.

In Step S27, the log generation unit 125 records the switching to the manual driving mode as NG. For example, a log indicating that the switching to the manual driving mode has failed is generated and recorded.

In Step S28, the driving mode switching control unit 154 activates and executes the emergency evacuation mode. Control is performed such that the vehicle of the driver is decelerated up to a road side zone in consideration of conditions in the surroundings of the traveling road to advance the decrease in speed, and the vehicle is caused to urgently evacuate to the road side, for example, by the emergency evacuation mode being executed. However, stopping the car at the road side is not a favorable utilization form even at the urgent time. It is favorable that the vehicle be moved to and parked at a location that can be the closest spot, to which the vehicle can evacuate, at which the vehicle does not disturb transportation. The reason is that if distribution of the automatic driving advances and a vehicle flow is interrupted in association with occurrence of traffic jams that used to happen, the entire traveling zone is filled with the automatic driving vehicles, the vehicles inhibit passing of urgent vehicles, and thus it becomes significantly important to secure the road side zone for normal operation of transportation infrastructure.

In this manner, the processing of forcibly causing the vehicle to stop is performed in the emergency evacuation mode. In a case of urgency, the closest forced stopping location on the traveling route is searched on the basis of map information by the route setting unit 151, and processing of causing the vehicle to stop at the searched forced stopping location is performed. As the forced stopping location, an emergency parking zone, a safety zone, a parking of a shop, or the like that allows the vehicle to stop, for example, are searched. Here, the reason of considering the surrounding conditions during the traveling of the road is that if the vehicle is decelerated and is urgently stopped in an only traffic lane in a time zone in which the amount of transportation in the single traffic lane with no margin is large, for example, this may become a factor of a traffic jam on the road.

In a case of non-urgency, the closest parking area or a service area may be searched on the basis of the map information. In a case in which there is a parking area or a service area in a predetermined range and the vehicle can reach it without passing through a route that asks for the manual driving, the route setting unit 151 sets the parking area or the service area as the forced stopping location. In a case in which there is neither the parking area not the service area in the predetermined range, or in a case in which the vehicle is not able to reach the parking area or the service area, without passing through the route that asks for the manual driving, the forced stopping location may be searched and set in a manner similar to that in the case of urgency.

The driving assist control unit 153 controls the traveling control unit 33 and the like such that the vehicle is caused to stop at the set forced stopping location. At this time, deceleration or slow traveling is performed as needed. In a case in which a rapid change in disease conditions or the like occurs as a factor due to which the driver has a difficulty in returning, SOS sending may be performed along with the event notification at the time of the detection or after the stopping of the car.

Note that it is also assumed that the driver forcibly performs the switching to the manual driving before the automatic stopping at the forced stopping location and the driver forces to return to the driving. In this case, the driver may be allowed to shift to the manual driving in a stepwise manner since there is a possibility that the driver has not sufficiently been awake.

Next, the driving mode switching determination processing in Step S21 in FIG. 12 will be described with reference to the flowchart in FIG. 17.

In Step S101, the gesture recognition switching determination unit 201 causes the driving state detection unit 142 to detect a degree of wakefulness by using gesture recognition.

The gesture recognition switching determination unit 201 determines whether or not it is possible to switch the driving mode from the automatic driving mode to the manual driving mode, by determining the internal state after returning of the driver on the basis of the results of the detection performed by the driving state detection unit 142.

In Step S102, the saccade information switching determination unit 202 causes the driving state detection unit 142 to detect the degree of wakefulness of the driver by performing eyeball behavior analysis, for example, saccade analysis of the driver.

The saccade information switching determination unit 202 determines whether or not it is possible to switch the driving mode from the automatic driving mode to the manual driving mode, by determining the internal state after returning of the driver on the basis of the results of the detection performed by the driving state detection unit 142.

In Step S103, the driving state detection unit 142 is caused to recognize a sound response from the driver and detect the reactivity and the degree of wakefulness of the driver.

The sound recognition switching determination unit 203 determines whether or not it is possible to switch the driving mode from the automatic driving mode to the manual driving mode, by determining the internal state after returning of the driver on the basis of the results of the detection performed by the driving state detection unit 142.

In Step S104, the steering wheel operation switching determination unit 204 causes the driving state detection unit 142 to intentionally causes noise traveling and detect the reactivity and the degree of wakefulness of the driver on the basis of the driver's response to the caused noise traveling.

The steering wheel operation switching determination unit 204 determines whether or not it is possible to switch the driving mode from the automatic driving mode to the manual driving mode by determining the internal state after returning of the driver on the basis of the results of the detection performed by the driving state detection unit 142, that is, results of a reaction that appears as a recognition response of the driver to an action working on the driving.

Note that the processing of determining the switching from the automatic driving mode to the manual driving mode is not limited to the one performed such that the determination processing in these four stages are performed. For example, separate determination processing may be performed instead of the four determination processes illustrated in FIG. 17, or determination processing may be added. Although the description of embodiments is limited to these four specific ways, the aforementioned variety of biological signals, such as pulse waves, sweating, and body odor, which have lower probability in determining the degree of wakefulness, may be used in combination, and for learning of the correlation between the observable information and the degree of wakefulness specific to the driver, it is possible to more precisely estimate transition to returning specific to the driver by using, as teacher data for the learning, the observable information to be observed every time the takeover is performed and success of returning and wakefulness normal transition during actual takeover, In addition, the order of the four determination processes illustrated in FIG. 17 can be arbitrarily changed. Here, regarding effects of acting on the driver, in a case in which the detection is performed depending only on the observation of cognitive determination that depends on the driver's passive way, no unique features appear in the driver's passive observation in a road section in which the road is simple and does not particularly ask for attention, and it is difficult to determine the awake and returning state. Meanwhile, actively acting on the driver from the vehicle control system 11 has an advantage that the observable state observation values necessary for determining the wakefulness and returning can be more significantly distinguished.

Figure 17:
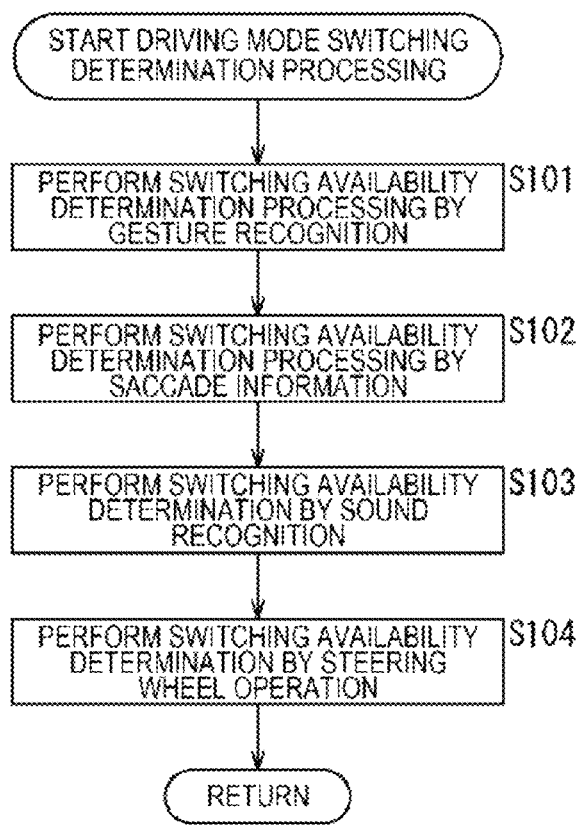
FIG. 17 is a flowchart for explaining driving mode switching determination processing.

The determination of whether or not it is possible to perform the switching in Step S22 in FIG. 12 may be performed on the basis of all the determination results of the four determination processes illustrated in FIG. 17, or may be performed on the basis of at least one of the determination results of the determination processes.

<Automatic Driving Control Processing>

Next, another example of the automatic driving control processing that is executed by the vehicle control system 11 will be described with reference to the flowcharts in FIGS. 18 to 21.

Figure 18:
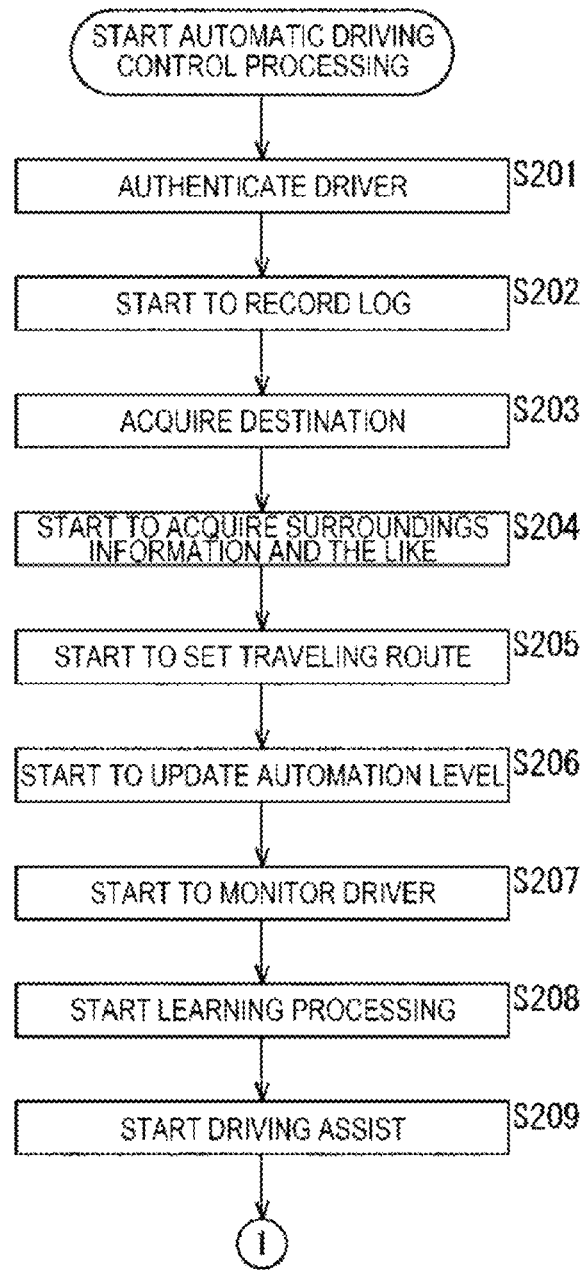
FIG. 18 is a flowchart for explaining automatic driving control processing.

The processing in Steps S201 to S209 in FIG. 18 is similar to the aforementioned processing in Steps S1 to S9 in FIG. 10. Repeated description will be appropriately omitted.

In Step S201, authentication of the driver is performed, and recording of a log is started in Step S202. A destination is acquired in Step S203, and acquisition of surroundings information is started in Step S204.

Setting of a traveling route is started in Step S205, and updating of the automation level is started in Step S206. Monitoring of the driver is started in Step S207, and learning processing is started in Step S208. In addition, driving assist is started in Step S209.

Figure 19:
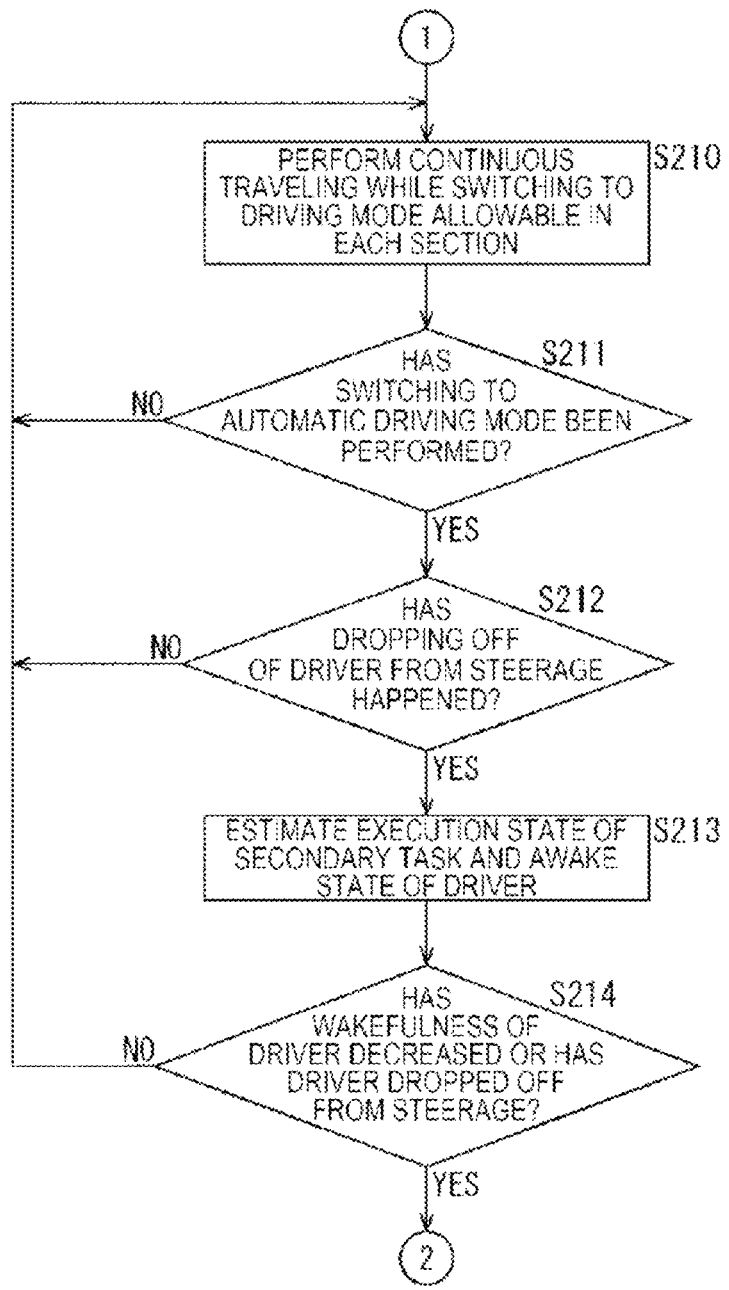
FIG. 19 is a flowchart following FIG. 18 for explaining the automatic driving control processing.

In Step S210 in FIG. 19, the driving assist control unit 153 continuously travels while switching driving modes that are allowed for the respective sections.

At this time, the driving mode switching control unit 154 monitors necessity to return to the manual driving on the basis of the LDM, the traffic information, and the like acquired via the communication unit 27.

Note that the switching from the automatic driving mode to the manual driving mode has the same meaning as the returning to the manual driving. Hereinafter, switching (shifting) from the automatic driving mode to the manual driving mode will be referred to as returning to the manual driving as needed.

In a case in which a change has occurred in conditions as described above with reference to FIGS. 13 to 15 during the monitoring of the necessity to return to the manual driving, for example, the driving mode switching control unit 154 resets the scheduled takeover start point and the like.

In Step S211, the driving mode switching control unit 154 determines whether or not the switching to the automatic driving mode has been performed.

In a case in which it is determined that the switching to the automatic driving mode has not been performed in Step S211, the processing returns to Step S210, and the following processing is repeated.

In a case in which it is determined that the switching to the automatic driving mode has been performed in Step S211, the processing proceeds to S212.

In Step S212, the driving state detection unit 142 determines whether or not the driver has dropped off from the steerage in the automatic driving mode.

In a case in which it is determined that the driver has not dropped off from the steerage in the automatic driving mode in Step S212, the processing returns to Step S210, and the following processing is repeated.

In a case in which it is determined that the driver has dropped off from the steerage in the automatic driving mode in Step S212, the processing proceeds to Step S213.

In Step S213, the driving state detection unit 142 estimates a secondary task execution state and an awake state of the driver in the automatic driving mode. The secondary task execution state represents whether or not the secondary task has been executed.

In Step S214, the driving state detection unit 142 determines whether or not the wakefulness of the driver has decreased or the driver has dropped off from the steerage in the automatic driving mode.

In a case in which it is determined that wakefulness of the driver has not decreased or the driver has not dropped off from the steerage in the automatic driving mode in Step S214, the processing returns to Step S210, and the following processing is repeated. An example in which the secondary task is executed by utilizing the automatic driving that does not accompany full-dropping-off indicates a state in which traveling information that accompanies the advancement is continuously provided as a multi-task screen in the same screen of a mobile terminal 12 or the like that is continuously connected to the vehicle control system 11 via communication when the driver is performing operations of processing slips, writing mails, and the like, and the driver continue to periodically perform operation of recognizing update information, the notification of which is updated on the multi-task screen, which is about events that continuously approach. That is, in a case in which the driver executes the secondary task while acquiring information necessary to return to the driving, and if no dropping-off is observed in the travel update information of the driver during that time, the processing returns to Step S210, and the monitoring is continued. The recognizing operation includes an operation of double-touching a takeover point on the approaching map, which is displayed as PinP, for example.

Figure 20:
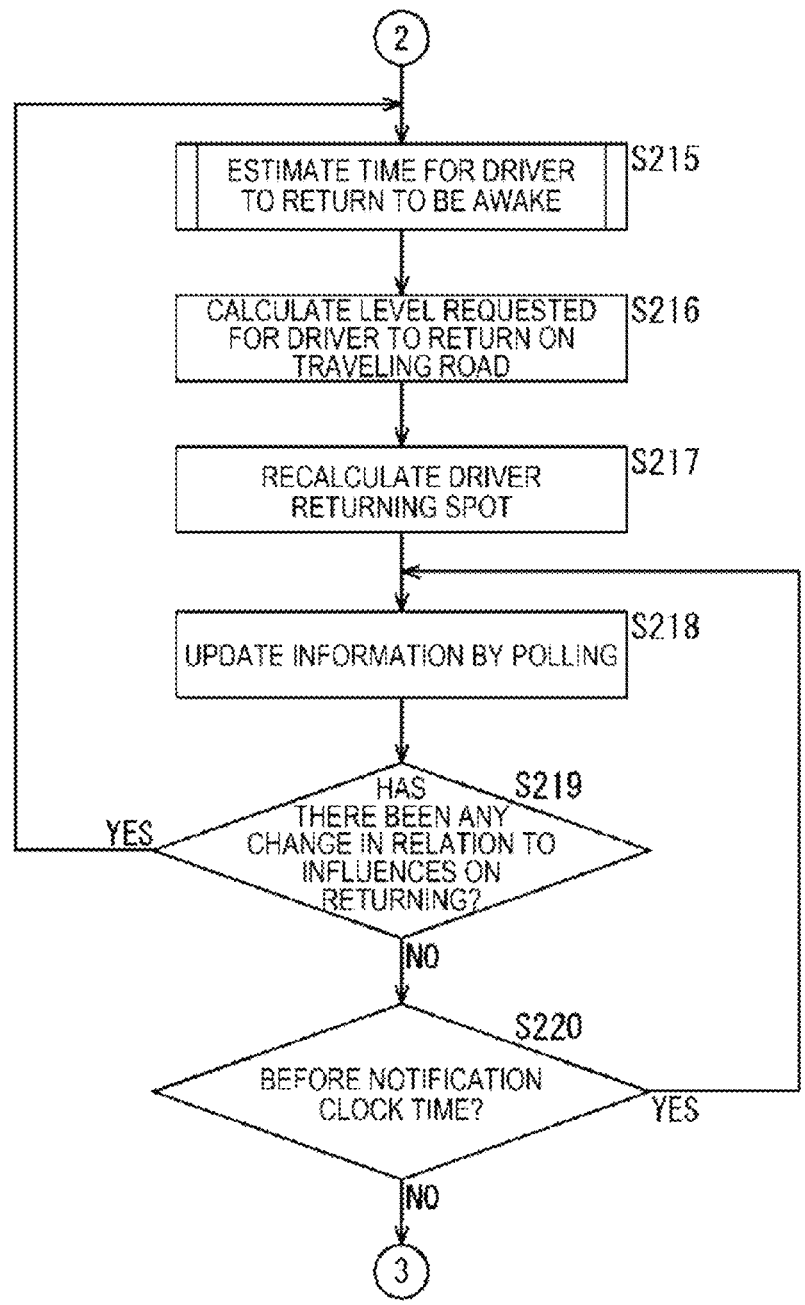
FIG. 20 is a flowchart following FIG. 19 for explaining the automatic driving control processing.

In a case in which it is determined that wakefulness of the driver has decreased or the driver has dropped off from the steerage in the automatic driving mode in Step S214, the processing proceeds to Step S215 in FIG. 20. A representative example cases of the full-dropping off from the steerage after the shifting to the automatic driving are operations of not periodically and visually checking the front side of the traveling, focusing on watching a video, getting obsessed by a smartphone or a game, and the like.

Note that the driver has not dropped off from the steerage, and the second task has also not occurred in Steps S210 to S214.

In Step S215 (FIG. 20), the driving mode switching control unit 154 estimates a time for the driver who is executing the secondary task in the automatic driving mode to return to be awake. The estimation of the wakeup recovery time for the driver will be described later with reference to the flowchart in FIG. 22. The wakeup recovery time for the driver is estimated by the processing in Step S215.

In Step S216, the driving mode switching control unit 154 calculates a driver returning request level that is an automatic driving level, at which the driver is asked for to return, on the traveling road based on updated LDM.

In Step S217, the driving mode switching control unit 154 recalculates a driver returning spot in consideration of a time take by the driver to be awake and return during the execution of the secondary task. The driver returning spot in consideration of the time taken by the driver to be awake and return is recalculated in accordance with the secondary task.

In Step S218, the driving mode switching control unit 154 updates polling information. In a case of updating information by polling, a frequency may be decided in accordance with a safety level of the traveling road.

The risk of occurrence of an irregular event is low on a road that is routinely managed by a probe car or a monitor camera at a high frequency, is dedicated for the automatic driving, and is a straight road. It is necessary to increase the observation and checking frequencies for road sections in which accidents at the time of joining, stone fall, freezing of the road surface is observed or road sections with high accident occurrence rates.

In addition, there can be a case in which conditions assumed at the start point changes at the clock time at which the vehicle actually arrives at the destination due to temporal changes that accompany the driving, and the driver is asked for to perform the takeover in an earlier stage. Within a range from several minutes to several tens of minutes before the arrival at the takeover spot, the information may be updated at a scheduled arrival clock time, and recalculation may be repeated a plurality of times.

In Step S219, the driving mode switching control unit 154 determines whether or not there have been changes related to influences on returning in the state of the driver, the LDM update information, the environmental conditions, and the like before a notification.

In a case in which it is determined that there have been changes related to the influences on returning in Step S219, the processing returns to Step S215, and the following processing is repeated.

In a case in which it is determined that there have been no changes related to the influences on returning in Step S219, the processing proceeds to Step S220.

In Step S220, the driving mode switching control unit 14 determines whether or not the current clock time is before the notification clock time. In a case in which it is determined that the current clock time is before the notification clock time in Step S20, the processing returns to Step S218, and the following processing is repeated.

Figure 21:
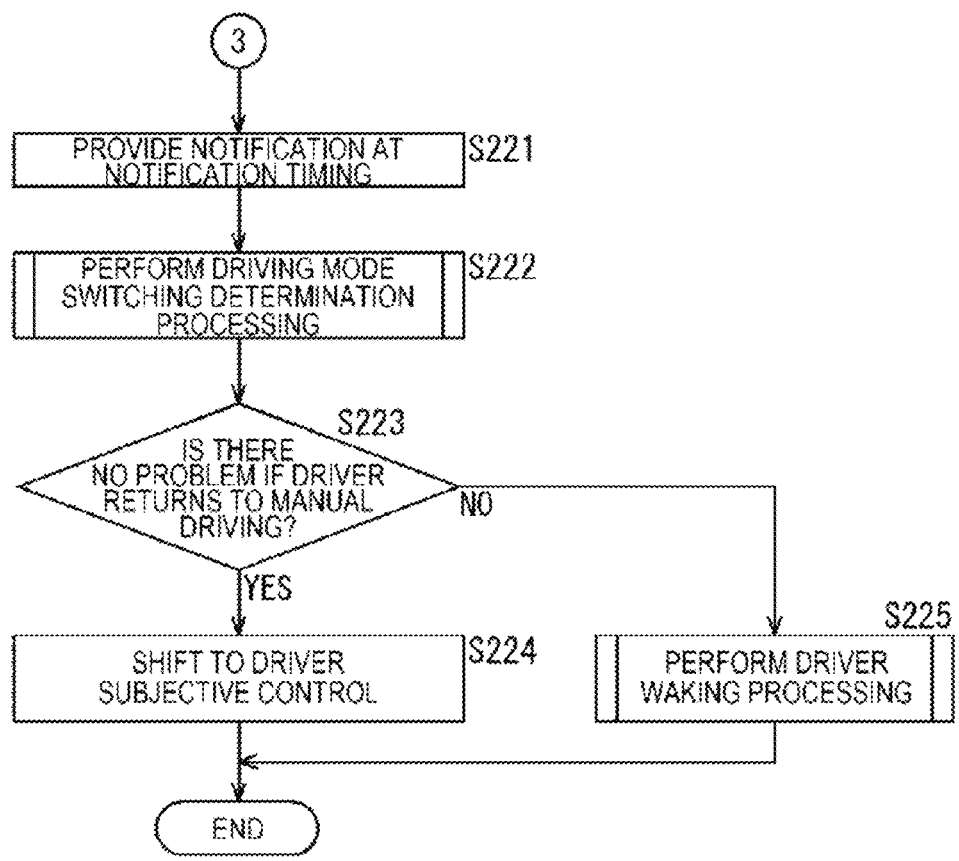
FIG. 21 is a flowchart following FIG. 20 for explaining the automatic driving control processing.

In a case in which it is determined that the current clock time is not before the notification clock time, that is, the notification cock time has arrived in Step S220, the processing proceeds to Step S221 in FIG. 21.

In Step S221, the driving mode switching control unit 154 causes the notification control unit 124 to provide a notification about switching to the manual driving mode at the notification timing. The notification provided here is a notification about shifting to the manual driving mode that is similar to the notification in Step S20 in FIG. 12.

In Step S222, the switching determination unit 155 performs driving mode switching determination processing. In the driving mode switching determination processing, whether or not the switching can be performed is determined by the respective determination units, namely the gesture recognition switching determination unit 201, the saccade information switching determination unit 202, the sound recognition switching determination unit 203, and the steering wheel operation switching determination unit 204. Since processing that is similar to the processing in the aforementioned flowchart in FIG. 17 is performed as the driving mode switching determination processing in Step S222, description thereof will be omitted.

In Step S223, the switching determination unit 155 determines whether the returning to the manual driving causes no problems, on the basis of the determination results obtained by the respective determination units that form the switching determination unit 155.

In a case in which it is determined that the returning to the manual driving causes no problems in Step S223, the processing proceeds to Step S224.

In Step S224, the driving mode switching control unit 154 performs the switching from the automatic driving mode to the manual driving mode, shifts to a driver subjective control state, which is a state in which the driver subjectively performs driving, and then ends the automatic driving control processing. It is a matter of course that although the functions of the automatic driving itself end, a part of functions such as urgent automatic brake system for the urgent time, such as AEBS, may be saved. However, since the ADAS function as the function saved after the automatic driving ends is mainly for the purpose of preventing damage at the urgent time in general, complete prevention of an accident is not achieved, and there is a concern that this leads to injuries or the like, depending utilization of the function should be avoided. Therefore, in a case in which dependency utilization is detected by the vehicle control system 11, penalty of abnormal use of the function may be recorded.

In a case in which it is determined that the returning to the manual driving causes problems in Step S223, the processing proceeds to Step S225.

In Step S225, the driving mode switching control unit 154 performs driver waking processing. As the driver waking processing, at least issuing of an alert for waking up the driver, execution of emergency evacuation mode activation, and the like are performed, and for example, the processing in Steps S24 to S28 in FIG. 12 is performed.

Figure 22:
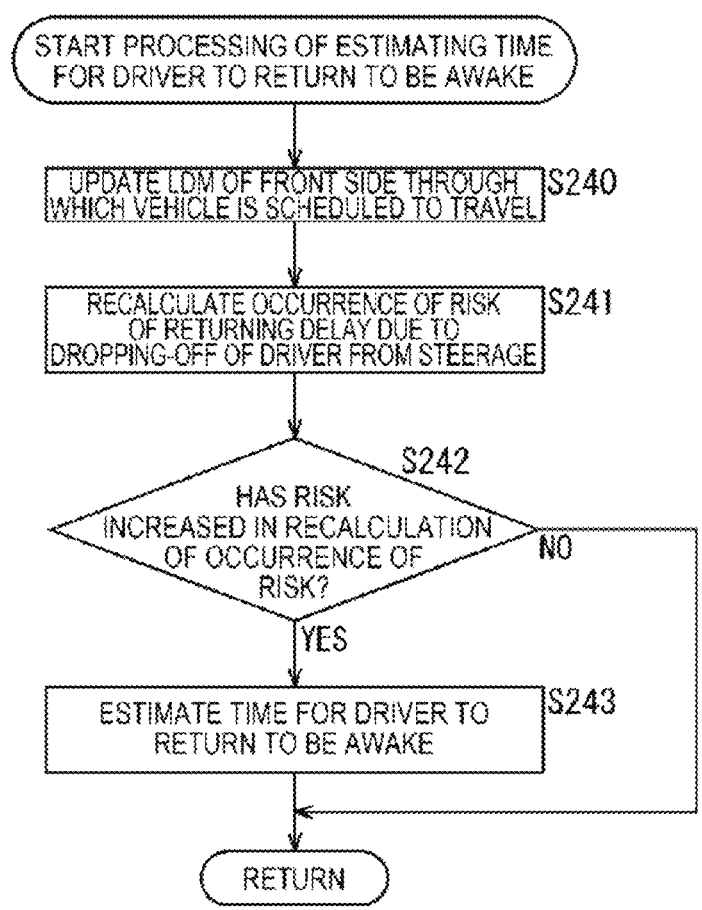
FIG. 22 is a flowchart for explaining processing of estimating a wakeup recovery time for a driver.

Next, the processing of estimating the wakeup recovery time for driver in Step S222 in FIG. 21 will be described with reference to the flowchart in FIG. 22. In a case in which a warning mode change that accompanies occurrence of an incident or unexpected event occurrence notification is received after start of actual traveling in response to before-start-of-traveling information prior to the start of driving, it is necessary to provide a notification, an alert, or a necessary countermeasure for encouraging the driver to return to the unplanned driving earlier. Therefore, this processing of estimating the wakeup recovery time for the driver is performed.

In Step S240, the driving mode switching control unit 154 updates the LDM of the front side through which the vehicle is scheduled to travel, after the start of traveling. At this time, traveling information is also updated as needed.

The notification about returning is started at a timing that is earlier than a predetermined period of time by tracking back to a spot at which it is necessary for the driver to switch from the automatic driving to the manual driving, and the waking-up processing is started at a preset spot in the LDM map information acquired at the time of the start of traveling.

However, whether or not there is a necessity of the manual driving in the awake state to which the driver has returned regardless of the road is an automatic driving-dedicated road due to an unexpected event such as construction or occurrence of stone fall due to temporal changes in the traveling environment is monitored and managed.

In Step S241, the driving mode switching control unit 154 recalculates occurrence of a returning delay risk due to the driver's dropping off from the steerage.

In Step S242, the driving mode switching control unit 154 determines whether or not the risk has increased as compared with that before the recalculation by recalculating the occurrence of the risk.

In a case in which it is determined that the risk has increased as compared with that before the recalculation in Step S242, the processing proceeds to Step S243.

In Step S243, the driving mode switching control unit 154 estimates the wakeup recovery time for the driver.

In a case in which it is determined that the risk has not increased as compared with that before the recalculation in Step S244, the processing in Step S243 is skipped.

As described above, the detection of the front side pointing and checking sign sent while checking the advancing direction is performed as an initial processing of the procedure for determining the internal state after returning of the driver using the results of detecting the degree of wakefulness and the like in an embodiment of the present technology.

Since the switching from the automatic driving mode to the manual driving mode is performed on the basis of this detection of the front side pointing and checking sign, it is possible to more safely perform the takeover from the automatic driving to the manual driving.

In particular, the front side pointing and checking sign of the driver is an excellent checking way for preventing missing from the standpoint of human engineering and has been widely distributed in the fields of train and bus operations, and the effectiveness thereof has been highly recognized.

It is possible to precisely determine the ability of the driver to return, and as a result, it is possible to allow the driver to more reliably perform the takeover from the automatic driving mode to the manual driving mode by the determination of the internal state after returning of the driver using performing the tracking of the line of sight behaviors, the sound recognition information, the steering wheel operation information, and the like in order.

As described above, it is possible to more safely switch from the automatic driving to the manual driving.

Note that the vehicle control system 11 may perform autonomous check of its own position and increase accuracy thereof for correcting a relative position with respect to the environment and may further create correction data for the acquired map data by using technologies such as simultaneous localization and mapping (SLAM).

The present technology has been described on the basis of the classification of the automatic driving levels at which the vehicle can travel in accordance with the road environment, from the level 0 at which the utilization of the automatic driving is not allowed, the automatic driving possible levels at which intervention of the driver is asked for in order, and to the further advanced automatic driving levels 4 and 5.

Meanwhile in a case in which the vehicle control system 11 regards the automatic driving on the assumption of utilization for low-speed traveling although this has not yet been allowed by the current Road Traffic Act, necessity to perform cognitive determination such as traveling environment condition recognition and short-period route planning that cover major risks in a multiplexed manner, which is necessary for ordinary high-speed safety traveling that has widely been discussed until now and traveling planning is not necessarily essential. In addition, in a case in which an autonomous complete automatic driving vehicle limited to low-speed traveling is assumed at an intermediate position between a low-speed driving vehicle, introduction of which has advanced due to easing of regulations, and an existing light vehicle in the related art as a target of model code authentication, availability of the automatic driving of such a vehicle at a low speed is greatly advantageous.

That is, in a case in which utilization of a vehicle limited to a low speed is assumed, and the automatic driving system is not able to make a determination in a short period of time, the time necessary for the system to ascertain the conditions necessary for the vehicle to drive may be taken while the car is stopped or decelerated by utilizing a time axis to intentionally delay the clock time of arrival at a critical point. If the speed is further lower, a time may be taken to determine a traveling path as a result, and this can be compensated by decelerating the advancement of the vehicle. That is, it is possible to cause the vehicle to safely travel by limiting the vehicle to the utilization at a low speed even if the map information corresponding to "unviewed track", which is LDM that is necessary to automatically travel at a high speed in the related art and is constantly updated, is poor.

Note that the critical point indicates final takeover point, at which the corresponding takeover should be completed, on the map by the previously acquired information of LDM, for example. The critical point is a spot with a concern that a hazer may be induced in a case in which it is not possible to address conditions with the manual driving when the vehicle passes through the spot or in a case in which it is not possible to address conditions with the manual driving in a case in which driver's returning to the manual driving is asked for in accordance with a request from the vehicle control system 11.

Depending on the factors of the vehicle control system 11 asking for the manual driving, the spot does not necessarily directly accompany a hazard in a case in which the driver has not returned to the manual driving. This corresponds to a spot until which the driver is asked for to complete to return to the manual driving since some hazard or some event, conditions of which is not able to be determined by the vehicle control system 11, has occurred.

The corresponding critical point is a decided spot that the vehicle control system 11 determines since the vehicle control system 11 is not able to make determinations or the vehicle control system 11 is not sure for automatic traveling at an ordinary cruising speed. Therefore, a situation in which the driver does not feel the necessity for their own vehicle to return to the manual driving when the vehicle passes through the critical point can frequently occur.

Therefore, in a case in which a hazardous event that the vehicle control system 11 is not able to really determine occurs along with conditions that accidentally happen since a large amount of negligence of takeover is caused at the critical point by the driver who becomes careless at the spot, a risk of inducing a large accident as a result is included. Therefore, in order to prevent the driver from downgrading the takeover when the takeover of the driver is not able to be confirmed at the critical point, the critical point may be used as a reference point for determining issuance of penalty to be applied to the driver when the driver delays in the takeover or in the start of the takeover.

Meanwhile, since there are multiple factors that inhibit infrastructure functions, such as occurrence of traffic jams in road infrastructure in hybrid utilization in a high-speed traveling environment, an automatic driving system that can be used only at a low speed is not suitable for direct utilization in a highway environment.

That is, while the automatic driving vehicle dedicated to low-speed traveling can realize safe moving and traveling even with a further limited surrounding recognition function, the automatic driving vehicle asks for high-speed processing, such as optimal obstacle avoidance route path selection, if the automatic driving is directly applied to high-speed driving. However, since it is not possible to perform remote recognition and high-speed processing determination necessary for the safety automatic driving, it is difficult to pass through a route through which high-speed traveling is asked for.

Thus, the utilization of the automatic driving limited to the low-speed traveling is allowed regardless of the manual driving ability of the driver, at the low speed. Further, if passing through the section of high-speed traveling at the automation driving level 3 or 2 becomes possible by increasing the traveling speed only in a case in which the driver who desires to pass through the section at or above a specific speed returns to the intervention in the manual driving, more practical utilization becomes possible in the same moving way, and also, a safety aspect is also secured, and further, there is an advantage that it is possible to prevent traffic jams caused by entrance of the low-speed vehicles to the road infrastructure.

That is, although the present technology places emphasis on the determination of the manual driving returning ability when the driver switches from the automatic driving mode to the manual driving mode as needed for each road section that changes at every moment in accordance with the traveling section, the present technology may be utilized in an extended manner to determination of the manual driving returning ability by the driver in a case in which the vehicle in the form in which automatic driving at the low speed is allowed is moved at a high speed.

Note that the above description is for configuration examples according to embodiments in which active reaction of the driver to control is confirmed. Although embodiments of the notification, the gesture recognition, further the control that directly applies specific noise traveling to the traveling itself of the vehicle have been described as takeover procedures, other embodiments may be applied. For example, visual effects such as virtual reality effects may be used, control of the steering wheel and the vehicle may be separated and the rotation and the torque of the steering wheel may be artificially generated, or the steering wheel itself may not be rotated while a physical feeling of rotation may be applied by haptic method that depends on percussion. Further, the checking procedure may not be limited to the front checking and may be extended and applied to gesture recognition from virtual display.

The present technology can be applied to various vehicles capable of automating at least a part of driving regardless of power sources or energy supply sources of the vehicles. For example, the present technology can be applied to gasoline-power cars, hybrid cars, plug-in hybrid cars, electric automobiles, fuel cell cars, and the like. In addition, the present technology can also be applied to buses, trucks, motorcycles, and the like in addition to general automobiles. In particular, high effects can be achieved in a case in which the present technology is applied to various vehicles capable of switching between the automatic driving and the manual driving.

Configuration Example

The aforementioned series of processing can be executed by hardware or can be executed by software. In a case in which the series of processing is executed by software, programs that form the software are installed on a computer. Here, the computer includes a computer that is incorporated in a dedicated hardware, a general-purpose personal computer, for example, which is capable of executing the various functions by installing the various programs.

Figure 23:
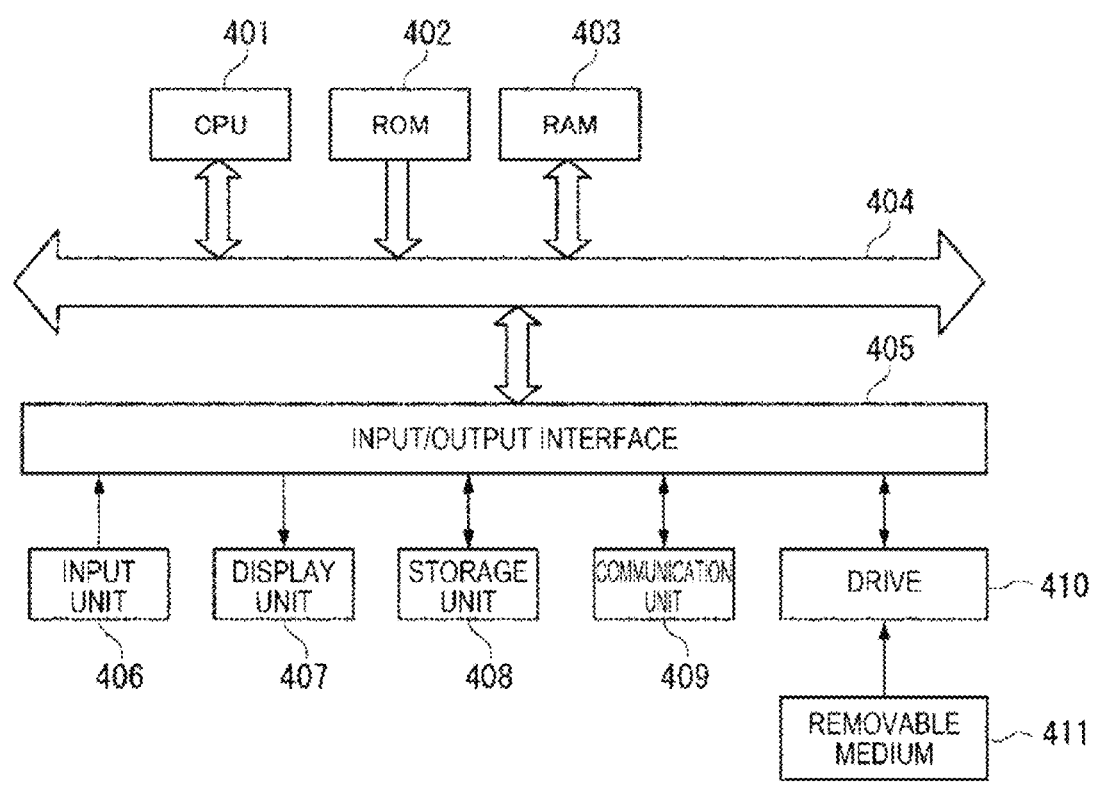
FIG. 23 is a diagram illustrating a configuration example of a computer.

FIG. 23 is a block diagram illustrating a configuration example of hardware of a computer that executes the aforementioned series of processing using a program.

In the computer, a central processing unit (CPU) 401, a read only memory (ROM) 402, and a random access memory (RAM) 403 are connected to each other by a bus 404.

An input/output interface 405 is further connected to the bus 404. An input unit 406, an output unit 407, a recording unit 408, a communication unit 409, and a device 410 are connected to the input/output interface 405.

The input unit 406 includes an input switch, a button, a microphone, an imaging element, and the like. The output unit 407 includes a display, a speaker, and the like. The recording unit 408 includes a hard disc, a non-volatile memory, and the like. The communication unit 409 includes a network interface and the like. The drive 410 drives a removable recording medium 411 such as a magnetic disk, an optical disc, a magneto-optical disc, or a semiconductor memory.

In the computer configured as described above, the CPU 401 loads a program that is stored, for example, in the recording unit 408 onto the RAM 403 via the input/output interface 405 and the bus 404, and executes the program. Thus, the above-described series of processing is performed.

Programs to be executed by the computer (the CPU 401) can be, for example, provided being recorded in the removable recording medium 411 which is a packaged medium or the like. Also, programs may be provided via a wired or wireless transmission medium, such as a local area network, the Internet or digital satellite broadcasting.

In the computer, by inserting the removable recording medium 411 into the drive 410, the program can be installed in the recording unit 408 via the input/output interface 405. Further, the program can be received by the communication unit 409 via a wired or wireless transmission medium and installed in the recording unit 408. Moreover, the program can be installed in advance in the ROM 402 or the recording unit 408.

It should be noted that the program executed by a computer may be a program that is processed in time series according to the sequence described in this specification or a program that is processed in parallel or at necessary timing such as upon calling.

Note that an embodiment of the present technology is not limited to the embodiments described above, and various changes and modifications may be made without departing from the scope of the present technology.

For example, the present technology can adopt a configuration of cloud computing in which one function is shared and processed jointly by a plurality of apparatuses through a network.

Further, each step described by the above-mentioned flow charts can be executed by one apparatus or shared and executed by a plurality of apparatuses.

In addition, in the case where a plurality of processes are included in one step, the plurality of processes included in this one step can be executed by one apparatus or shared and executed by a plurality of apparatuses.

COMBINATION EXAMPLES

The present technology can be configured as follows.

(1)
A vehicle control device including:
an imager that images a driver; and
circuitry configured to:
detect a gesture action indicating that the driver is awake based on an image captured by the imager; and
switch a driving mode in response to the detected gesture action.

(2)
The vehicle control device according to (1),
wherein the circuitry switches the driving mode from an automatic driving mode to a manual driving mode in a case in which the gesture action is detected.

(3)
The vehicle control device according to (1) or (2),
wherein the circuitry detects, as the gesture action, a pointing and checking action that is performed in a vehicle traveling direction while viewing the vehicle traveling direction.

(4)
The vehicle control device according to any of (1) to (3),
wherein the pointing and checking action is an action in which a fingertip of the driver is located in a vicinity of a vertical plane that is virtually set to include a line of sight of the driver and is also located below the line of sight of the driver.

(5)
The vehicle control device according to any of (1) to (4),
wherein the circuitry detects the pointing and checking action by tracking an action of at least any of the fingertip, a hand, and a first of the driver.

(6)
The vehicle control device according to any of (1) to (5),
wherein the circuitry detects the gesture action on a basis of characteristics specific to the driver.

(7)
The vehicle control device according to any of (1) to (6),
wherein the circuitry is further configured to learn the characteristics specific to the driver on a basis of the detected gesture action.

(8)
The vehicle control device according to any of (1) to (7),
wherein the circuitry detects the gesture action performed after the driver is seated in a driver's seat.

(9)
The vehicle control device according to any of (1) to (8),
wherein the circuitry is further configured to detect a seated action of the driver after a notification of switching the driving mode is provided to the driver.

(10)
The vehicle control device according to any of (1) to (9),
wherein the circuitry detects, as the gesture action, an action of checking a vehicle traveling direction again and a subsequent action of checking a notification or an alert to the driver.

(11)
The vehicle control device according to any of (1) to (10),
wherein the circuitry is further configured to detect an action of gripping a steering wheel by the driver after detecting the predetermined gesture action, and
wherein the circuitry switches the driving mode from an automatic driving mode to a manual driving mode in a case in which the action of gripping the steering wheel is detected.

(12)
The vehicle control device according to any of (1) to (11),
wherein the circuitry detects an awake state of the driver based on at least one of a response of the driver to presentation to the driver and accuracy of steerage correction.

(13)
A vehicle control method comprising:
imaging a driver;
detecting a gesture action indicating that the driver is awake based on a captured image; and
switching a driving mode in response to the detected gesture action.

(14)
A vehicle control device including:
an imaging unit that images a driver;
an awake state detection unit that detects a predetermined gesture action indicating that the driver is awake on a basis of an image captured by the imaging unit; and
a driving mode switching unit that switches a driving mode in response to an event in which the predetermined gesture action is detected.

(15)
The vehicle control device according to (14),
in which the driving mode switching unit switches the driving mode from an automatic driving mode to a manual driving mode in a case in which the predetermined gesture action is detected.

(16)
The vehicle control device according to (14) or (15),
in which the awake state detection unit detects, as the predetermined gesture action, a pointing and checking action that is performed in a vehicle advancing direction while viewing the vehicle advancing direction.

(17)
The vehicle control device according to (16),
in which the pointing and checking action is an action in which a finger tip of the driver is located in a vicinity of a vertical plane that is virtually set to include a line of sight of the driver and is also located below the line of sight of the driver.

(18)
The vehicle control device according to (16) or (17),
in which the awake state detection unit detects the pointing and checking action by tracking an action of at least any of the finger tip, a hand, and a first of the driver.

(19)
The vehicle control device according to any one of (14) to (18),
in which the awake state detection unit detects the predetermined gesture action on a basis of characteristics specific to the driver.

(20)
The vehicle control device according to (14), further including:
a learning unit that learns the characteristics specific to the driver on a basis of the predetermined gesture action detected by the awake state detection unit.

(21)
The vehicle control device according to any one of (14) to (20),
in which the awake state detection unit detects the predetermined gesture action performed after the driver is seated on a driver's seat.

(22)

The vehicle control device according to (21), in which the awake state detection unit detects a seated action of the driver after a notification of switching the driving mode is provided to the driver.

(23)

The vehicle control device according to any one of (14) to (22), in which the awake state detection unit detects, as the predetermined gesture action, an action of checking an advancing direction again and a subsequent action of checking a notification or an alert to the driver.

(24)

The vehicle control device according to any one of (14) to (23), in which the awake state detection unit detects the driver's action of gripping a steering wheel after detecting the predetermined gesture action, and the driving mode switching unit switches the driving mode from an automatic driving mode to a manual driving mode in a case in which the action of gripping the steering wheel is detected.

(25)

The vehicle control device according to any one of (14) to (24), in which the awake state detection unit detects an awake state of the driver on a basis of at least one of a response of the driver to presentation to the driver and accuracy of steerage correction.

(26)

A vehicle control method including:

imaging a driver;

detecting a predetermined gesture action indicating that the driver is awake on a basis of a captured image; and switching a driving mode in response to an event in which the predetermined gesture action is detected.

REFERENCE SIGNS LIST 10 automatic driving system
11 vehicle control system
12 mobile terminal
21 surroundings imaging unit
22 surroundings information acquisition unit
23 position measurement unit
24 input unit
25 vehicle information acquisition unit
26 driver monitoring unit
27 communication unit
28 vehicle control unit
29 display unit
30 sound output unit
31 light emitting unit
33 traveling control unit
34 in-vehicle device control unit
35 storage unit
101 driver imaging unit
102 biological information acquisition unit
103 line-of-sight detection unit
104 authentication unit
121 surroundings monitoring unit
122 driver monitoring unit
123 automatic driving control unit
124 notification control unit
125 log generation unit
126 learning unit
141 driving behavior analysis unit
142 driving state detection unit
151 route setting unit
152 automation level setting unit
153 driving assist control unit
154 driving mode switching control unit
155 switching determination unit
201 gesture recognition switching determination unit
202 saccade information switching determination unit
203 sound recognition switching determination unit
204 steering wheel operation switching determination unit

The invention claimed is:

1. A vehicle control device comprising:
an image sensor configured to capture images of a driver; and
circuitry configured to:
    detect a reactivity and/or a degree of wakefulness of the driver;
    estimate a wakeup recovery time of the driver based on the detected reactivity and/or degree of wakefulness of the driver;
    perform an awakening operation based on the detected reactivity and/or degree of wakefulness of the driver and the estimated wakeup recovery time of the driver;
    detect a gesture action indicating that the driver is awake based on the images captured by the imaging sensor,
        wherein the circuitry is configured to detect, as the gesture action, a pointing and checking action that is performed in a vehicle traveling direction while the driver is viewing the vehicle traveling direction, and
        wherein detecting the pointing and checking action includes detecting that a finger tip of the driver is within a first distance to the right or left of a line of sight of the driver and is within a second distance below the line of sight of the driver;
    detect an action of gripping a steering wheel by the driver after detecting the pointing and checking action; and
    switch the driving mode from an automatic driving mode to a manual driving mode in a case in which the action of gripping the steering wheel is detected.

2. The vehicle control device according to claim 1, wherein the circuitry is configured to switch the driving mode from an automatic driving mode to a manual driving mode in a case in which the pointing and checking action is detected.

3. The vehicle control device according to claim 1, wherein the circuitry is configured to detect the pointing and checking action on a basis of characteristics specific to the driver.

4. The vehicle control device according to claim 3, wherein the circuitry is further configured to learn the characteristics specific to the driver on a basis of the detected pointing and checking action.

5. The vehicle control device according to claim 1, wherein the circuitry is configured to detect the pointing and checking action performed after the driver is seated in a driver's seat.

6. The vehicle control device according to claim 5, wherein the circuitry is further configured to detect a seated action of the driver after a notification of switching the driving mode is provided to the driver.

7. The vehicle control device according to claim 1, wherein the circuitry is configured to detect the reactivity and/or degree of wakefulness of the driver based on at least one of a response of the driver to presentation of a sound to the driver and accuracy of steering wheel operation.

8. A vehicle control method comprising:
capturing images of a driver;
detecting a reactivity and/or a degree of wakefulness of the driver;
estimating a wakeup recovery time of the driver based on the detected reactivity and/or degree of wakefulness of the driver;
performing an awakening operation based on the detected reactivity and/or degree of wakefulness of the driver and the estimated wakeup recovery time of the driver;
detecting a gesture action indicating that the driver is awake based on the images captured by the imaging sensor,
wherein the gesture action is a pointing and checking action that is performed in a vehicle traveling direction while the driver is viewing the vehicle traveling direction, and
wherein detecting the pointing and checking action includes detecting that a finger tip of the driver is within a first distance to the right or left of a line of sight of the driver and is within a second distance below the line of sight of the driver;
detecting an action of gripping a steering wheel by the driver after detecting the pointing and checking action; and
switching the driving mode from an automatic driving mode to a manual driving mode in a case in which the action of gripping the steering wheel is detected.

9. A non-transitory computer readable medium storing instructions that, when executed by processing circuitry, perform a vehicle control method comprising:
capturing images of a driver;
detecting a reactivity and/or a degree of wakefulness of the driver;
estimating a wakeup recovery time of the driver based on the detected reactivity and/or degree of wakefulness of the driver;
performing an awakening operation based on the detected reactivity and/or degree of wakefulness of the driver and the estimated wakeup recovery time of the driver;
detect a gesture action indicating that the driver is awake based on the images captured by the imaging sensor,
wherein the circuitry is configured to detect, as the gesture action, a pointing and checking action that is performed in a vehicle traveling direction while the driver is viewing the vehicle traveling direction, and
wherein detecting the pointing and checking action includes detecting that a finger tip of the driver is within a first distance to the right or left of a line of sight of the driver and is within a second distance below the line of sight of the driver;
detect an action of gripping a steering wheel by the driver after detecting the pointing and checking action; and
switch the driving mode from an automatic driving mode to a manual driving mode in a case in which the action of gripping the steering wheel is detected.

\* \* \* \* \*